(12) United States Patent
Deshpande et al.

(10) Patent No.: US 10,259,444 B2
(45) Date of Patent: Apr. 16, 2019

(54) VEHICLE CONTROL SYSTEM AND METHOD

(71) Applicant: General Electric Company, Schenectady, NY (US)

(72) Inventors: Sharath Srinivas Deshpande, Bangalore (IN); Vishram Vinayak Nandedkar, Bangalore (IN); Ajith Kuttannair Kumar, Erie, PA (US); Wolfgang Daum, Sussex, WI (US); Glenn Robert Shaffer, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 15/907,823

(22) Filed: Feb. 28, 2018

(65) Prior Publication Data

US 2018/0186357 A1 Jul. 5, 2018

Related U.S. Application Data

(63) Continuation-in-part of application No. 14/496,655, filed on Sep. 25, 2014, which is a continuation-in-part
(Continued)

(51) Int. Cl.
*H02J 3/32* (2006.01)
*B60L 11/18* (2006.01)
(Continued)

(52) U.S. Cl.
CPC .......... *B60W 10/08* (2013.01); *B60L 11/1861* (2013.01); *B60W 30/188* (2013.01);
(Continued)

(58) Field of Classification Search
USPC ..... 701/22, 82, 117; 180/2.1, 65.21, 65.275; 191/33 R
See application file for complete search history.

(56) References Cited

U.S. PATENT DOCUMENTS 6,230,496 B1  5/2001  Hofmann et al.
6,879,889 B2 *  4/2005  Ross .................. B60L 5/005
                                                    180/167
(Continued)

FOREIGN PATENT DOCUMENTS

CA           2574391 A1 *  1/2006  ............. B60K 6/485
WO    WO-2006009256 A1 *  1/2006  ............. B60K 6/485

OTHER PUBLICATIONS

Design and implementation of micro controller based four-level converter for Energy storage system used in Electric/ Hybrid Electric Vehicle; Srinivasa Rao Gorantla et al.; 2011 IEEE Recent Advances in Intelligent Computational Systems; IEEE Conferences. (Year: 2011).*
(Continued)

*Primary Examiner* — Cuong H Nguyen
(74) *Attorney, Agent, or Firm* — Christopher R. Carroll; The Small Patent Law Group LLC

(57) ABSTRACT

A vehicle control system controls operation of motors of a vehicle and determines whether there is sufficient stored electric energy to power the vehicle through an unpowered segment of a route. The controller changes operation of the vehicle to ensure that the vehicle can travel completely through the unpowered segment by switching which energy storage device provides energy, changing vehicle speed, changing motor torque, changing which route is traveled on, selecting fewer motors to power the vehicle, requesting rendezvous with a recharging vehicle, running the energy storage devices in a degraded mode, initiating a motor to generate power to aid in propulsion and/or recharge the energy storage devices, selecting a different route, controlling the vehicle to draft or mechanically couple to another vehicle, and/or controlling the vehicle to gain momentum or to generate an overcharge.

20 Claims, 12 Drawing Sheets

Related U.S. Application Data of application No. 13/487,057, filed on Jun. 1, 2012, now Pat. No. 9,545,854.

(60) Provisional application No. 61/496,556, filed on Jun. 13, 2011.

(51) Int. Cl.
*B60W 10/08* (2006.01)
*B60W 30/188* (2012.01)

(52) U.S. Cl.
CPC .... *B60L 2200/26* (2013.01); *B60W 2510/084* (2013.01); *B60W 2510/086* (2013.01)

(56) References Cited

U.S. PATENT DOCUMENTS

| | | | | |
|---|---|---|---|---|
| 8,583,303 | B2* | 11/2013 | Bastien | E21F 13/00 |
| | | | | 701/22 |
| 9,545,854 | B2* | 1/2017 | Daum | B60L 11/1842 |
| 2010/0292877 | A1* | 11/2010 | Lee | B60K 1/04 |
| | | | | 701/21 |
| 2011/0037275 | A1* | 2/2011 | Peitzke | B60L 7/10 |
| | | | | 290/1 R |
| 2011/0246004 | A1 | 10/2011 | Mineta | |
| 2012/0016551 | A1 | 1/2012 | Krause et al. | |
| 2012/0299544 | A1 | 11/2012 | Prosser et al. | |
| 2012/0316717 | A1* | 12/2012 | Daum | B60L 11/1842 |
| | | | | 701/22 |
| 2013/0245870 | A1 | 9/2013 | Mineta | |
| 2014/0052373 | A1 | 2/2014 | Hoch et al. | |
| 2014/0200756 | A1 | 7/2014 | Sisk | |
| 2014/0350767 | A1 | 11/2014 | Fries | |
| 2015/0232097 | A1* | 8/2015 | Luther | B61L 3/006 |
| | | | | 701/123 |

OTHER PUBLICATIONS

Nfluence of number of gear step on engine and motor operation characteristics for parallel HEVHyunhwa Kim ; Junbeom Wi ; Jiho Yoo ; Hanho Son ; Hyunsoo Kim ; Chiman Park2018 Thirteenth International Conference on Ecological Vehicles and Renewable Energies (EVER); pp. 1-7. (Year: 2018).*

Modeling of electric vehicle loads for power flow analysis based on PSAT; Yuttana Kongjeen ; Krischonme Bhumkittipich; 2016 13th Inter. Conf. Electrical Engineering/Electronics, Computer, Telecommunications and Information Technology (ECTI-CON); pp. 1-6. (Year: 2016).*

Research and design of control system based on NRF24I01 for intellectualized vehicle; Dunli Hu ; Haoran Ke ; Wenqing Fu; 2017 6th Data Driven Control and Learning Systems (DDCLS); pp. 685-689. (Year: 2017).*

* cited by examiner

VEHICLE CONTROL SYSTEM AND METHOD

CROSS-REFERENCE TO RELATED APPLICATIONS

This application is a continuation-in-part of U.S. patent application Ser. No. 14/496,655, filed 25 Sep. 2014, which is a continuation-in-part of U.S. patent application Ser. No. 13/487,057, filed 1 Jun. 2012 (now U.S. Pat. No. 9,545,854), which claims priority to U.S. Provisional Patent Application No. 61/496,556, filed 13 Jun. 2011. The entire disclosures of these applications are incorporated herein by reference.

FIELD

Embodiments of the subject matter disclosed herein relate to controlling propulsion systems of vehicles and/or vehicle systems.

BACKGROUND

Some known vehicles include multiple motors that generate tractive force to move the vehicles along a route. For example, locomotives may include multiple traction motors that operate to rotate axles and/or wheels of the locomotives. During trips of such vehicles, the amount of tractive force needed to propel the vehicles changes. The load of the vehicles can change over time for a variety of factors, such as wind conditions, adhesion between the wheels and the route, changing amounts of cargo being carried by the vehicles, or the like.

Because of the changing load of the vehicles, the amount of tractive force needed to move the vehicle can change over time. But, some known vehicles keep all traction motors actively generating tractive force to propel the vehicles, even if some of the traction motors are generating a relatively small amount of tractive force. Some other known vehicle consists (e.g., trains) having two or more locomotives may turn off all traction motors in one of the locomotives when less than all traction motors are needed for propelling the consist. These consists rely on simulations of travel of the consists by an off-board computing system. The simulations determine locations where a locomotive can be turned off prior to the consist embarking on a trip. During the trip, the consist may refer to the previously simulated travels and turn off a locomotive at one or more locations based on the simulations.

But, these simulations rely on calculated amounts of tractive forces needed to move the consist. Because the simulations are performed prior to embarking on a trip, these consists are unable to adapt to changing conditions during movement. For example, the consists are not able to turn any traction motors on or off based on a real time change in the needed tractive forces that was not present in the simulations.

Additionally, in certain electric vehicles (e.g., certain hybrid electric vehicles), the sole sources of electricity are from a fuel engine (e.g., fuel-powered generator) and regenerative braking (e.g., running a traction motor in a mode of operation as a generator, for slowing a vehicle, and thereby generating electricity that can be stored in an energy storage device). The costs of running such vehicles are dependent, typically, on local fuel costs. In other transportation systems, electric vehicles receive some or all of their electrical power from wayside (off-board) sources. The costs of running vehicles in such a system may be reduced, but this is dependent on the costs of electricity from the wayside source (typically tied to the local power grid). Thus, during some time periods (e.g., peak demand periods), costs may actually be higher. Additionally, the infrastructure for providing wayside electricity may be expensive, due to having to provide sufficient capacity for peak demands. One known solution to increase the capacity of energy supply is to add more wayside sources. But, adding such wayside sources can be time-consuming and costly.

BRIEF DESCRIPTION

In one embodiment, a control system includes a controller for a vehicle that includes one or more motors that propel the vehicle along a main route during a trip. The vehicle also includes an onboard energy storage system having one or more energy storage devices for storing at least some of the electric energy used to power the one or more motors, and configured to receive electric current from at least one of an electrified rail or a catenary line. The controller is configured to control operation of the one or more motors according to a trip plan during the trip, and to determine that there is insufficient electric energy stored onboard the vehicle to power the vehicle based at least in part on an amount of electric energy that is calculated to be needed to be consumed to propel the vehicle through an unpowered segment of the main route from a first powered segment to a second powered segment. The first and second powered segments represent portions of the main route that have the at least one of the electrified rail or the catenary line for at least one of charging the onboard power source or powering the one or more motors. The unpowered segment of the route does not have the at least one of the electrified rail or the catenary line. The controller also is configured to change operation of the vehicle to ensure that the vehicle can travel completely through the unpowered segment by at least one of: switching which of the one or more energy storage devices provides the electric energy to the vehicle, changing speed of the vehicle, changing a torque of the one or more motors, changing a direction of movement of the vehicle to travel from the main route onto a second route of the vehicle that extends from a current location of the vehicle to a wayside station, selecting a subset of the one or more motors that is less than a full number of available motors to power the vehicle, requesting that a mobile re-powering unit be dispatched to rendezvous with the vehicle and recharge the one or more energy storage devices, running the one or more energy storage devices in a mode that causes degradation of the one or more energy storage devices or that causes the one or more energy storage devices to decrease below a determined empty charge level of the one or more energy storage devices, initiating a fuel consuming motor to generate power to either aid in propulsion of the vehicle or to recharge the one or more energy storage devices, selecting a route to travel through the unpowered segment that, while different from the main route, is traversable with the amount of energy in the one or more energy storage devices, controlling the vehicle to draft or mechanically couple to another vehicle to lower a power consumption requirement so that the unpowered segment can be traversed with an amount of remaining power stored in the one or more energy storage devices, and/or controlling the vehicle to gain momentum or to generate an overcharge on the one or more energy storage devices during movement in the first powered segment that is sufficient to traverse the non-powered segment.

In one embodiment, a control system includes a controller for a motorized vehicle having one or more energy storage devices that power one or more motors of the vehicle and that receive electric current from one or more of a catenary or an electrified portion of a route while the vehicle travels over powered segments of the route. The controller is configured to control operation of the vehicle during movement of the vehicle and to determine that the one or more energy storage devices have insufficient stored electric energy to power the one or more motors to propel the vehicle through an unpowered segment of the route that does not have the catenary or electrified portion of the route for supplying the electric current to the one or more energy storage devices. The controller is configured to change the operation of the vehicle to ensure that the vehicle can travel completely through the unpowered segment of the route by at least one of: switching which of the one or more energy storage devices powers the one or more motors, changing a speed of the vehicle, changing a torque of the one or more motors, changing the route traveled by the vehicle, reducing how many of the one or more motors is propelling the vehicle, requesting a recharging vehicle provide additional electric current to the one or more energy storage devices, drawing the electric current from the one or more energy storage devices to a level below a lower limit of the one or more energy storage devices, activating a fuel-consuming motor of the vehicle to propel the vehicle, activating the fuel-consuming motor of the vehicle to charge the one or more energy storage devices, moving the vehicle to draft or mechanically couple to another vehicle, and/or controlling the vehicle to gain momentum or to generate an overcharge on the one or more energy storage devices during movement prior to entering the unpowered segment of the route.

In one embodiment, a method includes determining whether one or more energy storage devices of a motorized vehicle have enough stored energy to power one or more motors of the vehicle and propel the vehicle through an unpowered segment of a route that does not have a catenary or an electrified rail to power the one or more motors or charge the one or more energy storage devices, and, responsive to determining that the one or more energy storage devices do not have enough stored energy to propel the vehicle through the unpowered segment of the route, one or more of: switching which of the one or more energy storage devices powers the one or more motors, changing a speed of the vehicle, changing a torque of the one or more motors, changing the route traveled by the vehicle, reducing how many of the one or more motors is propelling the vehicle, requesting a recharging vehicle provide additional electric current to the one or more energy storage devices, drawing the electric current from the one or more energy storage devices to a level below a lower limit of the one or more energy storage devices, activating a fuel-consuming motor of the vehicle to propel the vehicle, activating the fuel-consuming motor of the vehicle to charge the one or more energy storage devices, moving the vehicle to draft or mechanically couple to another vehicle, and/or controlling the vehicle to gain momentum or to generate an overcharge on the one or more energy storage devices during movement prior to entering the unpowered segment of the route.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
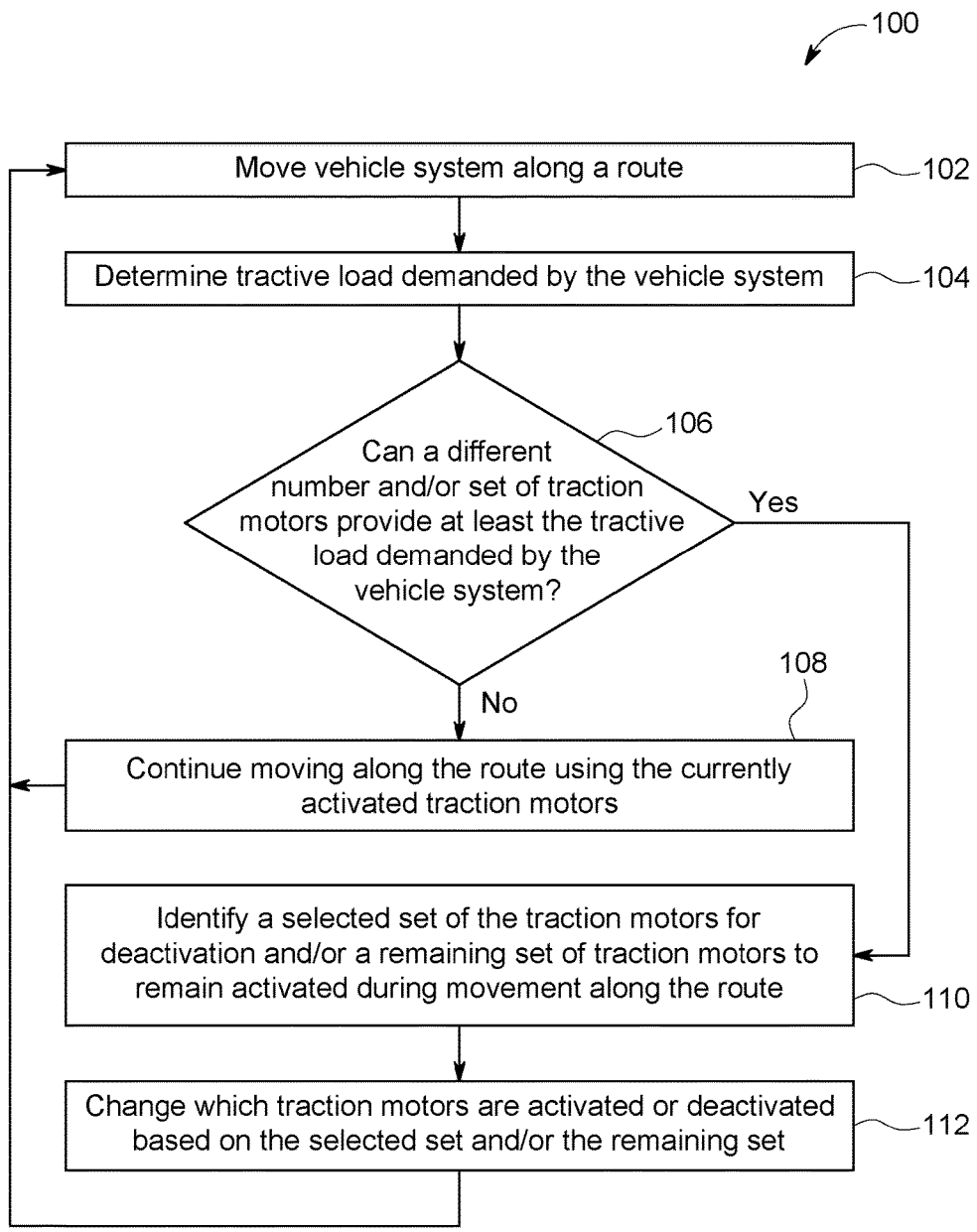
FIG. 1 is a flowchart of a method for operating a vehicle traction control system of a vehicle system during movement of the vehicle system according to one embodiment.

One or more embodiments described herein provide systems and methods for individually controlling which traction motors in a vehicle having multiple traction motors are activated or deactivated at different times during movement of the vehicle. The different traction motors of the vehicle can be operably coupled with different axles and/or wheel sets of the vehicle such that the activated traction motors work to rotate the axles and/or wheel sets to propel the vehicle while the deactivated traction motors do not work to rotate the axles and/or wheel sets. The vehicle can be included in a larger vehicle system having one or more other vehicles connected with each other, such as a vehicle consist. During movement along a route, a tractive load demanded to propel the vehicle system along the route can be determined. This tractive load can be compared to the capabilities of the traction motors to produce tractive effort. If fewer than all of the traction motors in a vehicle can be activated and still provide at least the tractive load demanded by the vehicle system (or at least the portion of the tractive load that is attributable to the vehicle), then one or more of the traction motors may be deactivated while the remaining traction motors in the vehicle remain activated. The selection of which traction motors in a vehicle are activated or deactivated can change over time based on changes in the tractive load demanded by the vehicle system to propel the vehicle system. In one aspect, the selection of which traction motors are activated or deactivated is performed based at least in part in operating temperatures of the traction motors. For example, the traction motors having larger operating temperatures than one or more other traction motors may be selected for deactivation.

The systems and methods described herein operate according to a strategy to channel horsepower produced by traction motors more efficiently than currently known systems and methods. In conditions where the vehicle system has lesser tractive loads demanded to propel the vehicle system (e.g., light load conditions, such as when a locomotive is lightly loaded with a light train or an empty train, fast moving speeds during lower throttle notches, etc.), the traction motors may underloaded, and may not be operating in an efficient manner. Under such conditions, by turning off one or more traction motors, the load on the other traction motors may increase. Instead of underloading the traction motors, it can be possible to increase the load on the traction motors to or near the rated values of the traction motors by deactivating other traction motors. The load can be increase to or near the rated values of the traction motors when the load is increased to be equivalent to or within a designated range (e.g., 1%, 5%, 10%, or the like) of the rated capacities of the traction motors. In one aspect, the rated capacity of a traction motor may be the maximum power rating of the traction motor, or a designated limit of the power output of the traction motor other than the maximum power rating (e.g., 60%, 70%, 80%, 90%, or the like, of the maximum power rating).

Changing the loading of the traction motors can lead to improved operating efficiencies without sacrificing performance and, as a result, energy consumption can be reduced (such as by at least 1%) relative to not changing the loading of the traction motors. For example, if the same vehicle system travels over the same routes during the same conditions between the same locations during a first trip where all traction motors remain activated during the entire trip and during a different, second trip where the traction motors are selectively activated or deactivated during movement in the trip, the vehicle system may consume at least 1% less energy during the second trip than during the first trip.

Figure 2:
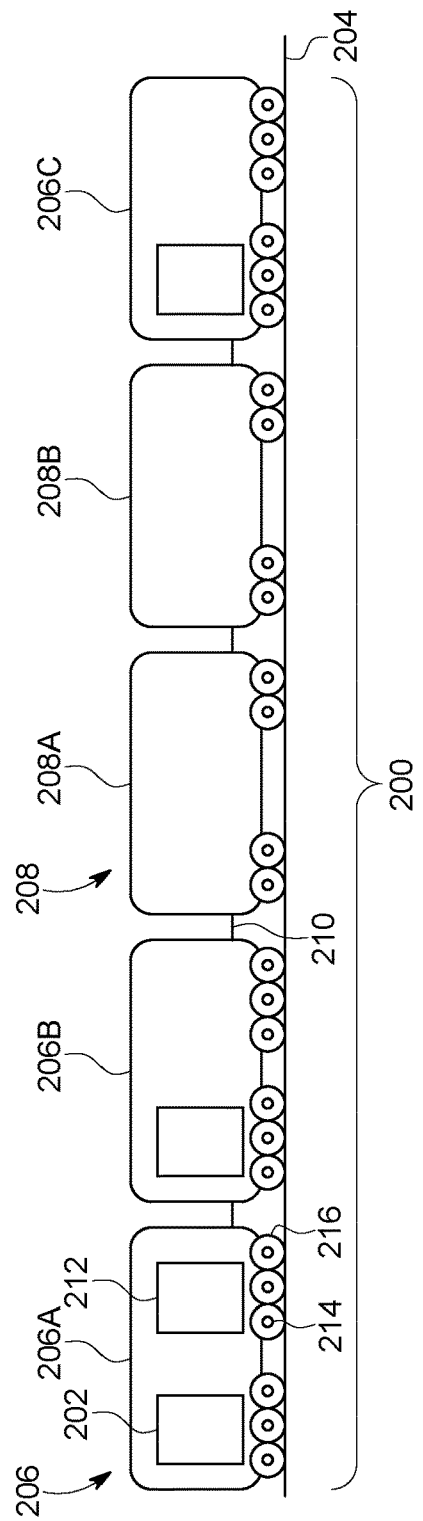
FIG. 2 is a schematic diagram of a vehicle system having a traction control system according to one embodiment.

FIG. 1 is a flowchart of a method 100 for operating a vehicle traction control system of a vehicle system during movement of the vehicle system according to one embodiment. FIG. 2 is a schematic diagram of a vehicle system 200 having a traction control system 202 according to one embodiment. The method 100 may be performed by one or more embodiments of the traction control system 202. For example, one or more processors of the vehicle system 200 can perform the operations of the method 100. At 102, the vehicle system 200 moves along a route 204 (shown in FIG. 2). The vehicle system 200 represents a vehicle consist, such as a rail vehicle consist, having propulsion-generating vehicles 206 (e.g., vehicles 206A-C) and non-propulsion-generating vehicles 208 (e.g., vehicles 208A-B) mechanically coupled together by couplers 210. While the description herein focuses on the vehicle system 200 being a rail vehicle consist (e.g., a train) having locomotives as the vehicles 206 and railcars as the vehicles 208, alternatively, one or more embodiments described herein may be applied to other types of vehicle consists and/or vehicles, such as other off-highway vehicles (e.g., mining vehicles or other vehicles that are not designed or permitted for travel on public roadways), marine vessels, automobiles, or the like. The vehicles in the consist can be mechanically coupled with each other to travel together along one or more routes as the system 200, or alternatively may not be mechanically coupled with each other, but may be logically coupled with each other to travel together along the one or more routes. For example, the vehicles can communicate with each other to coordinate the tractive and/or braking efforts generated by the vehicles so that the vehicles travel together.

The vehicles 206 include propulsion systems 212 comprising several traction motors (shown and described below) operably coupled with different axles 214 and/or wheels 216 of the vehicles 206. The traction motors may be connected with the axles 214 and/or wheels 216 via one or more gears, gear sets, or other mechanical devices to transform rotary motion generated by the traction motors into rotation of the axles 214 and/or wheels 216 to propel the vehicles 206 and, consequently, the vehicle system 200. Different traction motors may be operably connected with different axles 214 and/or wheels 216 such that traction motors that are deactivated (e.g., turned OFF) do not rotate corresponding axles 214 and/or wheels 216 while traction motors that remain activated (e.g., turned ON) rotate corresponding axles 214 and/or wheels 216.

Returning to the description of the method 100 shown in FIG. 1, at 104, a tractive load demanded by the vehicle system 200 is determined. The tractive load demanded by the vehicle system 200 can represent the amount of tractive effort or power (e.g., horsepower) that is calculated as being necessary to propel the vehicle system 200 over an upcoming segment of the route 204. The tractive load demanded by the vehicle system 200 can be calculated based on a variety of factors, such as the size of the vehicle system 200 (e.g., the weight, mass, length, or the like, of the vehicle system 200), the curvature of the route 204, the grade of the route 204, weather conditions (e.g., wind direction, wind speed, precipitation, ambient temperature, or the like), adhesion of the wheels 216 to the route 204, locations of the vehicles 206 in the vehicle system 200, or the like. For example, as the size of the vehicle system 200 increases, a radius of curvature of the route 204 decreases, the grade of the route 204 increases, the weather conditions become more adverse (e.g., headwinds become stronger), adhesion increases, or the like, then the tractive load demanded may increase. Conversely, as the size of the vehicle system 200 decreases, a radius of curvature of the route 204 increases, the grade of the route 204 decreases, the weather conditions become less adverse, adhesion decreases, or the like, then the tractive load demanded may decrease. The tractive load demanded may be calculated from one or more mathematical or physics-based models of the vehicle system 200 and the route 204, and/or may be based on previous trips of the vehicle system 200 and/or another vehicle system 200 along the route 204.

In one aspect, the tractive load demanded by the vehicle system 200 can be determined independent of the location of the vehicle system 200. For example, instead of determining how much tractive effort is needed at various locations along the route to propel the vehicle system 200, monitoring locations of the vehicle system 200, and then determining the tractive load demanded by the vehicle system 200 as a function of location, the tractive load demanded by the vehicle system 200 may be determined based at least in part on the current movement of the vehicle system 200 at a current location of the vehicle system 200. If the vehicle system 200 is traveling slower than a designated speed (e.g., a speed limit of the route, a speed selected by an onboard operator, a speed dictated by a trip plan or speed profile that designates speeds as a function of time and/or distance along the route, or the like), then the tractive load demanded by the vehicle system 200 can increase. Conversely, if the vehicle system 200 is traveling faster than the designated speed, then the tractive load demanded by the vehicle system 200 can decrease.

At 106, a determination is made as to whether a different number and/or set of the traction motors in one or more of the vehicles 206 of the vehicle system 200 can be activated to provide at least the tractive load demanded by the vehicle system 200. For example, if all traction motors of the vehicles 206 in the vehicle system 200 are activated and generating tractive force to propel the vehicle system 200, then a determination may be made as to whether a lesser number of the traction motors can be activated (with one or more traction motors being turned off), while still generating at least enough tractive force to provide the tractive load demanded by the vehicle system 200.

If the currently activated traction motors are needed to remain activated to produce at least the tractive load demanded by the vehicle system 200, then it may not be possible to deactivate one or more of the traction motors while still generating at least the tractive load demanded by the vehicle system 200. As a result, flow of the method 100 can proceed to 108. At 108, the currently activated traction motors remain activated to continue generating at least the tractive effort demanded by the vehicle system 200. The vehicle system 200 can continue moving along the route using the same activated traction motors, and flow of the method 100 can return to 102.

On the other hand, if one or more traction motors can be deactivated while the remaining traction motors remain on to propel the vehicle system 200 by providing at least the tractive load demanded by the vehicle system 200, then flow of the method 100 can proceed to 110. For example, a selected set of one or more traction motors may be deactivated, but the tractive force provided by the remaining traction motors (that remain activated) may be increased so that the summed output of the remaining, activated traction motors at least meets the demanded tractive load.

At 110, a selected set of one or more traction motors is identified for deactivation, and/or a remaining set of one or more traction motors is identified to be activated (e.g., if the motors are currently deactivated) and/or is identified to remain activated. The identification of which motors to activate and which to deactivate can occur during movement of the vehicle system 200 along the route.

The traction motors can be identified for deactivation and/or for activation based on at least in part on actual output capabilities of the traction motors, rated capacities of the traction motors, operating temperatures of the traction motors, or the like. The actual output capabilities represent how much tractive effort or force that the traction motors are actually able to generate. Due to age, damage, or the like, the amount of tractive effort or force that a traction motor is able to generate can decrease over time. The decreasing abilities of the traction motors can be used to determine which traction motors to select for activation or deactivation. For example, newer and/or less damaged traction motors may be selected for activation to provide larger demanded traction loads of the vehicle system relative to older and/or more damaged traction motors.

The rated capacities of the traction motors can represent designated limits on the amount of tractive effort or force provided by the traction motors. The rated capacities can represent power ratings of the motors, such as the amount of watts, horsepower, or the like, that the motors are designed and/or designated to provide. The rated capacities may not represent the maximum power outputs that the motors are capable of generating, but may instead be less than the maximum power outputs. Alternatively, the rated capacities can represent the largest power outputs that the motors are able to generate. The selection of which motors to activate and/or which motors to deactivate may be made based on the rated capacities by selecting those motors having combined rated capacities that meet or exceed the tractive load demanded by the vehicle system 200.

The operating temperatures of the traction motors represent the temperatures at which the traction motors are operating. The operating temperatures may not represent the ambient temperature or the temperature around the motors, but instead may represent how hot the motors are. The traction motors may be selected for activation and/or deactivation based at least in part on the operating temperatures of the traction motors to avoid overheating and/or damaging the motors. For example, if the operating temperature of a motor is at or above a designated upper temperature limit, then that motor may be selected for deactivation and/or may be excluded from being selected for activation. As another example, if the operating temperature of the motor is at or below a designated lower temperature limit, then that motor may be selected for activation and/or excluded from being selected for deactivation. The operating temperatures of the traction motors may be monitored over time to ensure that the traction motors do not overheat. If the operating temperatures of some traction motors become too large, then those traction motors may be selected for deactivation and deactivated while the vehicle system 200 is moving to allow the traction motors to cool down. One or more of these traction motors may later be selected for activation responsive to the operating temperatures of the one or more traction motors decreasing to or below a limit, such as the lower temperature limit.

In one aspect, the traction motors that are selected for deactivation may all be on a single vehicle of the vehicle system. For example, a subset of the traction motors on a first vehicle in the vehicle system may be selected for deactivation, while the remaining traction motor or motors in the first vehicle may not be selected for deactivation and the traction motors on other vehicles in the vehicle system are not selected for deactivation. In another aspect, the traction motors that are selected for deactivation may span across multiple different vehicles in the same vehicle system. For example, the set of the traction motors that is selected for deactivation may include at least one traction motor of a first vehicle and at least one traction motor of a second vehicle in the same vehicle system, while one or more other traction motors of the first vehicle and one or more other traction motors of the second vehicle are not selected for deactivation.

At 112, the traction motors that were selected for deactivation are deactivated and/or the traction motors that were selected for activation are activated. For example, if a first and third traction motor of one vehicle 206A are selected for deactivation, a second and third traction motor of another vehicle 206B are selected for deactivation, and a fifth traction motor of another vehicle 206C are selected for deactivation, then those traction motors may be turned off while the vehicle system 200 moves along the route. Optionally, one or more deactivated traction motors may be turned on while the vehicle system 200 moves along the route.

Flow of the method 100 can return to 102 so that the vehicle system 200 continues to move along the route, and the determination of the tractive load demanded by the vehicle system 200, the determination of whether a different number and/or set of traction motors may be used to provide at least the tractive load demanded, the identification of which traction motors to activate and/or deactivate, and the activation and/or deactivation of the traction motors can be repeated one or more times during movement of the vehicle system 200. For example, at one or more times when the tractive load demanded by the vehicle system 200 changes, the identification and/or deactivation of one or more traction motors can be repeated so that the traction motors in the vehicle system 200 are not generating significantly more or less tractive effort than what is needed to meet the tractive load demanded by the vehicle system 200.

In one aspect, operating states of the traction motors that are selected for activation or that are not deactivated can be modified by increasing the tractive effort provided by these traction motors. For example, in a vehicle 206, if two of six traction motors are deactivated and the other four traction motors are activated, then the tractive effort generated by the activated traction motors can be increased. The tractive effort can be increased in order to meet the tractive load demanded by the vehicle system 200. In one embodiment, the output of the traction motors can be increased to or above one or more limits, such as by increasing the power output of the traction motors to or above the rated capacities of the traction motors. For example, if the activated traction motors do not have sufficiently large rated capacities to meet or exceed the tractive load demanded by the vehicle system 200, then one or more of the traction motors may be operated above the rated capacities of the one or more traction motors such that the total output of the activated traction motors is at least as large as the tractive load demanded by the vehicle system 200.

Figure 3:
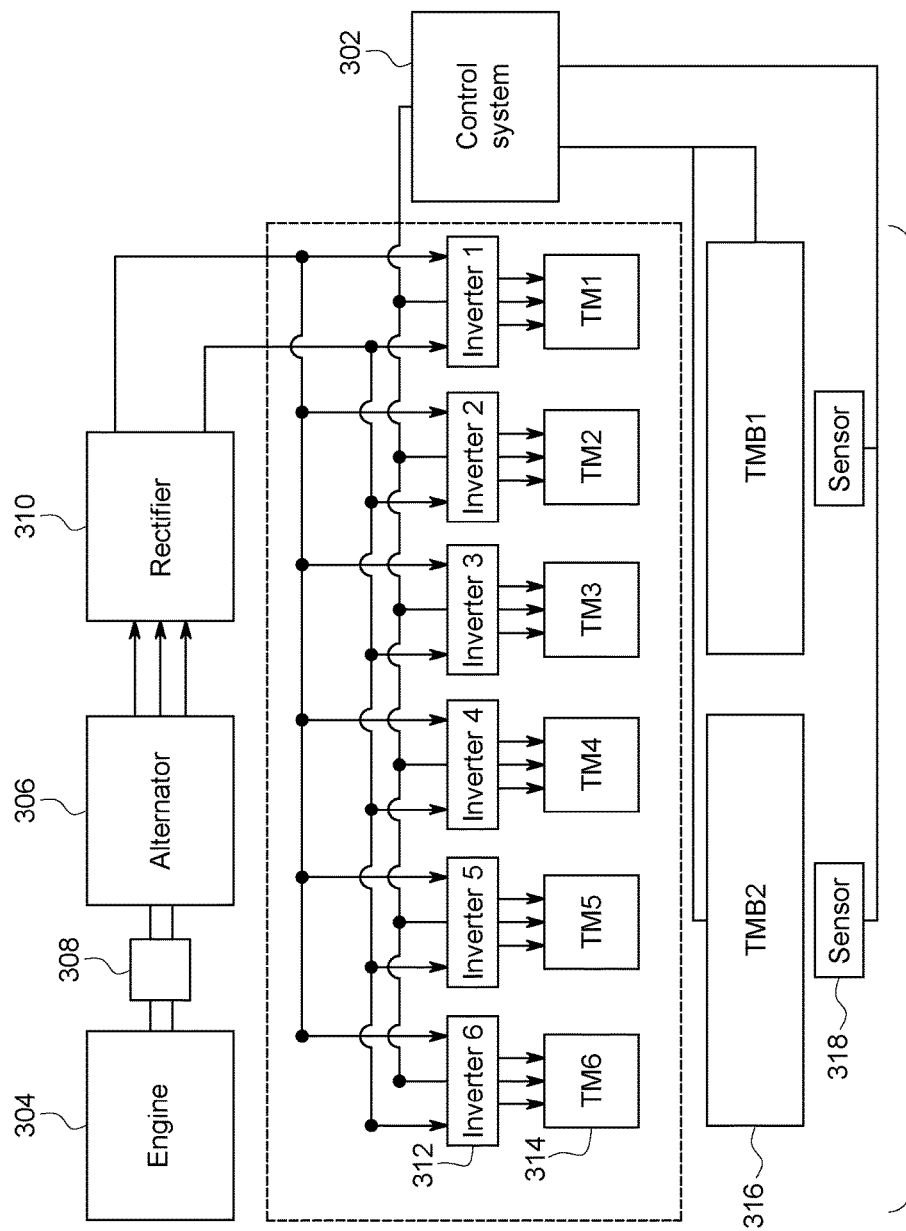
FIG. 3 illustrates a circuit diagram of a propulsion system and a traction control system according to one embodiment.

FIG. 3 illustrates a circuit diagram of a propulsion system 300 and a traction control system 302 according to one embodiment. The propulsion system 300 can represent one or more of the propulsion systems 212 shown in FIG. 2 and the control system 302 can represent the control system 202 shown in FIG. 2. The propulsion system 300 includes one or more engines 304 that are operably connected with an alternator or generator 306 ("Alternator" in FIG. 3) by one or more shafts 308. The engine 304 rotates the shaft 308 to cause the alternator or generator 306 to generate electric current. This electric current is supplied to a rectifier 310, which then supplies the current to several inverters 312 ("Inverter 1," "Inverter 2," "Inverter 3," "Inverter 4," "Inverter 5," and "Inverter 6" in FIG. 3). The inverters 312 are connected with different traction motors 314 ("TM1," "TM2," "TM3," "TM4," "TM5," and "TM6" in FIG. 3) in the illustrated embodiment. The inverters 312 also are operably connected with the control system 302. The control system 302 can control which traction motors 314 are activated or deactivated, and/or the operating state of the traction motors 314, via control signals that are communicated to the inverters 312. For example, the control system 302 can communicate different control signals to different inverters 312 via one or more wired and/or wireless connections to individually control which ones of the inverters 312 activate the corresponding traction motors 314, which inverters 312 deactivate corresponding traction motors 314, the current supplied from the inverters 312 to the corresponding traction motors 314 (e.g., to control the power outputs from the traction motors 314), or the like.

Several traction motor blowers 316 ("TMB1" and "TMB2" in FIG. 3) represent fans that move air toward the traction motors 314 in order to cool the traction motors 314. One traction motor blower 316 may cool several traction motors 314 in one embodiment. The speeds at which the traction motor blowers 316 operate may be controlled via control signals communicated from the control system 302 to the traction motor blowers 316. Several temperature sensors 318 sense or measure the operating temperatures of the traction motors 314 and generate data representative of the operating temperatures of the traction motors 314. This data can be communicated to the control system 302. As described above, the control system 302 can at least partially base the selection of which traction motors 314 to turn ON or OFF based on the operating temperatures of the traction motors 314.

As described above, the control system 302 can deactivate one or more traction motors 314 and optionally increase the operating state of one or more other traction motors 314 so that the combined power output of the activated traction motors 314 meets or exceeds the tractive load demanded by the vehicle system 200. Doing so can increase the efficiency of the propulsion system 300 relative to propelling the vehicle system 200 with a larger number of activated traction motors 314.

Figure 4:
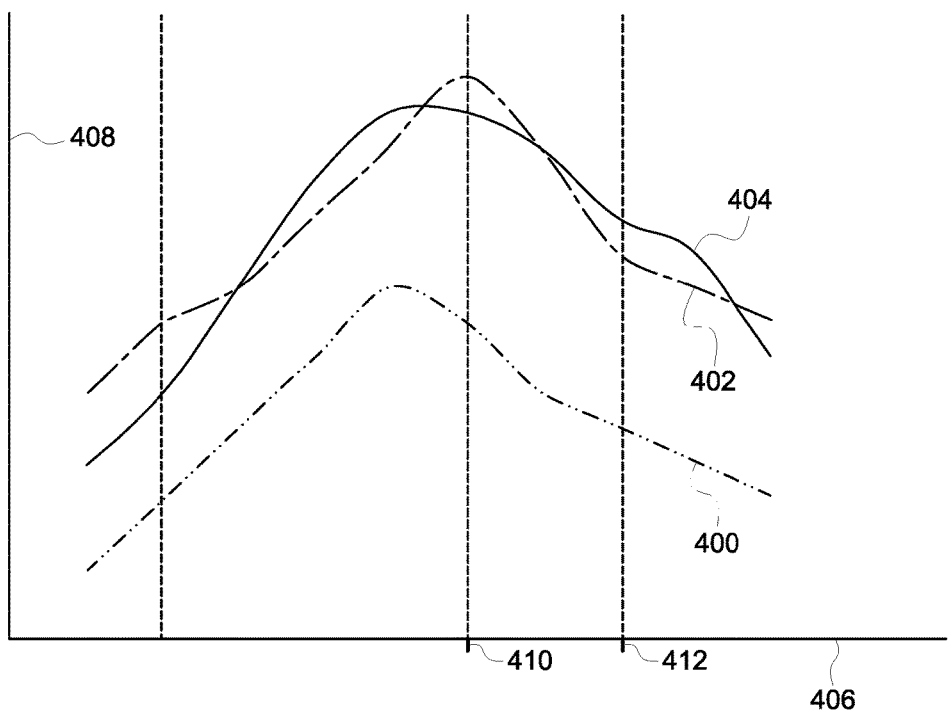
FIG. 4 illustrates efficiency indices of different operating states of traction motors shown in FIG. 3 of a propulsion-generating vehicle shown in FIG. 2 according to one example.

FIG. 4 illustrates efficiency indices 400, 402, 404 of different operating states of traction motors 314 (shown in FIG. 3) of a propulsion-generating vehicle 206 (shown in FIG. 2) according to one example. The efficiency indices 400, 402, 404 are shown alongside a horizontal axis 406 representative of moving speeds of the vehicle 206 and alongside a vertical axis 408 representative of efficiencies of the vehicle 206. The efficiency indices 400, 402, 404 represent how efficiently the propulsion system 300 of the vehicle 206 operate with different numbers of traction motors 314 being activated. The efficiency index 400 represents the efficiency of the propulsion system 300 operating with all six traction motors 314 being activated at different speeds of the vehicle 206. The efficiency index 402 represents the efficiency of the propulsion system 300 operating with five traction motors 314 being activated and one traction motor 314 being deactivated at different speeds of the vehicle 206. The efficiency index 404 represents the efficiency of the propulsion system 300 operating with four traction motors 314 being activated and two traction motors 314 being deactivated at different speeds of the vehicle 206. The efficiency indices 400, 402, 404 can be measured or calculated based on losses in electric current that is generated by the alternator or generator 306 (shown in FIG. 3), but that is not converted into tractive effort by one or more traction motors 314. For example, larger efficiency indices 400, 402, 404 at a particular speed indicate that less electric current is lost and not being converted into tractive effort relative to smaller efficiency indices 400, 402, 404 at the same speed.

As shown in FIG. 4, for a particular route and at a speed of the vehicle 206, there are three options for which traction motors 314 are turned on or off (e.g., no traction motors 314 being deactivated, as represented by the indices 400; one traction motor 314 being deactivated, as represented by the indices 402; or two traction motors 314 being deactivated, as represented by the indices 404). The option that provides the largest or a larger efficiency may be selected. For example, at a first speed 410, one traction motor 314 may be turned off while the remaining five traction motors 314 remain on. But, at a faster, second speed 412, two traction motors 314 may be turned off while four traction motors 314 remain on to provide for increased efficiency of the vehicle 206 (relative to another combination of traction motors 314 being turned off).

The efficiency at which a vehicle 206 and/or the vehicle system 200 operates also may be increased by reducing the amount of electric current that is consumed by the traction motor blowers 316. For example, the electric power consumed by a traction motor blower 316 when the traction motor blower 316 is operating at full speed is approximately eight times the electric power consumed by the same traction motor blower 316 operating at half speed. In order to reduce the amount of electric current consumed (and thereby increase the efficiency in which the vehicle 206 and/or vehicle system 200 operates), the control system 302 optionally can reduce the operating speeds of the traction motor blowers 316. In one embodiment, the control system 302 turns off the traction motor blowers 316 that work to cool the traction motors 314 that are turned off, and/or reduces the operating speed (e.g., the speed at which the traction motor blower 316 operates to move air to cool the traction motors 314) of the traction motor blowers 316 that remain on to cool the traction motors 314 that remain on. Doing so can further increase the efficiency at which the vehicle 206 and/or vehicle system 200 operates. Increasing the efficiency of the vehicle 206 and/or vehicle system 200 can reduce the amount of fuel consumed by the vehicle 206 and/or vehicle system 200.

Figure 5:
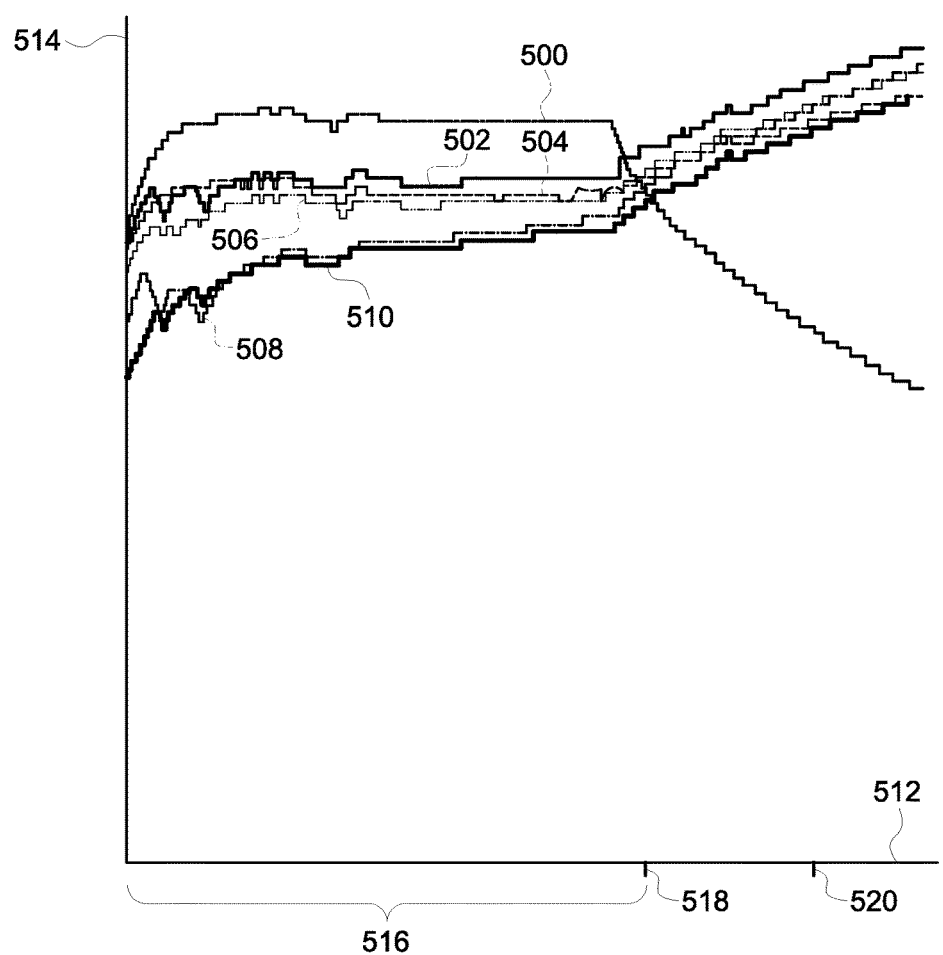
FIG. 5 illustrates operating temperatures of traction motors shown in FIG. 3 according to one example of operation of the propulsion system shown in FIG. 3.

FIG. 5 illustrates operating temperatures 500, 502, 504, 506, 508, 510 of traction motors 314 according to one example of operation of the propulsion system 300 shown in FIG. 3. The operating temperatures 500, 502, 504, 506, 508, 510 are shown alongside a horizontal axis 512 representative of time and a vertical axis 514 representative of temperatures. During a first time period 516, all six of the traction motor blowers 316 shown in FIG. 3 are active to work to cool corresponding ones of the traction motors 314. At a deactivation time 518, one of the traction motor blowers 316 is turned off and the remaining traction motor blowers 316 are operated at a reduced speed (e.g., at half of a previous operating speed or at half of the rated maximum speed of the traction motor blowers 316).

Subsequent to the deactivation time 518, the operating temperatures 502, 504, 506, 508, 510 of the traction motors 314 that are cooled by the traction motor blower 316 that is on (but operating at reduced speeds) gradually increase over time. The operating temperatures 502, 504, 506, 508, 510 may increase because a reduced airflow is generated by the traction motor blowers 316 to cool the traction motors 314 that are still on. The operating temperatures 500 of the traction motor 314 that is deactivated may decrease following the deactivation time 518 because the traction motor 314 is no longer active.

The control system 302 can monitor the operating temperatures 500, 502, 504, 506, 508, 510 and at least partially base the decision of whether to turn off one or more traction motors 314 and/or which traction motors 314 are to be turned off on the operating temperatures 500, 502, 504, 506, 508, 510. For example, at a later decision time 520, the control system 302 may examine determine that one traction motor 314 can be turned off and can examine the operating temperatures 500, 502, 504, 506, 508, 510 to determine which traction motor 314 to turn off. The control system 302 may select one or more of the traction motors 314 corresponding to the operating temperatures 502, 504, and/or 506 for turning off because these traction motors 314 exhibit the largest operating temperatures 502, 504, 506. The control system 302 may turn off one or more of these traction motors 314 and turn on the deactivated traction motor 314. For example, if only a single traction motor 314 is to be turned off to still provide the tractive load demanded by the vehicle system 200, then the control system 302 may decide to turn off the two traction motors 314 having the operating temperatures 502, 504 and to turn on the traction motor 314 having the reduced operating temperature 500.

In one embodiment, a method (e.g., for operating a vehicle traction control system of a vehicle system during movement of the vehicle system) includes, during movement of a vehicle system along a route, determining a tractive load demanded by the vehicle system to propel the vehicle system along the route. The vehicle system includes a propulsion-generating vehicle having plural individually controllable traction motors. The method also can include identifying a first selected set of the traction motors for deactivation during the movement of the vehicle system along the route based at least in part on the tractive load demanded by the vehicle system, and deactivating the traction motors in the first selected set while at least one of the traction motors in a first remaining set of the traction motors continues to generate tractive effort to propel the vehicle system. One or more of the operations of the method (e.g., the determining of a tractive load demanded by the vehicle system, identifying the first selected set of the traction motors, and/or deactivating the traction motors) may be performed by one or more processors disposed onboard the vehicle system.

In one aspect, the tractive load demanded by the vehicle system is determined independent of a location of the vehicle system.

In one aspect, deactivating the traction motors in the first selected set occurs at a first time during movement of the vehicle system along the route. The method also can include re-determining the tractive load demanded by the vehicle system during movement of the vehicle system, re-identifying a different, second selected set of the traction motors for deactivation during movement of the vehicle system, and deactivating the traction motors in the second selected set at a later, second time while at least one of the traction motors in a different, second remaining set of the traction motors continues to generate the tractive effort to propel the vehicle system.

In one aspect, the traction motors are operably coupled with different axles of the propulsion-generating vehicle such that deactivating the traction motors in the first selected set causes the axles to which the traction motors in the first selected set are operably coupled to no longer be rotated by the traction motors.

In one aspect, one or more of determining the tractive load or identifying the first selected set is performed onboard the vehicle system.

In one aspect, the method also can include increasing the tractive effort generated by the at least one of the traction motors in the first remaining set.

In one aspect, increasing the tractive effort can include increasing an operating state of the at least one of the traction motors in the first remaining set to a rated capacity of the at least one of the traction motors.

In one aspect, identifying the first selected set of the traction motors for deactivation includes monitoring operating temperatures of the traction motors.

In one aspect, the method also includes decreasing an operating speed of one or more traction motor blowers to reduce airflow produced by the one or more traction motor blowers to cool the traction motors in the first remaining set.

In one aspect, deactivating the traction motors in the first selected set occurs at a first time during movement of the vehicle system along the route. The method also can include switching, at a later, second time, which of the traction motors are included in the first selected set for deactivation and which of the traction motors are included in the first remaining set based at least in part on operating temperatures of the traction motors.

In another embodiment, a system (e.g., a traction control system) includes one or more processors configured to be disposed onboard a vehicle system and to determine, during movement of the vehicle system along a route, a tractive load demanded by the vehicle system to propel the vehicle system. The vehicle system includes a propulsion-generating vehicle having plural individually controllable traction motors. The one or more processors also are configured to identify a first selected set of the traction motors for deactivation during movement of the vehicle system along the route based at least in part on the tractive load demanded by the vehicle system and to deactivate the traction motors in the first selected set while at least one of the traction motors in a first remaining set of the traction motors continues to generate tractive effort to propel the vehicle system.

In one aspect, the one or more processors are configured to determine the tractive load demanded by the vehicle system independent of a location of the vehicle system.

In one aspect, the one or more processors are configured to deactivate the traction motors in the first selected set at a first time during movement of the vehicle system along the route. The one or more processors can be configured to re-determine the tractive load demanded by the vehicle system during movement of the vehicle system, re-identify a different, second selected set of the traction motors for deactivation during movement of the vehicle system, and to deactivate the traction motors in the second selected set at a later, second time while at least one of the traction motors in a different, second remaining set of the traction motors continues to generate the tractive effort to propel the vehicle system.

In one aspect, the traction motors are operably coupled with different axles of the propulsion-generating vehicle. The one or more processors can be configured to deactivate the traction motors in the first selected set to cause the axles to which the traction motors in the first selected set are operably coupled to no longer be rotated by the traction motors.

In one aspect, the one or more processors are configured to one or more of determine the tractive load or identify the first selected set while the one or more processors are disposed onboard the vehicle system.

In one aspect, the one or more processors are configured to increase the tractive effort generated by the at least one of the traction motors in the first remaining set.

In one aspect, the one or more processors are configured to increase the tractive effort by increasing an operating state of the at least one of the traction motors in the first remaining set to a rated capacity of the at least one of the traction motors.

In another embodiment, another system (e.g., another traction control system) includes one or more processors configured to monitor tractive loads demanded to propel a vehicle system along a route as the vehicle system moves along the route. The one or more processors are configured to identify one or more traction motors of a vehicle in the vehicle system to turn off based at least in part in a change in the tractive loads demanded to propel the vehicle system. The one or more processors are configured to generate control signals to turn off the one or more traction motors while one or more other traction motors remain on to generate tractive forces that meet or exceed the tractive loads demanded to propel the vehicle system during movement of the vehicle system along the route.

In one aspect, the one or more processors also are configured to identify which ones of the one or more traction motors to turn off based at least in part on operating temperatures of the one or more traction motors.

In one aspect, the one or more processors also are configured to reduce an operating speed of one or more traction motor blowers that cool the one or more other traction motors that remain on responsive to turning off the one or more traction motors.

In another embodiment, another method (e.g., for controlling a traction control system) includes, during movement of a vehicle system along a route, determining a tractive load demanded by the vehicle system to propel the vehicle system along the route. The vehicle system includes a first propulsion-generating vehicle having a first plurality of individually controllable traction motors and a second propulsion-generating vehicle having a second plurality of individually controllable traction motors. The first and second vehicles are linked to travel together along the route. The method also includes identifying a first selected set of the first plurality of traction motors for deactivation during movement of the vehicle system along the route based at least in part on the tractive load demanded by the vehicle system, deactivating the traction motors in the first selected set while at least one of the traction motors in a first remaining set of the first plurality of traction motors continues to generate tractive effort to propel the vehicle system, identifying a second selected set of the second plurality of traction motors for deactivation during movement of the vehicle system along the route based at least in part on the tractive load demanded by the vehicle system, and deactivating the traction motors in the second selected set while at least one of the traction motors in a second remaining set of the second plurality of traction motors continues to generate tractive effort to propel the vehicle system.

In one aspect, the method also can include identifying a third selected set of one or more of the traction motors in the first plurality of traction motors of the first propulsion-generating vehicle and one or more of the traction motors in the second plurality of traction motors of the second propulsion-generating vehicle, and deactivating the traction motors in the third selected set while at least one of the traction motors in the first propulsion-generating vehicle and at least one of the traction motors in the second propulsion-generating vehicle continue to generate the tractive effort to propel the vehicle system.

In another embodiment, another system (e.g., another traction control system) includes one or more processors configured to be disposed onboard a vehicle system and to determine, during movement of the vehicle system along a route, determine a tractive load demanded by the vehicle system to propel the vehicle system along the route. The vehicle system includes a first propulsion-generating vehicle having a first plurality of individually controllable traction motors and a second propulsion-generating vehicle having a second plurality of individually controllable traction motors, the first and second vehicles being linked to travel together along the route. The one or more processors also are configured to identify a first selected set of the first plurality of traction motors for deactivation during movement of the vehicle system along the route based at least in part on the tractive load demanded by the vehicle system, and to deactivate the traction motors in the first selected set while at least one of the traction motors in a first remaining set of the first plurality of traction motors continues to generate tractive effort to propel the vehicle system. The one or more processors also are configured to identify a second selected set of the second plurality of traction motors for deactivation during movement of the vehicle system along the route based at least in part on the tractive load demanded by the vehicle system, and to deactivate the traction motors in the second selected set while at least one of the traction motors in a second remaining set of the second plurality of traction motors continues to generate tractive effort to propel the vehicle system.

In one aspect, the one or more processors are configured to identify a third selected set of one or more of the traction motors in the first plurality of traction motors of the first propulsion-generating vehicle and one or more of the traction motors in the second plurality of traction motors of the second propulsion-generating vehicle, and to deactivate the traction motors in the third selected set while at least one of the traction motors in the first propulsion-generating vehicle and at least one of the traction motors in the second propulsion-generating vehicle continue to generate the tractive effort to propel the vehicle system.

One or more embodiments of the inventive subject matter described herein relate to systems for powering and controlling electric vehicles. According to one aspect, a wayside electrical power distribution system ("wayside" referring to being accessible by electric vehicles, such as positioned along a vehicle route) includes plural spaced-apart wayside stations, each configured to provide electrical power to electric vehicles. The wayside stations include vehicle interface equipment for interfacing with vehicle systems, to convey power to vehicles operably linked with the interface equipment, and one or more power transfer systems for sourcing electrical energy for supplying to vehicles. The sources of electrical power (to which the power transfer system(s) are at least occasionally linked) may include one or more of: electrical power received from vehicles (e.g., electric current used by a first locomotive being received from a second locomotive in the same vehicle consist or a different vehicle consist); electrical power received from other wayside stations; electrical power received from an energy storage device of the wayside station; and electrical power received from non-vehicle external sources, such as remote energy storage devices, utility grids, local renewable power sources or other local power generation sources, and wide area renewable power sources or other wide area power generation sources.

The electric vehicles may be electric rail vehicles (e.g., locomotives, other freight or passenger rail vehicles, or rail-based ore carts or other mining equipment), other electric off-highway vehicles (e.g., electric mine haul trucks or heavy construction equipment), electric marine vessels, or other electric vehicles generally. As used herein, "electric vehicle" refers to a vehicle that uses electrical power for propulsion purposes, at least in one mode of operation. Thus, electric vehicles include all-electric vehicles (e.g., a vehicle with a traction motor and only an onboard electrical energy storage device or mechanism for receiving electric energy from an off-board source, such as an overhead catenary or powered rail), hybrid-electric vehicles (e.g., a vehicle with a traction motor, an energy storage device, hydraulic propulsion, and a fuel engine, fuel cell, or the like for charging the energy storage device and/or directly generating power for running the traction motor), dual-mode vehicles (e.g., a vehicle with an engine-only mode of operation and an electricity-only mode of operation, or a vehicle with a first mode of operation where traction electricity is provided by an engine and a second mode of operation where traction electricity is provided by another source), diesel-electric and other engine-electric vehicles (e.g., a vehicle with an engine that generates electrical power for running a traction motor), and combinations and variants thereof. Electric vehicles may have one traction motor, or plural traction motors; "traction motor" refers to a motor of sufficient size and capacity to move a vehicle of sufficient size for at least carrying humans.

The electric vehicles are each provided with a respective control module, which may be a separate controller or other control system, or part of a multi-purpose vehicle controller or other control system. The control module is configured to generate signals for controlling tractive effort (braking and/or propulsion) of the electric vehicle and/or a source of electrical power for the vehicle. (Controlling a source of electrical power may include selecting among plural available sources, both in regard to the present time or scheduling across a future time period.) For a given electric vehicle, the sources of electrical power may include one or more of: a first onboard energy source, specifically, an onboard energy storage device; one or more second onboard energy sources (e.g., regenerative or dynamic braking, engines, generators, APU's, fuel cells, or the like); and/or the wayside electrical power distribution system.

According to another aspect, the system(s) includes communication functionality, centralized and/or distributed, for the exchange of information between one or more of: the wayside stations; the electric vehicles; the non-vehicle external sources; and/or a centralized control location (e.g., part of the wayside electrical power distribution system). The information exchanged may include one or more of the following: a present demand of a wayside station ("present demand" referring to an amount of electrical power that the wayside station has been requested to transfer at the present time); an expected demand of a wayside station ("expected demand" referring to an amount of electrical power that the wayside station will be requested to transfer at a future time); a present capacity of a wayside station ("present capacity" referring to an amount of electrical power that the wayside station can transfer at the present time, such as from an energy storage device of the wayside station), including information about the availability of transferring electrical power between wayside stations at the present time; an expected capacity of a wayside station ("expected capacity" referring to an amount of electrical power that the wayside station can transfer at a future time, such as from an energy storage device of the wayside station), including information about the availability of transferring electrical power between wayside stations at a future time; availability of electrical power provided from the one or more external sources; vehicle information (e.g., schedule, movement information such as position and speed, onboard energy storage device present capacity (present charge level) or maximum capacity (maximum charge level), information about planned transfer of electrical power from/to the wayside electrical power distribution system, information relating to onboard energy sources other than an energy storage device, or the like); and cost information relating to costs associated with any or all of the foregoing.

In an electric vehicle, the control module generates signals for controlling tractive effort and/or a source of electrical power for the vehicle, based on one or more onboard parameters and/or one or more off-board parameters. (Information may be received from the communication functionality.) Alternatively, separate control modules generate these signals. For example, a first control module may control tractive effort while a separate, second control module controls which source of electrical power is used for the vehicle. The onboard parameters comprise (or relate to) the vehicle information noted above; examples include: a schedule of the vehicle; a location of the vehicle with respect to wayside stations along a route of the vehicle, the wayside stations configured to provide electrical power to the vehicle; a maximum capacity and/or a present capacity of an energy storage device on board the vehicle; one or more costs associated with powering the vehicle using energy from a first onboard source comprising an energy storage device; emissions (e.g., gas, audible noise, electromagnetic current, electromagnetic interference, mechanical vibrations, track load, and the like) generated by the vehicle; or one or more parameters relating to powering the vehicle using energy from one or more second onboard sources different from the energy storage device. The off-board parameters may include one or more other aspects of the information noted above; examples include: cost information associated with powering the vehicle using energy from the wayside stations; locations of the wayside stations; maintenance costs of the vehicle; or a present and/or an expected capacity of the wayside stations for providing electrical power to the vehicle.

In a more specific example, the control modules of an electric vehicle take into account (i) information of the wayside stations along its route (e.g., present and/or expected capacity and associated costs), (ii) vehicle information (e.g., capacity and costs of onboard sources), and (iii), in some embodiments, information of external sources at the wayside (e.g., capacity/availability and costs). Based on this information, the control modules generates signals in regards to controlling tractive effort of the vehicle and/or selecting a source of electrical power for the vehicle, for controlling when and to what extent the vehicle is powered using onboard sources (and which of such sources) or using the wayside electrical power distribution system, in a manner that minimizes or at least reduces overall energy costs, and/or in a manner that achieves another designated objective for the vehicle. Thus, if a first wayside station has "x" amount of stored or network energy and the base energy cost is "y," and a second wayside station has "2x" amount at a base energy cost of "2y," then the control module can control time to arrival at the wayside stations and energy use/cost, given its onboard capacity, to reduce overall cost or otherwise. For carrying out such an operation, one or more of the control modules may utilize energy management system technology such as described in U.S. patent application Ser. No. 11/385,354, filed Mar. 20, 2006 (U.S. Patent Application Publication No. 2007/0219680), which is incorporated by reference herein in its entirety.

Given the above, the wayside electrical power distribution system and onboard control modules do not have to accommodate peak demand/capabilities, but instead for providing an integral of the average power requirement. Power deficiencies can be remedied by selecting among available external sources, and/or by controlling transfer of power between wayside stations and/or from external wayside sources (e.g., buying power from a renewable source, or a general public utility grid).

More specifically, in an embodiment, a wayside station includes an energy storage device for storing electrical energy. The storage device has a maximum capacity of no more than a mean power demand of the wayside station (defined over a given time period such as daily, weekly, or monthly), or no more than the mean power demand plus ten percent (ten percent representing a buffer that does not add significantly to the cost of the wayside station). In such a configuration, the costs for implementing the wayside station are significantly reduced, due to not having to provide capacity for peak demand.

In another embodiment, a wayside station includes a first power transfer system configured to control transfer of electrical power between wayside stations, and/or a second power transfer system configured to control transfer of electrical power from one or more external sources to the wayside station. The first power transfer system and/or the second power transfer system are configured to control the transfer of electrical power based on one or more of: one of the wayside stations (in the wayside electrical power distribution system) having a present demand or expected demand that exceeds a present capacity or an expected capacity of the wayside station; or a cost determination of one or more costs associated with electrical power provided from an energy storage device of the wayside station, electrical power provided between the wayside stations, or electrical power provided from the one or more external sources. Thus, if an expected demand on a wayside station exceeds an expected capacity of the wayside station (e.g., capacity of an energy storage device of the wayside station), the wayside station can control transfer of electrical power from another wayside station, or from an external wayside source, depending on cost information. Similarly, if a wayside station has sufficient capacity, but the cost of transferring power from an external source for providing to a vehicle would cost less, then the wayside station may control transfer of power form the external source instead of providing power from its energy storage device, for example.

The vehicle interface equipment of the wayside stations may comprise: "plug in" modules, e.g., the vehicle plugs into a receptacle of the wayside station, for receiving electrical power from the station; a continuous power interface by which a vehicle can receive off-board power while moving, such as a catenary line or third rail; or the like. In one embodiment, two wayside stations comprise first and second power substations, with the vehicle interface equipment of the two comprising two adjacent blocks of catenary or third rail separated by a neutral break.

Aspects of the inventive subject matter also relate to the possibility of an electric vehicle transferring power to the wayside electrical power distribution system. Thus, examples of providing electrical power from the wayside electrical power distribution system to an electric may include, in effect, a negative providing, that is, the vehicle provides power to the distribution system.

Figure 6:
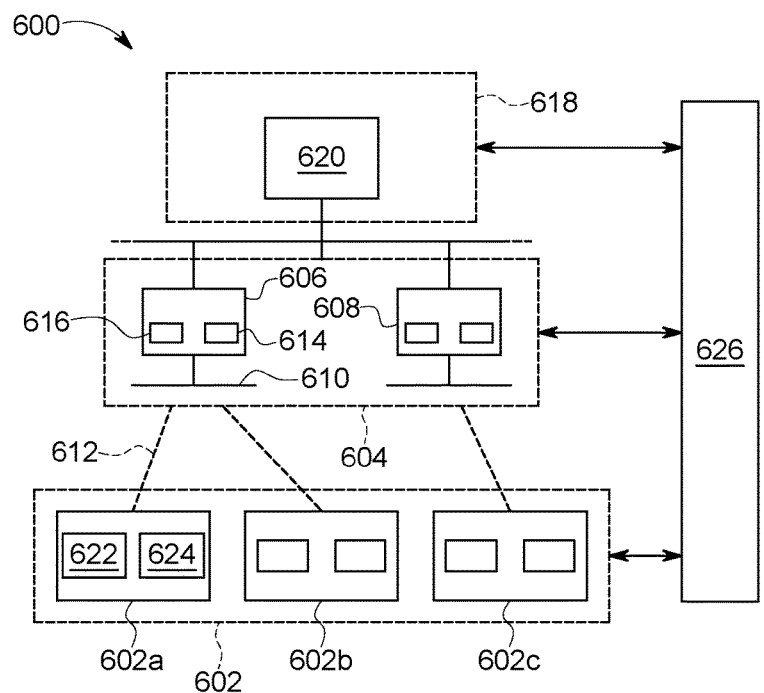
FIG. 6 shows a schematic diagram of an embodiment of a system for powering and controlling electric vehicles.

FIG. 6 shows a schematic diagram of an embodiment of a system 600 for powering and controlling electric vehicles 602 (602*a*, 602*b*, 602*c*). According to one aspect, a wayside electrical power distribution system 604 includes plural spaced-apart wayside stations 606, 608, each configured to provide electrical power to the electric vehicles 602. The wayside stations include vehicle interface equipment 610 for interfacing with vehicle systems, to convey power 612 to vehicles operably linked with the interface equipment, and one or more power transfer systems 614 for sourcing electrical energy for supplying to vehicles. The sources of electrical power may include one or more of: electrical power received from vehicles; electrical power received from other wayside stations; electrical power received from an energy storage device 616 of the wayside station; and electrical power received from non-vehicle external sources 618, such as remote energy storage devices, utility grids, local renewable power sources or other local power generation sources, and wide area renewable power sources or other wide area power generation sources (collectively, electric energy sources 620).

The electric vehicles 602 are each provided with a respective control module 622, which may be a separate controller or other control system, or part of a multi-purpose vehicle controller or other control system. The control module is configured to generate signals for controlling tractive effort (braking and/or propulsion) of the electric vehicle and/or a source of electrical power for the vehicle. The control module 622 is shown as a single module, but alternatively may represent multiple modules. For example, a first tractive control module 622 may generate signals for controlling tractive effort of the vehicle while a second energy control module 622 may generate signals for controlling a source of electrical power for the vehicle. The sources of electrical power may include one or more of: a first onboard energy source, specifically, an onboard energy storage device 624 (e.g., a fuel cell or battery); one or more second onboard energy sources (e.g., regenerative or dynamic braking, engines, generators, APU's, fuel cells, or the like); and/or the wayside electrical power distribution system. Communication functionality between the vehicles 602, the power distribution system 604, and/or the electric energy sources 620 is shown generally at 626. For example, communication functionality 626 may represent the transceivers and/or other associated circuitry, communication links (e.g., wired and/or wireless), and the like, used by the various vehicles 602, power distribution system 604, and/or electric energy sources 620 to communicate with each other.

Figure 7:
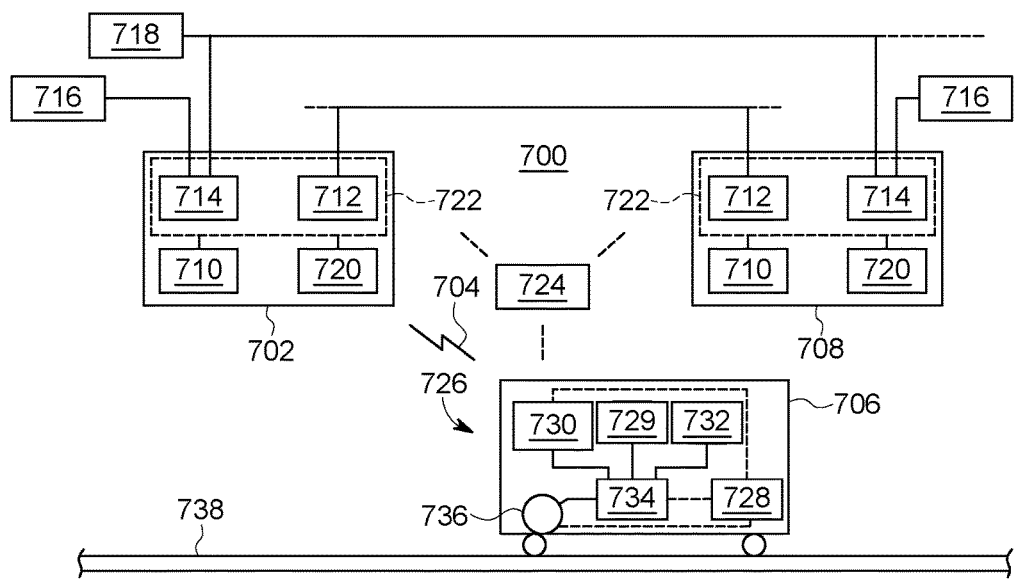
FIG. 7 shows a schematic view of a system for powering vehicles.

FIG. 7 shows a schematic view of a system 700 for powering vehicles. The system includes a first wayside station 702 configured to provide electrical power 704 to an electric vehicle 706. The system 700 additionally includes a second wayside station 708 configured to provide electrical power to the electric vehicle 706 and spaced apart from the first wayside station 702. For example, the wayside stations 702, 708 may not be physically coupled or connected with each other, and/or may be separated from each other by several meters, kilometers, or more. One or both of the first and second wayside stations 702, 708 respectively comprise one or more of the following: an off-board energy storage device 710 for storing electrical energy (in one embodiment, the energy storage device has a storage capacity of no more than a mean power demand of the wayside station 702, 708, or no more than the mean power demand plus ten percent or some other buffer amount); a first power transfer system 712 configured to control transfer of electrical power between the first and second wayside stations; and/or a second power transfer system 714 configured to control transfer of electrical power from one or more external sources 716, 718 to one or more of the first and second wayside stations 702, 708. The external sources may include a local external source 716 (e.g., available only to the wayside station in question, such as a battery or renewable energy source located at the wayside station in question), and/or a wide area external source 718 (e.g., a utility power grid, a battery conductively coupled with both wayside stations 702, 708, another power source connected with both wayside stations 702, 708, and the like). The wayside stations 702, 708 also include vehicle interface equipment 720 for interfacing with vehicle systems, to convey power to vehicles 706 operably linked with the interface equipment 720, and control/communication functionality, shown generally at 722. The first power transfer system and/or the second power transfer system are configured to control the transfer of electrical power based on one or more of: one of the wayside stations having a present demand or expected demand that exceeds a present capacity or an expected capacity of the wayside station; or a cost determination of one or more costs associated with electrical power provided from the energy storage device, electrical power provided between the wayside stations, or electrical power provided from the one or more external sources.

The system may further comprise a communication system 724 configured to at least one of: communicate between the wayside stations for exchange of information relating to the present demand, the expected demand, the present capacity, the expected capacity, or the cost determination; communicate between one or more of the wayside stations and one or more electric vehicles, for exchange of information relating to the cost determination, to expected or present power demands of the vehicles, and/or to movement of the vehicles; communicate between one or more of the wayside stations and the one or more external sources, for exchange of information relating to the present demand, the expected demand, the present capacity, the expected capacity, the cost determination, or electrical power available from the one or more sources; or communicate between one or more of the wayside stations and a central location, for exchange of information relating to any of the foregoing.

FIG. 7 also shows a system 726 for controlling an electric vehicle 706. The system 726 comprises a control module 728 configured to be operably coupled with the electric vehicle. The control module is further configured to generate signals for controlling at least one of tractive effort of the electric vehicle or a source of electrical power for the vehicle, based on one or more of one or more onboard parameters or off-board parameters. Alternatively, the control module 728 may represent plural separate control modules, such as a first control module 728 that generates signals for controlling tractive effort of the vehicle and a second control module that generates signals for controlling a source of electrical power for the vehicle. The one or more onboard parameters comprise: a schedule of the vehicle; a location of the vehicle with respect to wayside stations along a route of the vehicle; a maximum capacity and/or a present capacity of an energy storage device on board the vehicle; one or more costs associated with powering the vehicle using energy from a first onboard source comprising an energy storage device; or one or more parameters relating to powering the vehicle using energy from one or more second onboard sources different from the energy storage device. The one or more off-board parameters comprise: cost information associated with powering the vehicle using energy from the wayside stations; locations of the wayside stations; or a present and/or an expected capacity of the wayside stations for providing electrical power to the vehicle.

Also shown in FIG. 7, for illustration purposes, are the following components of an electric vehicle, according to an embodiment: an energy storage device 729 (e.g., one or more batteries, flywheels, capacitors, or the like); an onboard energy source 730 (other than the energy storage device); an external interface device 732 for receiving or transmitting electrical power from off-board; power control circuitry 734 for one or more of charging the energy storage device, powering other onboard systems, or powering a traction motor 736; and a route 738.

Figure 8:
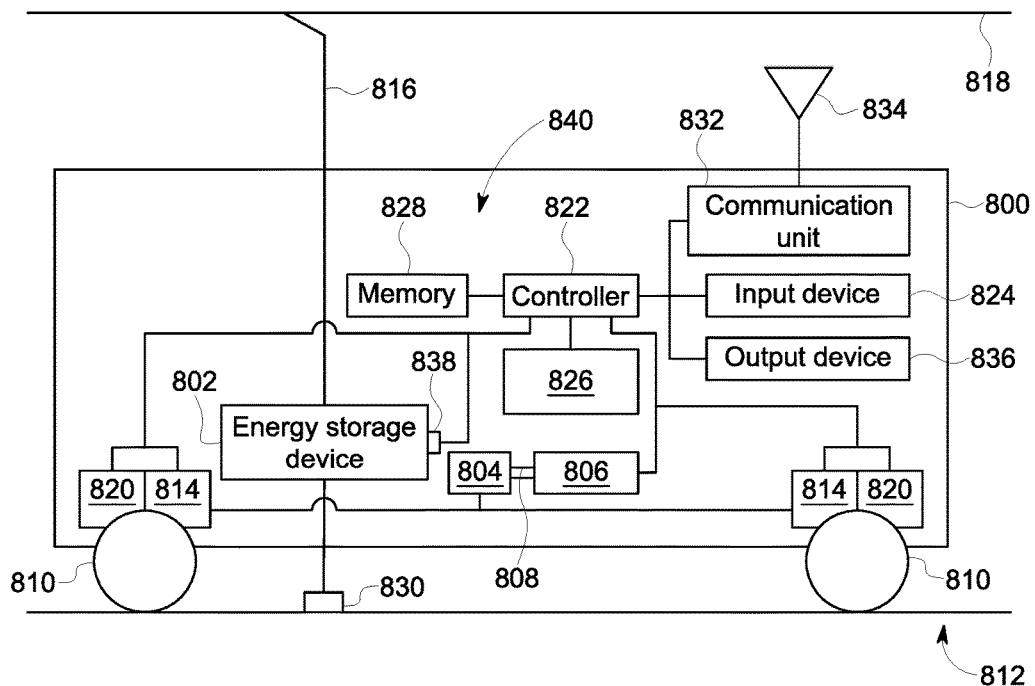
FIG. 8 is a schematic diagram of one embodiment of an electric vehicle having a control system for controlling the vehicle.

FIG. 8 is a schematic diagram of one embodiment of an electric vehicle 800 having a control system 840 for controlling the vehicle 800. The vehicle 800 may represent one of the vehicles 602, 706 (shown in FIGS. 6 and 7) according to one embodiment. As described above, the vehicle 800 includes tractive components (e.g., traction motors 814 that may represent the traction motors 736 shown in FIG. 7) that rotate wheels 810 (and/or axles joined to the wheels 810) of the vehicle 800 to generate tractive efforts that propel the vehicle 800 along a route 812 (which may represent the route 738 shown in FIG. 7). The traction motors 814 may be electrically powered by electric energy (e.g., electric current) supplied by one or more onboard and/or off-board sources. With respect to the onboard sources, the vehicle 800 can include an onboard energy storage device 802 (which can represent the onboard energy storage devices 624 and/or 728 shown in FIGS. 6 and 7), such as one or more fuel cells, batteries, and the like. The onboard sources also or alternatively can include one or more onboard energy sources (e.g., the source 730 shown in FIG. 7) that generates electric current onboard the vehicle 800. The onboard energy source can include a generator (or alternator) 804 that is connected to an engine 806 by a shaft 808. Rotation of the shaft 808 by the engine 806 rotates a rotor of the generator 804 to create electric energy (e.g., electric current). Alternatively or additionally, the onboard energy sources can include another type of device that generates or stores electric energy onboard the vehicle 800, such as one or more solar cells, wind turbines, and the like. In another example, the onboard energy sources can include the traction motors 814 when the traction motors 814 operate in a dynamic braking mode where electric energy is generated by the traction motors 814 during slowing of the vehicle 800.

While the onboard energy storage device 802 is shown as being disposed onboard the vehicle 800 and coupled with the propulsion system (e.g., the traction motors 814) of the vehicle 800, alternatively, the onboard energy storage device 802 may be disposed onboard another vehicle that is coupled with the vehicle 800. For example, the energy storage device 802 may be located on an energy tender vehicle that is connected with the vehicle 800 by one or more mechanical connections such that movement of the vehicle 800 also moves the tender vehicle. Such an energy storage device 802 can be connected with the propulsion system of the vehicle 800 by one or more conductive bodies (e.g., buses, cables, wires, and the like).

The energy storage device 802 can directly supply electric current to the traction motors 814 to power the motors 814 by being directly coupled with the traction motors 814 (e.g., with no intermediate conductive buses, transformer, and the like, disposed between the energy storage device 802 and the motors 814). Alternatively or additionally, the energy storage device 802 can indirectly supply the electric current to the traction motors 814 by conveying the current to the motors 814 through one or more conductive buses, transformers, and the like.

The energy storage device 802 can include a monolithic or hierarchical storage system, where individual battery blocks or cells are connected in series or parallel arrangements that may include sub-inverters and/or controllers for multiple blocks that then are supervised by a higher level system, that also may have an additional inverter to match the storage system power transfer requirements to that of the loads of the vehicle 800, such as the traction motors 814 and/or other loads (e.g., auxiliary loads as described herein).

The off-board energy sources (e.g., the energy storage devices 616, 710 and/or the non-vehicle external energy sources 618, 716, 718 of the wayside stations 606, 608, 702, 708 shown in FIGS. 6 and 7) can be connected with the vehicle 800 by one or more conductive pathways that extend alongside the route 812 being traveled by the vehicle 800. For example, an overhead catenary 818 may represent the interface equipment 610, 720 (shown in FIGS. 6 and 7) of the wayside stations 606, 608, 702, 708 (shown in FIGS. 6 and 7) that supplies electric energy to an interface device 732 (shown in FIG. 7), such as a pantograph 816 of the vehicle 800. As another example, a powered portion of the route 812, such as an electrified rail, can represent the interface equipment 610, 720 of the wayside stations 606, 608, 702, 708 that provides electric energy to a shoe 830 or other interface device. The electric energy that is received through the interface devices of the vehicle 800 can be used to charge the onboard energy storage device 802 and/or power the traction motors 814.

In addition to providing propulsive force to propel the vehicle 800, the traction motors 814 also can act to slow or stop movement of the vehicle 800 using dynamic braking. At least some of the electric energy generated by the dynamic braking can be provided to the energy storage device 802 for storage. Additionally or alternatively, the energy generated by dynamic braking may be used for other regenerated uses, battery use, to power other auxiliary systems and head end power, such as coach lighting and air conditioning, and the like. The vehicle 800 may include additional brakes, such as air brakes 820, that can slow or stop movement of the vehicle 800.

The system 840 includes a controller 822 disposed onboard the vehicle 800. The controller 822 can represent the control module 622, 728 (shown in FIGS. 6 and 7). The controller 822 can include one or more processors, microcontrollers, or other logic-based devices, and/or associated software or instructions, for carrying out one or more operations described herein. The controller 822 controls operations of the vehicle 800, such as by controlling the tractive efforts and/or braking efforts provided by the traction motors 814. The controller 822 may be manually operated by receiving instruction signals from an input device 824 (e.g., a device that receives input from an operator, such as a touchscreen, joystick, keyboard, switch, wheel, microphone, and the like) based on manual input from an operator at the input device 824. An output device 836 (e.g., a display, monitor, touchscreen, speaker, light, and the like) can provide information to the operator, such as current operational settings of the vehicle 800, designated operational settings of a trip plan (as described below), a current amount of electric energy stored onboard the vehicle 800, a current storage capacity of the onboard energy storage device 802, and the like. In one embodiment, the controller 822 includes or represents the power control circuitry 734 shown in FIG. 7.

Alternatively or additionally, the controller 822 may be automatically operated to autonomously control operations of the vehicle 800. For example, a trip plan may be provided by an energy management system 826 and/or stored on a tangible and non-transitory computer readable storage medium, or memory 828, that is accessible by the controller 822. The controller 822 and energy management system 826 may represent the two or more control modules described above in connection with FIGS. 6 and 7 in one embodiment. The trip plan may designate operational settings of the vehicle 800 as a function of time or distance along the route 812 for a trip of the vehicle 800 to a destination location. The designated operational settings of the trip plan may be established in order to reduce one or more of fuel consumed, emissions generated, or time spent in transit by the vehicle 800 for the trip, as described in connection with U.S. Patent Application Publication No. 2007/0219680. The energy management system 826 can include one or more processors, microcontrollers, or other logic-based devices, and/or associated software or instructions, for carrying out one or more operations described herein. The energy management system 826 can generate the trip plan and/or modify the trip plan based on changing conditions during travel of the vehicle 800 along the route 812, as described below and in U.S. Patent Application Publication No. 2007/0219680.

In one embodiment, the energy management system 826 generates the trip plan to designate operational settings of the vehicle 800 (e.g., throttle and/or brake settings) so that travel of the vehicle 800 according to the trip plan consumes less electric energy relative to traveling along the same trip according to a different plan and/or different operational settings. For example, in a manner similar to the reduction of fuel consumed by generating and following a trip plan according to U.S. Patent Application Publication No. 2007/0219680, a trip plan can be generated to reduce the consumption of electric energy and/or to prolong a distance traveled by the vehicle 800 while consuming the electric energy provided by the energy storage device 802 relative to traveling according to another plan and/or other operational settings. The controller 822 can receive the trip plan from the energy management system 826 and generate control signals based on the trip plan. The control signals may be communicated to the traction motors 814 and/or brakes 820 to implement the designated operational settings of the trip plan.

The energy management system 826 is shown as being disposed onboard the vehicle 800, but alternatively may be disposed off-board the vehicle 800, such as at a remote location (e.g., a dispatch center). The vehicle 800 can communicate with such an off-board energy management system 826 using a communication unit 832 (e.g., transceiver circuitry and hardware, such as a wireless antenna 834) of the vehicle 800.

In operation, the energy management system 826 can monitor operational conditions of the vehicle 800 and generate or modify a trip plan based on the operational conditions. The operational conditions can include load parameters that impact how much electric energy is consumed (or is calculated to be consumed) in order to propel the vehicle 800 along the route 812 to a designated location. For example, changes in the load parameters can change an estimated trip load that represents the amount of electric energy that is calculated or anticipated to be needed (e.g., drawn) from the onboard power storage device 802 to power the traction motors 814 to propel the vehicle 800 over at least the portion of a trip.

A variety of load parameters may be monitored by the energy management system 826 to determine an estimated trip load. By way of example, these factors can include the speed at which the vehicle 800 is traveling (e.g., with the estimated trip load increasing for faster speeds or decreasing for slower speeds), the weight of the vehicle 800 (e.g., with the estimated trip load increasing for increasing weight or decreasing with decreasing weight), the grade of one or more segments of the route 812 (e.g., with the estimated trip load increasing for uphill grades or decreasing for downhill grades), efficiencies of the traction motors 814 (e.g., with the estimated trip load increasing for traction motors 814 that consume more energy to be powered or decreasing for traction motors 814 that consume less energy to be powered), and the like. Other load parameters may include the amount of electric energy that is consumed by other electric loads that do not work to propel the vehicle 800. For example, the load parameters can represent the amount of electric energy that is lost to equipment that does not propel the vehicle 800, such as lights, heat and/or cooling systems, navigational systems, and the like.

Other examples of load parameters may include an amount of vehicular traffic in a transportation network that includes the route 812 along which the vehicle 800 is or will be traveling (referred to herein as "transportation network congestion"). If the transportation network congestion is significant, then the vehicle 800 may need to travel at slower speeds and/or take longer to reach a wayside station where the vehicle 800 can recharge the onboard energy storage device 802. Conversely, if the transportation network congestion is relatively low, then the vehicle 800 may be able to travel at faster speeds and/or reach a wayside station where the vehicle 800 can recharge sooner. Traveling at faster speeds and/or operating on electric energy from the onboard energy storage device 802 for longer time periods can increase the estimated trip load of the vehicle 800 while traveling at slower speeds and/or operating for shorter time periods can reduce the estimated trip load.

The operational conditions can include charging restrictions that represent limitations on how much electric energy can be provided or is available to propel the vehicle 800 along the route 812. The charging restrictions represent limitations on acquiring the electric energy that is used to propel the vehicle 800 along the route 812 during the trip. These limitations can include onboard or off-board limitations on the availability and/or amount of electric energy that is available to the vehicle 800.

Onboard limitations can include a limitation on the amount of energy that can be stored by the onboard energy storage device 802 (e.g., the storage capacity of a battery), an amount of energy that is currently stored in the onboard energy storage device 802, the number of onboard energy storage devices 802, resistance losses of the vehicle 800 (e.g., the amount of electric energy that is lost due to resistance by the flow of electric current through the vehicle 800), and the like.

Off-board limitations can include locations of the off-board energy sources (e.g., the distances between wayside stations 606, 608, 702, 708 or powered sections of the route 812 where additional electric energy can be obtained for charging the onboard energy storage device 802 or powering the traction motors 814), the amount of energy that is available for charging the onboard energy storage device 802 at one or more of the off-board energy sources (e.g., an amount of energy that is currently available at a wayside station or powered section of the route 812 to charge the onboard energy storage device 802 and/or that will be available when the vehicle 800 arrives at the wayside station or powered section), a charging capacity at one or more of the off-board energy sources (e.g., an amount of electric energy that can be stored at a wayside station or that can be supplied from a powered section of the route), locations or segments of the route 812 where no off-board energy sources are available (e.g., sections of the route 812 that extend between the off-board energy sources), the financial cost of obtaining electric energy from the off-board energy sources (e.g., where different off-board energy sources charge different amounts to obtain electric energy from the off-board energy source), and the like. The financial cost of obtaining electric energy from the off-board energy sources may be referred to as a "charging cost." Another example of an off-board limitation is the rate at which the onboard storage device 802 can be charged by an off-board source. When the onboard storage device 802 is being charged and the vehicle 800 is stationary (e.g., at a wayside station), the storage device 802 may be charged at a rate that is slower than a rate at which the storage device 802 is charged when the vehicle 800 is moving and the storage device 802 is charged by an off-board source such as a catenary 818 or electrified rail. Similarly, the rate of charging the storage device 802 may increase for faster speeds of the vehicle 800.

The energy management system 826 generates a trip plan and/or modifies a trip plan (e.g., for a previously generated trip plan) based on the load parameters and the charging restrictions. The trip plan includes propulsion operational settings of the vehicle 800, such as throttle settings, brake settings, tractive effort or power output from the traction motors 814, braking effort from the traction motors 814 and/or other brakes 820, speeds of the vehicle 800, and the like. The propulsion operational settings are used to control movement of the vehicle 800 during the trip. For example, the propulsion operational settings may be expressed as a function of time expired during a trip and/or distance along the route 812 of the trip and the actual operational settings of the vehicle 800 can be controlled to match or follow the propulsion operational settings that are designated by the trip plan. In one embodiment, the controller 822 controls actual traction settings (e.g., settings of the traction motors 814) or actual brake settings (e.g., settings of the traction motors 814 during dynamic braking and/or settings of the brakes 820) by monitoring actual settings of the traction motors 814 and/or brakes 820 and then changing the actual settings to more closely match the designated propulsion operational settings of the trip plan.

In one embodiment, the energy management system 826 determines how much electric energy is available for a trip or for one or more segments or portions of the trip. The energy management system 826 may determine an available amount of electric energy as including one or more (or all) of a current amount of stored electric energy ($E_{C,S}$), a current amount of available onboard generated electric energy ($E_{C,G}$), a current amount of off-board available electric energy ($E_{C,O}$), an estimated amount of upcoming available onboard generated electric energy ($E_{U,G}$), and/or an estimated amount of upcoming available off-board electric energy ($E_{U,O}$).

The current amount of stored electric energy includes the electric energy that is currently stored in the onboard energy storage device 802 (which may change as the energy is consumed to power the vehicle 800 during the trip). The energy management system 826 may monitor the amount of electric energy that is stored onboard in the energy storage device 802 (e.g., by being communicatively coupled with the onboard energy storage device 802 and/or an energy sensor 838 coupled with the device 802 by one or more wired and/or wireless connections) as the vehicle 800 travels along the route 812 during the trip. The energy sensor 838 can represent a voltmeter, ammeter, or the like.

The current amount of available onboard generated electric energy includes the electric energy that may be currently available from onboard energy sources, such as by being generated by components disposed onboard the vehicle 800. For example, this energy may be the amount of electric energy that can be generated by the traction motors 814 during dynamic braking and/or by the generator 804 at a current time and/or while the vehicle 800 is traveling along a current segment of the trip.

The current amount of off-board available electric energy includes the electric energy that may be currently obtained from off-board energy sources, such as from a wayside station 606, 608, 702, 708, a catenary 818, a powered section of the route 812, and the like. As one example, the current amount of off-board available electric energy can be non-existent when the vehicle 800 is disposed remote from off-board energy sources. Conversely, the current amount of off-board available electric energy may be larger when the vehicle 800 is at a wayside station 606, 608, 702, 708 and/or is traveling along a powered section of the route 812 (e.g., with the available electric energy decreased by resistance losses in the catenary 818, powered rail, or the like).

The estimated amount of upcoming available onboard electric energy includes the electric energy that is calculated or estimated to be stored onboard the vehicle 800 in the energy storage device 802 at one or more times and/or locations along the trip. This amount of electric energy can be calculated by determining the estimated trip load to the time or location of interest and subtracting this estimated trip load from a starting amount of electric energy that is stored in the energy storage device 802 prior to traveling toward the time or location of interest. Alternatively or additionally, this amount of electric energy can be based on historical data. For example, during one or more previous trips by the vehicle 800 or a similarly configured vehicle 800 over the same or similarly configured trip or segment of the trip, the amount of electric energy that is actually consumed when the vehicle 800 is operated according to associated operational settings can be recorded. This previously monitored amount of consumed electric energy can be stored in the memory 828 or otherwise communicated to the energy management system 826 (e.g., from an off-board source). The energy management system 826 can refer to the previously monitored amounts of consumed electric energy for an associated (e.g., the same) segment of a trip and/or the entire trip. The previously monitored energy can be subtracted from a sum of available electric energy (e.g., one or more of the current amount of stored electric energy ($E_{C,S}$), the current amount of available onboard generated electric energy ($E_{C,G}$), the current amount of off-board available electric energy ($E_{C,O}$), and/or the estimated amount of upcoming available off-board electric energy ($E_{U,O}$)) to determine the estimated amount of electric energy that will be available for powering the vehicle 800.

The estimated amount of upcoming available off-board electric energy includes the electric energy that is calculated or estimated to be available off-board the vehicle 800 at one or more times and/or locations along the trip. This amount of electric energy can be calculated or estimated based on amounts of electric energy that are known or estimated to be available at one or more upcoming (e.g., along a direction of travel) off-board energy sources along the route 812 of the trip. For example, with respect to catenaries 818 and/or powered sections of the route 812, the amount of electric current supplied by these off-board energy sources may be designated (e.g., known) and stored in the memory 828 along with the associated locations of the sections of the route 812 having the catenaries 818 and/or powered sections. Alternatively, the electric energy that will be available from these sources may be communicated to the energy management system 826 from an off-board source (e.g., a dispatch center, utility company, wayside station, and the like) via the communication unit 832 of the vehicle 800.

With respect to wayside stations 606, 608, 702, 708, the amount of electric energy that is estimated to be available at the stations when the vehicle 800 arrives at the stations may be designated (e.g., predetermined) and stored in the memory 828 along with the associated locations of stations.

Alternatively or additionally, this estimated amount of electric energy may be known by communication between the stations and the energy management system 826 (e.g., via the communication unit 832 of the vehicle 800). For example, the stations may communicate an amount of electric energy that is currently available or is estimated to be available at a time when the vehicle 800 arrives at the stations to the vehicle 800. The stations may communicate this information on a periodic basis and/or when prompted, such as when the vehicle 800 moves to within a predetermined range of the stations and/or transmits a request for the information.

In one embodiment, the estimated amount of electric energy that will be available at the wayside stations 606, 608, 702, 708 may be requested by the vehicle 800. For example, the energy management system 826 and/or an operator of the vehicle 800 may transmit a request signal via the communication unit 832 to an upcoming wayside station 606, 608, 702, 708. The request signal may designate an amount of electric energy that the energy management system 826 and/or operator of the vehicle 800 wants to obtain from the wayside station 606, 608, 702, 708 when the vehicle 800 arrives at the wayside station 606, 608, 702, 708.

The energy management system 826 can determine the amounts of electric energy that are available, will be available, and/or are estimated to be available at various locations and/or times along the trip. For example, the available electric energy can be determined for one or more segments of a trip to one or more designated locations. In one embodiment, the energy management system 826 also determines the estimated trip load for one or more of the same segments of the trip and/or for the entire trip. The energy management system 826 compares the available electric energy to the estimated trip load over one or more of the segments of the trip and/or over the entire trip in order to ensure that the vehicle 800 has sufficient electric energy to reach one or more designated locations.

Based on this comparison, the energy management system 826 may determine that an excess of electric energy is stored onboard, a shortage of electric energy exists, or sufficient electric energy is stored onboard. In one embodiment, the estimated trip load can include an energy buffer, such as an amount of reserve energy that is to be held in the onboard energy storage device 802 in the event that the estimated electric load involved in powering the vehicle 800 is smaller than the actual trip load (e.g., the amount of electric energy that is actually consumed to power the vehicle 800 to the designated location).

An excess of electric energy may be identified when the amount of electric energy stored in the onboard energy storage device 802 is greater than the estimated trip load. For example, the onboard energy storage device 802 may have more electric energy stored than what is needed to power the vehicle 800 to a designated location associated with the estimated trip load. A shortage may be identified when the amount of electric energy stored onboard the vehicle 800 is less than the estimated trip load. For example, the onboard energy storage device 802 may only have enough stored electric energy to power and propel the vehicle 800 over a portion of the trip that does not extend to a designated location (e.g., a location of an off-board source of energy such as a wayside station 606, 608, 702, 708 and/or powered section of the route 812). A sufficient amount of electric energy may be an amount of electric energy that is stored onboard the vehicle 800 (e.g., in the energy storage device 802) and that equal to or greater than the estimated trip load while being relatively close to the estimated trip load (e.g., within 3%, 5%, and the like).

Based on the comparison of the estimated trip load and the stored electric energy onboard the vehicle 800, the energy management system 826 may generate and/or change a trip plan. In one embodiment, the energy management system 826 first determines the available electric energy for the vehicle 800 over one or more segments of the trip and/or over the entire trip and then determines the operational settings of the trip plan so that the corresponding estimated trip load does not exceed the available electric energy. Alternatively, the energy management system 826 determines the estimated trip loads required to get the vehicle 800 to travel over one or more segments of the trip and/or over the entire trip and compares the estimated trip loads to corresponding amounts of available electric energy.

The energy management system 826 may create a trip plan based on one or more restrictions that limit or dictate the operational settings to be included in the trip plan. The restrictions may be assigned to the trips of the vehicles 800 based on a variety of different factors, such as the cargo or passengers being conveyed by the vehicle 800, a legal contract that the vehicle 800 is operating pursuant to (e.g., a shipping contract), the movement of other vehicles in a network of routes through which the trip will cause the vehicle 800 to travel, and the like. One example of a restriction may be a time of arrival at a final destination location and/or one or more intermediate locations. For example, the trip plan may be formed to ensure that the vehicle 800 arrives at a location no later than a designated arrival time and/or within a time window. Another example of a restriction may be a cost of the trip. For example, the trip plan may be formed to reduce the financial cost of fuel and/or electric energy that is used to power the vehicle 800 over the course of the trip (relative to another trip plan). Another example of a restriction is to ensure that crew members of the vehicle 800 do not work onboard the vehicle 800 for longer than a designated time period (e.g., the trip plan is formed to include stops so that the crews can be replaced). Another restriction may be a limitation on the amount of electric energy obtained from one or more sources. For example, a trip plan may be restricted such that no more than a designated amount of fuel is used (or at least a reduced amount of fuel is used relative to another plan) to generate electric energy for powering the vehicle 800. Other restrictions may be used.

Another example of a restriction may be a designated amount of electric energy that may need to be held in reserve in order to power one or more auxiliary systems of the vehicle 800, a head end power system of the vehicle 800, and/or additional loads that do not work to propel the vehicle 800 (e.g., "coach" loads that power devices or circuits in a passenger car coupled with the vehicle 800).

Another restriction may be partially operational systems of the vehicle 800 that change how much electric current is actually consumed by the systems versus when the systems are not partially operational. For example, cooling systems, ventilation systems, brakes, propulsion systems (e.g., traction motors 814), energy transfer systems (e.g., transformers), and the like, may be partially operational and not consume and/or transfer as much electric energy as when the systems are fully operational.

An additional example of a restriction may be an external restriction, such as a limitation on the amount of audible noise that can be generated by the vehicle 800, an operating temperature of the vehicle 800, and the like. For example, areas inside tunnels and passenger stations may limit how hot the engine of a vehicle 800 can operate and/or how loud the vehicle 800 can be. Such restrictions may be external in that the restrictions are controlled or enacted by third parties. Another external restriction may be a speed limit. For example, some areas of the route may require that the vehicle 800 maintain a speed that is at least as fast as a lower speed limit and/or that the vehicle 800 travel at a speed that is no greater than an upper speed limit. Another restriction may be a limit on inter-car forces in the vehicle 800. If the vehicle 800 represents several vehicle units (e.g., cars) coupled together and/or the vehicle 800 is coupled with one or more other vehicles, a restriction may be placed on the forces that can be exerted on the coupling mechanisms (e.g., the couplers) between the vehicles and/or units that are coupled with each other. Such restrictions may not allow for the forces on the couplers to exceed a designated amount.

The energy management system 826 determines the available electric energy (onboard and/or off-board) for the vehicle 800 over the course of the trip and formulates the operational settings of the vehicle 800 so that the vehicle 800 meets the restrictions applicable to the trip. The energy management system 826 can create the operational settings so that the vehicle 800 meets or satisfies the restrictions, while ensuring that the estimated trip load of the trip remains less than the electric energy that is available to the vehicle 800. These operational settings can include the settings of the propulsion system (e.g., the traction motors 814) that act to propel the vehicle 800 and/or the settings of auxiliary systems, such as lighting, air conditioning, and other systems, that are powered by electric current but do not work to propel the vehicle 800. The settings of the auxiliary systems can be designated in the trip plan so as to conserve sufficient electric energy to ensure that the vehicle 800 is able to reach one or more designated locations. For example, the lighting may be dimmed or turned off during daylight hours, the air conditioning may be reduced or turned off based on weather conditions, and the like, in order to reduce the amount of electric energy that is consumed by these auxiliary systems if the energy management system 826 determines that additional energy is needed to get the vehicle 800 to the next charging location or destination location.

Figure 9:
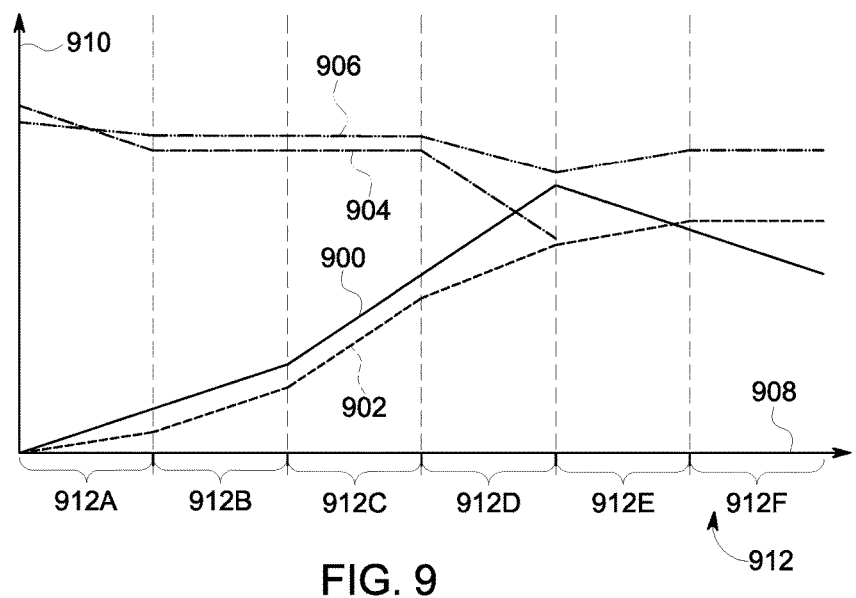
FIG. 9 illustrates an example of estimated trip loads for the vehicle shown in FIG. 8 during a trip according to different trip plans.
Figure 10:
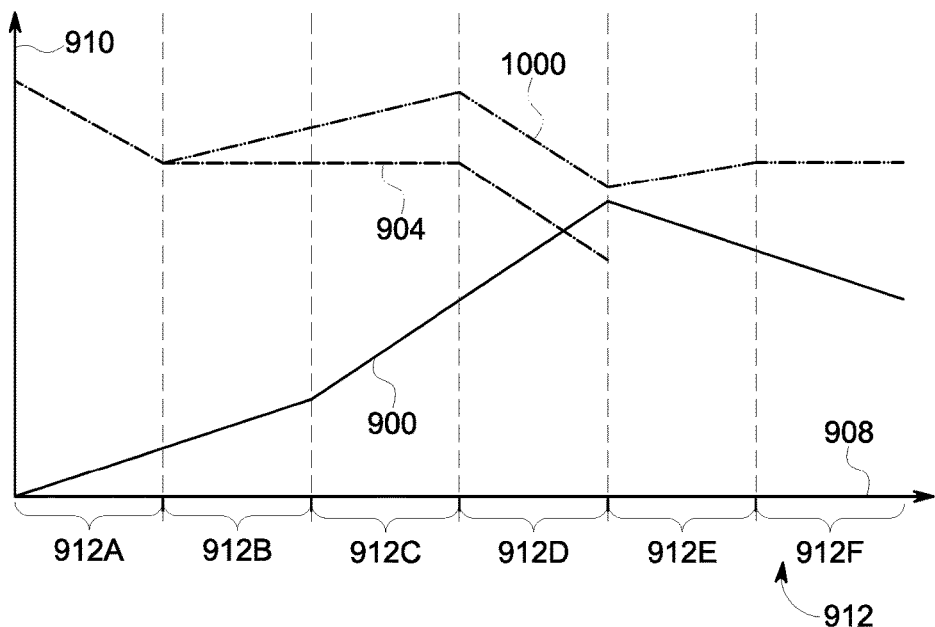
FIG. 10 illustrates another example of an estimated trip load shown in FIG. 9 for the vehicle shown in FIG. 8 according to different trip plans.
Figure 11:
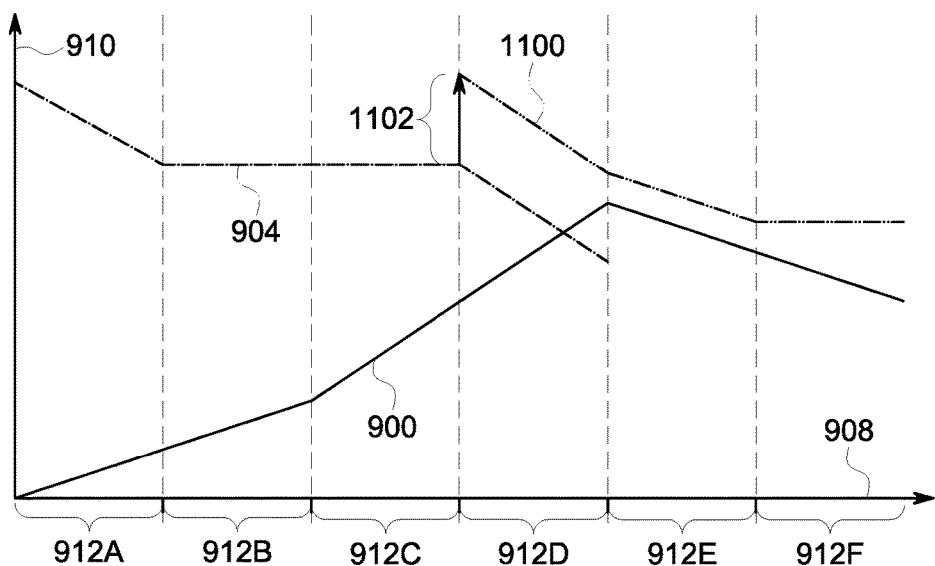
FIG. 11 illustrates another example of the estimated trip load shown in FIG. 9 for the vehicle shown in FIG. 8 according to different trip plans.

FIGS. 9 through 11 provide different examples of how the energy management system 826 can create or modify trip plans to that the vehicle 800 can be powered to travel over a trip. The energy management system 826 may modify the trip plan prior to the vehicle 800 commencing the trip and/or during movement of the vehicle 800 in the trip. For example, as the vehicle 800 travels, the energy management system 826 may determine that the vehicle 800 may not have sufficient onboard stored electric energy to meet the estimated trip load. In response, the energy management system 826 can modify the trip plan as described below.

FIG. 9 illustrates an example of estimated trip loads 900, 902 for a vehicle 800 (shown in FIG. 8) traveling along a route 812 (shown in FIG. 8) for a trip according to different trip plans. Also shown in FIG. 9 are electric energies 904, 906 that are stored onboard the vehicle 800 that travels along the route 812 for the trip according to the different trip plans. The estimated trip loads 900, 902 and onboard stored electric energies 904, 906 are shown alongside a horizontal axis 908 representative of progress along the trip and a vertical axis 910 representative of electric energy, such as electric energy represented in terms of joules, watts, and the like. The trip progress represented by the horizontal axis 908 can be expressed temporally or spatially, such as by time elapsed or distance traveled since the beginning of the trip or since a designated time or location in the trip. The trip progress is segmented in the illustrated example into six segments 912 (e.g., 912A-912F), although the trip may be segmented into fewer or more segments.

In the illustrated example, the first segment 912A represents a portion of the route 812 of the trip that extends over relatively flat terrain and does not have an available off-board source of electric energy (such as a catenary 818 shown in FIG. 8 or electrified rail). A subsequent, connected second segment 912B represents a portion of the route 812 that extends over relatively flat terrain but does include an off-board source of electric energy available for the vehicle 800 to use to power and propel the vehicle 800. A subsequent, connected third segment 912C represents a portion of the route 812 that extends over a positive grade (e.g., an uphill portion of the route 812) and that includes an off-board source of electric energy for the vehicle 800. A subsequent, connected fourth segment 912D represents a portion of the route 812 that extends over a positive grade but does not include an off-board source of electric energy. A subsequent, connected fifth segment 912E represents a portion of the route 812 that extends over a negative grade (e.g., a downhill portion of the route 812) and does not include an off-board source of electric energy. A subsequent, sixth segment 912F represents a portion of the route 812 that extends over a negative grade but does include an off-board source of electric energy. Table 1 below summarizes the segments 912 of the trip:

| Segment | Grade | Off-Board Source Of Electric Energy? |
| --- | --- | --- |
| 412A | 0 (flat) | No |
| 412B | 0 (flat) | Yes |
| 412C | +(uphill) | Yes |
| 412D | +(uphill) | No |
| 412E | −(downhill) | No |
| 412F | −(downhill) | Yes |

The first estimated trip load 900 represents the trip load that is calculated for the various trip segments 912 based on a first trip plan calculated by the energy management system 826 (shown in FIG. 8). The first stored electric energies 904 represents the onboard electric energy that is stored onboard the vehicle 800 (e.g., in the onboard energy storage device 802 shown in FIG. 8) during the various trip segments 912 when the vehicle 800 travels according to the first trip plan. As shown in FIG. 9, during the first segments 912A, the estimated trip load 900 increases and the onboard stored energy 904 decreases due to consumption of the onboard energy to power the traction motors 814 (shown in FIG. 8) of the vehicle 800 over the non-externally powered first trip segment 912A (e.g., the first trip segment 912A does not include an off-board source of electric energy).

During the second and third trip segments 912B-C, the first estimated trip load 900 increases (and more so for the uphill segment 912C than the flat segment 912B). The onboard stored energy 904, however, remains approximately constant. During these segments 912B-C, the vehicle 800 can use the available off-board energy source to power the traction motors 814. As a result, the onboard stored energy 904 is not depleted during travel over the externally powered segments 912B-C.

During the fourth trip segment 912D, the first estimated trip load 900 continues to increase while the onboard stored energy 904 significantly decreases. The onboard stored energy 904 may significantly decrease due to the additional load needed to propel the vehicle 800 uphill on the segment 912D that is not powered by an off-board electric energy source. In the illustrated embodiment, the estimated trip load 900 exceeds the onboard stored energy 904 in the fourth trip segment 912D. As a result, the vehicle 800 would likely run out of electric energy stored onboard (e.g., in the onboard energy storage device 802) to power the traction motors 814.

In response to this shortage of onboard stored electric energy, the energy management system 826 (shown in FIG. 8) may change the trip plan. The energy management system 826 can change the propulsion operational settings of the first trip plan to create a second trip plan that has the lower estimated trip load 902 over one or more segments 912 of the trip. For example, the energy management system 826 may change the propulsion operational settings of the trip plan to reduce a power output of the traction motors 814. In one embodiment, the energy management system 826 can reduce the energy consumption of the vehicle 800 by causing the vehicle 800 to operate in a degraded state.

The illustrated example shows the second trip plan having lower estimated trip loads 902 over the first four segments 912A-D of the trip. The lower estimated trip loads 902 may be achieved by operating the vehicle 800 at lower throttle settings over the segments 912A-D. The estimated trip load 902 of the second trip plan may exceed the estimated trip load 900 over the fifth and sixth trip segments 912E-F due to higher throttle settings being needed to keep the vehicle 800 moving over a crest in the terrain between the fourth and fifth trip segments 912D, 912E. For example, the first trip plan has a lower estimated trip load 900 in the fifth and sixth trip segments 912E, 912F because the vehicle 800 may be directed to move at faster speeds over the crest and, as a result, the momentum of the vehicle 800 may carry the vehicle 800 with faster speed to travel over the downhill trip segments 912E, 912F. With the lower throttle settings of the second trip plan, however, greater throttle settings may be needed to propel the vehicle 800 over the crest and through the downhill trip segments 912E, 912F to avoid slowing down or interfering with other vehicles traveling behind the vehicle 800. As a result, the estimated trip load 902 of the second trip plan may be greater in the trip segments 912E, 912F.

Due to the modified operational settings of the second trip plan that reduce the estimated trip load 902, the electric energy stored onboard the vehicle 800 may increase for one or more segments 912 of the trip. As shown in FIG. 9, the onboard stored electric energy 906 associated with the second trip plan is increased over the onboard stored electric energy 904 of the first trip plan. The onboard stored electric energy 906 may be depleted at a slower rate during the trip segments 912A, 912D that do not have an off-board energy source. As a result, the onboard stored electric energy 906 remains greater than the estimated trip load 902 of the second trip plan over the course of the trip. Additionally, the onboard stored electric energy 906 may be increased during the fifth trip segment 912E by using dynamic braking of the traction motors 814 to gain additional electric energy. The energy management system 826 is able to modify the trip plan so that the vehicle 800 can travel according to the second trip plan using the onboard stored electric energy.

FIG. 10 illustrates another example of the estimated trip load 900 for the vehicle 800 (shown in FIG. 8) for the trip illustrated in FIG. 9 according to different trip plans. The estimated trip load 900 and the onboard stored electric energy 904 for the first trip plan are shown, along with a modified onboard stored electric energy 1000 that is associated with a modified, third trip plan. As described above, the onboard stored electric energy 904 is insufficient to meet the estimated trip load 900 of the first trip plan. In response, the energy management system 826 (shown in FIG. 8) can create or modify the trip plan (e.g., form a third trip plan) so that the onboard stored electric energy is increased during one or more segments 912 of the trip.

For example, during the second, third, and fifth trip segments 912B, 912C, 912E, the trip plan may be modified to the third trip plan that includes directions for the onboard energy storage device 802 (shown in FIG. 8) to acquire (or receive) and store additional electric energy. The onboard stored electric energy 1000 can be increased in these trip segments 912B, 912C, 912E, as shown in FIG. 9. With respect to the second and third trip segments 912B-C, this additional electric energy may be supplied from the off-board energy sources. The third trip plan can direct the energy storage device 802 to receive the additional electric energy from wayside stations 606, 608, 702, 708 (shown in FIGS. 6 and 7), a catenary 818 (shown in FIG. 8), an electrified rail, and the like. Alternatively or additionally, this additional electric energy may be supplied from other onboard energy sources, such as from the engine 806 and generator 804 (shown in FIG. 8). With respect to the fifth trip segment 912E, the additional electric energy can be obtained from dynamic braking of the traction motors 814 (shown in FIG. 8). Alternatively, other sources of the electric energy may be used to supplement the onboard stored electric energy.

FIG. 11 illustrates another example of the estimated trip load 900 for the vehicle 800 (shown in FIG. 8) for the trip illustrated in FIG. 9 according to different trip plans. The estimated trip load 900 and the onboard stored electric energy 904 for the first trip plan are shown, along with a modified onboard stored electric energy 1100 that is associated with a modified, fourth trip plan. As described above, the onboard stored electric energy 904 is insufficient to meet the estimated trip load 900 of the first trip plan. In response, the energy management system 826 (shown in FIG. 8) can create or modify the trip plan (e.g., form a fourth trip plan) so that the onboard stored electric energy is increased during one or more segments 912 of the trip.

For example, a wayside station 606, 608, 702, 708 (shown in FIGS. 6 and 7) that can provide additional electric energy to the vehicle 800 by charging the onboard energy storage device 802 (shown in FIG. 8) may be located at or near the intersection between the third and fourth trip segments 912C, 912D. The energy management system 826 may create or modify the trip plan to direct the vehicle 800 to stop at the wayside station 606, 608, 702, 708 and at least partially re-charge the onboard energy storage device 802 or otherwise obtain additional electric energy for charging the onboard energy storage device 802. The additional electric energy obtained from the off-board energy source is represented by a charging increase 1102 in the onboard stored electric energy 1100 of FIG. 11. The charging increase 1102 may provide the onboard energy storage device 802 with sufficient electric energy to allow the onboard energy storage device 802 to power the vehicle 800 along the remainder of the trip. While only one charging increase 1102 is shown in FIG. 11, alternatively, a greater number of charging increases may be implemented in the trip plan.

The examples described above in connection with FIGS. 9 through 11 describe the energy management system 826 modifying a trip plan to reduce an estimated trip load and/or to add electric energy to the onboard energy storage device 802 of the vehicle 800. In one embodiment, the energy management system 826 uses a combination of the techniques described herein to create and/or modify a trip plan.

In one embodiment, a trip plan can include operational settings that cause the vehicle 800 to automatically switch between which onboard source of electric energy is used to power and propel the vehicle 800. For example, over or during one or more segments of a trip (e.g., those segments associated with higher estimated trip loads), the trip plan may direct the controller 822 to automatically switch from using the onboard energy storage device 802 to power the traction motors 814 to using the prime mover (e.g., the engine 806 and generator 804) to power the traction motors 814. Over one or more other segments of the trip (e.g., the segments associated with lower estimated trip loads, restrictions on emissions that may restrict use of the engine 806, and the like), the trip plan may direct the controller 822 to automatically switch from using the prime mover to using the onboard energy storage device 802 to power the traction motors 814.

Additionally or alternatively, the energy management system 826 may modify the trip plan due to an excess of electric energy storage onboard the vehicle 800. If a first trip plan results in the vehicle 800 having an excess of onboard electric energy at one or more locations along the trip, the energy management system 826 can change the trip plan by increasing the power supplied to the vehicle 800. For example, the energy management system 826 can increase the electric energy supplied to the traction motors 814 to increase the power output of the motors 814 and/or increase the speed of the vehicle 800. Alternatively, the energy management system 826 may change the trip plan such that the vehicle 800 supplies at least some of the excess electric energy to an off-board location, such as a wayside station 606, 608, 702, 708 and/or a utility power grid. For example, the energy management system 826 can create or modify the trip plan such that the vehicle 800 has an excess of the electric energy that is conveyed to the wayside station and/or utility power grid via vehicle interface devices of the wayside stations, the catenary 818, or other devices. In one embodiment, different locations may financially compensate the operator or owner of the vehicle 800 for conveying electric energy in this manner. The energy management system 826 may create or modify the trip plan based on difference in the financial compensations. For example, the energy management system 826 may direct the vehicle 800 to supply excess electric energy to an off-board location within a geographic area that provides greater financial compensation than another off-board location in another geographic area that provides smaller financial compensation.

Figure 12:
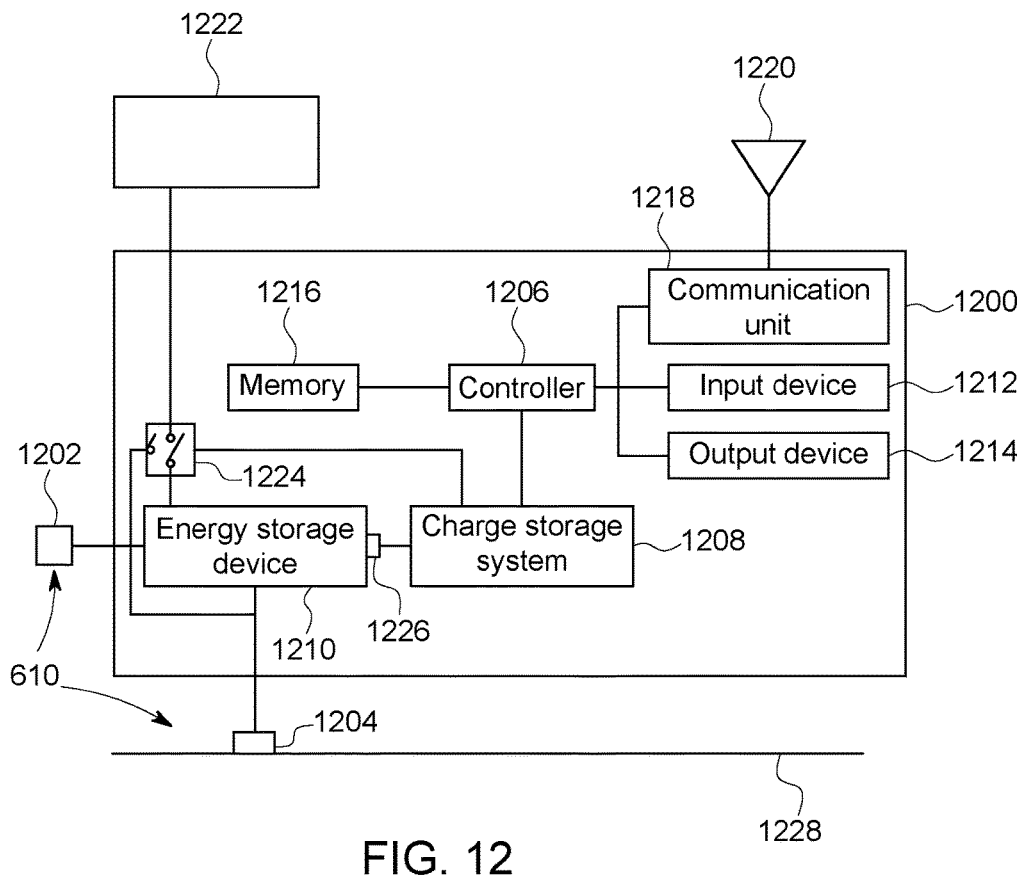
FIG. 12 is a schematic diagram of one embodiment of a wayside station.

FIG. 12 is a schematic diagram of one embodiment of a wayside station 1200. The wayside station 1200 may represent one of the wayside stations 606, 608, 702, 708 (shown in FIGS. 6 and 7). As described above, several wayside stations 1200 may be conductively coupled with an electrical power distribution system, such as the wayside electrical power distribution system 604 (shown in FIG. 6). The wayside stations 1200 are configured to provide electric energy (e.g., electric current) to the vehicle 800 (shown in FIG. 8), such as to charge the onboard energy storage device 802 (shown in FIG. 8) of the vehicle 800. The wayside station 1200 includes vehicle interface equipment 610 for interfacing with and providing power (e.g., electric energy) to the vehicle 800. The interface equipment 610 can include devices such as a connector 1202 that mates with another connector or interface device of the vehicle 800 that is conductively coupled with the onboard energy storage device 802 (such as a device similar to the shoe 830 or pantograph 816 shown in FIG. 8). The interface equipment 610 additionally or alternatively may include a connector 1204 that is conductively coupled with a conductor 1228 that extends alongside the route 812 (shown in FIG. 8), such as the catenary 818, an electrified rail, and the like.

The wayside station 1200 includes a power transfer system (e.g., similar to the power transfer systems 614 shown in FIG. 6) that includes a controller 1206, a charge storage system 1208, and an off-board energy storage device 1310. The energy storage device 1210 may represent the energy storage devices 616, 710 (shown in FIGS. 6 and 7) and/or be similar to the energy storage device 802 (shown in FIG. 8), but stored off-board of the vehicle 800 at the wayside station 1200. The energy storage device 1210 can represent one or more batteries, capacitors, wind turbines, solar cells, and the like.

The controller 1206 can include one or more processors, microcontrollers, or other logic-based devices, and/or associated software or instructions, for carrying out one or more operations described herein. The controller 1206 controls operations of the wayside station 1200, such as by controlling the flow of electric energy (e.g., current) to and from the off-board energy storage device 1210 so as to control how much electric energy is stored in the energy storage device 1210. The controller 1206 may be manually operated by receiving instruction signals from an input device 1212 (e.g., a device that receives input from an operator, such as a touchscreen, joystick, keyboard, switch, wheel, microphone, and the like) based on manual input from an operator at the input device 824. An output device 1214 (e.g., a display, monitor, touchscreen, speaker, light, and the like) can provide information to the operator, such as an amount of electric energy currently stored in the energy storage device 1210, a requested amount of electric energy from an approaching vehicle 800, and the like.

Alternatively or additionally, the controller 1206 may be automatically operated to autonomously control how much electric energy is stored at the energy storage device 1210. For example, an energy storage plan may be provided by the charge storage system 1208 and/or stored on a tangible and non-transitory computer readable storage medium, or memory 1216, that is accessible by the controller 1206. The energy storage plan may designate how much electric energy (e.g., in terms of joules, amps, and the like) is to be stored in the energy storage device 1210 and/or otherwise available at the wayside station 1200 for charging the onboard energy storage device 802 of the vehicle 800 with respect to time.

The charge storage system 1208 can include one or more processors, microcontrollers, or other logic-based devices, and/or associated software or instructions, for carrying out one or more operations described herein. The charge storage system 1208 may designate different amounts of electric energy to be stored in the energy storage device 1210 at different times for an energy storage plan based on a storage schedule. The storage schedule may be a designated or predetermined listing, table, or other memory structure, that directs how much electric energy is to be stored in the energy storage device 1210 at different times. Such a storage schedule may be created to ensure that more energy is stored and available for conveying to the vehicle 800 during known or identified time periods of larger traffic flow (e.g., during "rush hours" for the vehicles 800) or that less energy is stored during time periods of smaller traffic flow. Additionally or alternatively, the charge storage system 1208 may designate different amounts of electric energy to be stored in the energy storage device 1210 at different times for the energy storage plan based on a history of demand for electric energy. Such a history may represent how much electric energy is requested by vehicles 800 at different dates, times, and the like. Based on this history, the charge storage system 1208 may designate that greater amounts of electric energy be available during future dates and/or times that correspond to previous dates and/or times associated with increased demand. The charge storage system 1208 can designate that smaller amounts be available during future dates and/or time that correspond to previous dates and/or times associated with decreased demand.

Additionally or alternatively, the charge storage system 1208 may designate different amounts of electric energy to be stored in the energy storage device 1210 at different times for the energy storage plan based on requests received from the vehicles 800. The wayside station 1200 can include a communication unit 1218 (e.g., transceiver circuitry and hardware, such as a wireless antenna 1220) that communicates with the vehicle 800 and/or other wayside stations 1200. The communication units 1218, 832 of the wayside station 1200 and the vehicle 800 may be part of the communication system 724 (shown in FIG. 7) to provide the communication functionality 626, 722 (shown in FIGS. 6 and 7) so that the wayside station 1200 and vehicle 800 can communicate with each other.

The vehicle 800 can communicate a demand signal to the wayside station 1200 as the vehicle 800 moves along the route in order to notify the wayside station 1200 of an amount of electric energy requested by the vehicle 800. This amount of energy may be the energy that the vehicle 800 desires to obtain from the wayside station 1200 in order to charge the onboard energy storage device 802. For example, if the energy management system 826 of the vehicle 800 calculates a shortage of onboard stored electric energy based on a trip plan, then the energy management system 826 may direct the controller 822 of the vehicle 800 to notify the wayside station 1200 of the amount of electric energy that is needed to make up for part or all of this shortage. The demand signal that is sent from the vehicle 800 to the wayside station 1200 may include this information, as well as an estimated time of arrival of the vehicle 800 at the wayside station 1200.

The charge storage system 1208 may determine a total amount of electric energy that is demanded at various times. The total amount of demanded energy can include the energy demanded according to the preset or predetermined energy schedule, the historical energy demand, and/or the energy demanded from vehicles, as described above. While the energy that is demanded based on the energy schedule and/or historical energy demand may be static or have relatively little change over time, the energy demanded from vehicles may change significantly over time and be referred to as an ad hoc, dynamic, and/or variable demand.

The charge storage plan that is created and/or modified by the charge storage system 1208 may direct the energy storage device 1210 to store an amount of energy that is based on the total amount of demanded electric energy at the times associated with the total amount of demanded energy. In one embodiment, the charge storage system 1208 may compare the charge storage plan with a storage capacity of the energy storage device 1210 (e.g., the amount of electric energy that the energy storage device 1210 is capable of storing at a particular time). If sufficient storage capacity exists at the wayside station 1200, then the charge storage system 1208 may direct the energy storage device 1210 to store at least the total amount of demanded electric energy. The charge storage system 1208 may continue to monitor the storage capacity until the vehicle 800 arrives to ensure that sufficient electric energy is available to meet the demand of the vehicle 800.

The charge storage system 1208 may modify the energy storage plan if an unexpected (e.g., unplanned) change in the amount of stored electric energy and/or the demanded amount of electric energy changes prior to arrival of the vehicle 800. If the amount of electric energy that will be available when the vehicle 800 arrives is insufficient to meet the demand of the vehicle 800, then the charge storage system 1208 may direct the energy storage device 1210 to obtain more electric energy from an off-board source 1222 prior to arrival of the vehicle 800 and/or to convey electric energy from the off-board source 1222 to the vehicle 800 when the vehicle 800 arrives. The off-board source 1222 can represent one or more non-vehicle external sources of electric energy, such as remote energy storage devices, utility grids, local renewable power sources or other local power generation sources, and wide area renewable power sources or other wide area power generation sources. Additionally or alternatively, the off-board source 1222 can represent another wayside station 1200. For example, the off-board source 1222 can be a wayside station that is conductively coupled with the wayside station 1200 and able to convey electric current to and/or receive electric current from the wayside station 1200.

Figure 13:
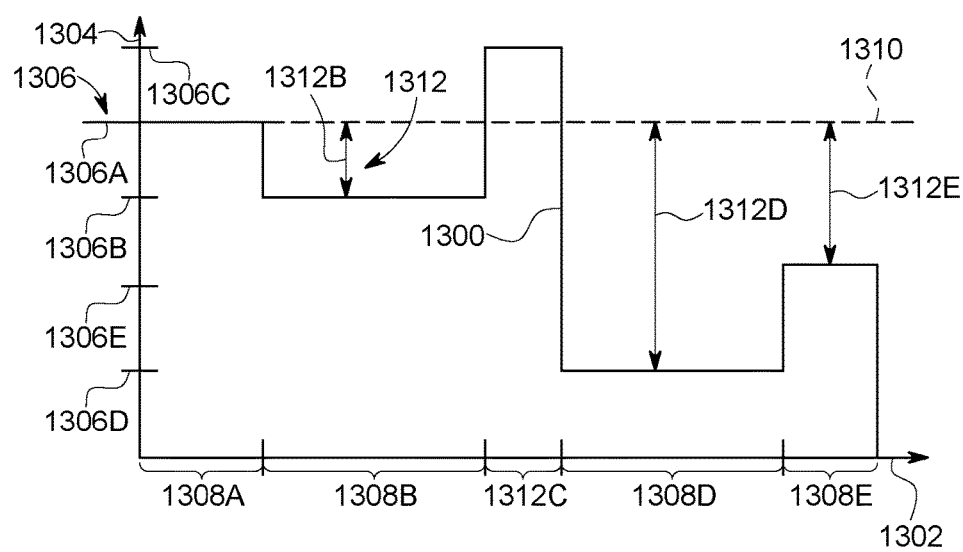
FIG. 13 illustrates one example of electric energy that is demanded from the wayside station shown in FIG. 12.

FIG. 13 illustrates one example of electric energy 1300 that is demanded from the wayside station 1200 (shown in FIG. 12). The demanded electric energy 1300 is shown alongside a horizontal axis 1302 representative of time and a vertical axis 1304 representative of a total amount of electric energy that is demanded from the wayside station 1200. The demanded electric energy 1300 can represent the total amount of electric energy that is demanded from the wayside station 1200 at different times, and may be based on or include electric energy associated with a preset or predetermined energy schedule, a historical energy demand, and/or the energy that may be demanded from vehicles from time to time.

The charge storage system 1208 determines the total demanded electric energy 1300 at different time periods. The demanded electric energy 1300 changes over time and, as shown in the example of FIG. 13, includes several different amounts 1306 (e.g., amounts 1306A-E) at different time periods 1308 (e.g., time periods 1308A-E). The charge storage system 1208 can compare the total demanded electric energy 1300 to a storage capacity 1310 of the off-board energy storage device 1210 (shown in FIG. 12) of the wayside station 1200. The capacity 1310 represents how much electric energy can be stored at the energy storage device 1210. In the illustrated example, the total demanded electric energy 1300 is at the capacity 1310 during the first time period 1308A, exceeds the capacity 1310 during the third time period 1308C, and remains below the capacity 1310 at other levels during the second, fourth, and fifth time periods 1308B, 1308D, 1308E.

In one embodiment, the charge storage system 1208 monitors an additional or available storage capacity 1312 (e.g., additional storage capacities 1312B, 1312D, 1312E) of the energy storage device 1210. The additional or available storage capacity 1312 represents the difference between the storage capacity 1310 of the storage device 1210 and the total demanded energy 1300 or the actual amount of electric energy stored in the storage device 1210 at a corresponding time period. The additional storage capacity 1312 represents the amount of additional electric energy that the wayside station 1200 can store for providing to the vehicle 800 at the current and/or future time periods 1308. Because the charge storage system 1208 can determine the total energy demand for future time periods 1308, the charge storage system 1208 also can determine the additional storage capacity 1312 for the future time periods 1308.

The charge storage system 1208 creates the energy storage plan based on the total demanded electric energy 1300 and/or additional storage capacity 1312 of the wayside station 1200. In one embodiment, the energy storage plan includes designated operational settings of the energy storage device 1210 that direct the energy storage device 1210 to receive and store designated amounts of electric energy at designated time periods. The amount of electric energy that is stored at the energy storage device 1210 at the designated time periods can be referred to as a reserve amount of energy. With respect to the illustrated example, the energy storage plan may direct the energy storage device 1210 to store electric energy at the first amount 1306A for the first time period 1308A, the second amount 1306B of electric energy for the second time period 1308B, and so on. The energy storage device 1210 may be coupled with switches or other components 1224 (shown in FIG. 12) that control when the energy storage device 1210 receives electric current from one or more sources, such as the off-board energy source 1222 (shown in FIG. 12). The charge storage system 1208 can operate the switches or other components 1224 to turn the flow of electric current from the off-board source 1222 to the energy storage device 1210 on or off based on the energy storage plan.

For example, the charge storage system 1208 may monitor the actual amount of electric energy stored in the energy storage device 1210 (e.g., by using an energy sensor 1226 coupled with the energy storage device 1210) and compare the actual amount to the total demanded electric energy 1300 at a current and/or upcoming time period 1308. If the actual amount of energy is less than the total demanded energy 1300, then the charge storage system 1208 may close the switch or other component 1224 to cause additional electric current to flow to and charge the energy storage device 1210. Alternatively or additionally, the charge storage system 1208 can communicate with the off-board source 1222 (e.g., via the communication unit 1218) to supply the additional electric energy to the energy storage device 1210 during time periods 1308 of increased demand.

If the energy storage device 1210 cannot store sufficient electric energy to meet the demand (e.g., during the time period 1308C, when the total energy demanded exceeds the storage capacity 1310 such that there is no additional storage capacity 1312), then the charge storage system 1208 can communicate with the off-board source 1222 to supply the electric energy to the vehicle 800. For example, the off-board source 1222 may supply some or all of the electric energy during the time period 1308C directly to the vehicle 800 (e.g., without flowing through the energy storage device 1210) or indirectly to the vehicle 800 (e.g., by first flowing to the energy storage device 1210 and then to the vehicle 800). The charge storage system 1208 can control this flow of electric energy using the switches or other components 1224. The charge storage system 1208 may modify the energy storage plan when changes in the total demanded energy 1300 occur. For example, if an additional, unplanned amount of electric energy is requested by the vehicle 800, another wayside station, and the like, during a current or upcoming time period 1308, the charge storage system 1208 can adaptively change the energy storage plan so that the additional electric energy is available at the corresponding time period 1308.

The charge storage systems 1208 and the vehicles 800 can communicate with each other so that the wayside stations 1200 have sufficient electric energy available to charge the onboard energy storage devices 802 of the vehicles 800 and/or directly power the vehicles 800, and so that the vehicles 800 can create and/or modify the trip plans of the vehicles 800 to ensure that the vehicles 800 can travel to and reach the wayside stations 1200. In one embodiment, different wayside stations 1200 include energy storage devices 1210 having different storage capacities 1310. The storage capacities 1310 may be known to the energy management systems 826 (shown in FIG. 8) of the vehicles 800. For example, the vehicles 800 may communicate with the wayside stations 1200 while the vehicles 800 are moving and/or prior to leaving on a trip to determine the storage capacities 1310 of the energy storage devices 1210 and/or the storage capacities 1310 may be stored on the memories 828 (shown in FIG. 8) of the vehicles 800. Based on these storage capacities 1310, the energy management system 826 of a vehicle 800 may formulate a trip plan to cause the vehicle 800 to travel to a selected wayside station 1200 having a larger storage capacity 1310 than one or more other wayside stations 1200 in order to recharge the onboard energy storage device 802. Alternatively, the energy management system 826 may create a trip plan that causes the vehicle 800 to travel to several wayside stations 1200 having smaller storage capacities 1310 in order to partially recharge the onboard energy storage device 802 at each of the stations 1200.

In another embodiment, the wayside stations 1200 and vehicles 800 may communicate with each other while the vehicles 800 are moving and/or prior to leaving on respective trips so that the vehicles 800 are aware of the additional storage capacities 1312 of the stations 1200 at one or more future time periods 1308. For example, the energy management system 826 may communicate with one or more wayside stations 1200 within a designated vicinity and/or those stations 1200 disposed along the route 812 being traveled by the vehicle 800. The energy management system 826 may communicate with the charge storage systems 1208 of the wayside stations 1200 in order to determine the expected additional storage capacities 1312 of the wayside stations 1200 during one or more upcoming time periods 1308.

Based on these additional storage capacities 1312 of the different wayside stations 1200, the energy management system 826 may select one or more of the wayside stations 1200 as locations to recharge the onboard energy storage device 802 of the vehicle 800. For example, the energy management system 826 can select a wayside station 1200 that has sufficient additional storage capacity 1312 to recharge the onboard energy storage device 802 at a time when the vehicle 800 is expected to arrive at the wayside station 1200. The energy management system 826 may create or modify a trip plan that causes the vehicle 800 to travel to the selected wayside station 1200 with the onboard energy storage device 802 having sufficient energy to power the vehicle 800 to the selected wayside station 1200. As described above, the energy management system 826 can communicate with the selected wayside station 1200 to direct the station 1200 to have at least a designated amount of available electric energy to recharge the onboard energy storage device 802 when the vehicle 800 arrives.

The energy management system 826 of the vehicle 800 also can monitor changes in the load parameters as the vehicle 800 moves along the route 812 and modify the trip plan while the vehicle 800 is moving. For example, the energy management system 826 may receive updates on the load parameters such as changes in the network traffic congestion between a current location of the vehicle 800 and a destination location or a wayside station, changes in the amount of available energy that is stored at an upcoming wayside station, and the like. The energy management system 826 can examine the trip plan to determine if these updates to the load parameters cause the estimated trip load to exceed the total electric energy that is available to power the vehicle 800 at one or more locations. If the updates do result in the estimated trip load exceeding the available electric energy, then the energy management system 826 can modify the trip plan to reduce the estimated trip load (e.g., by operating at slower speeds) and/or acquire additional electric current from another source (e.g., by taking a different route having a powered catenary 818 or powered section of the route).

Figure 18:
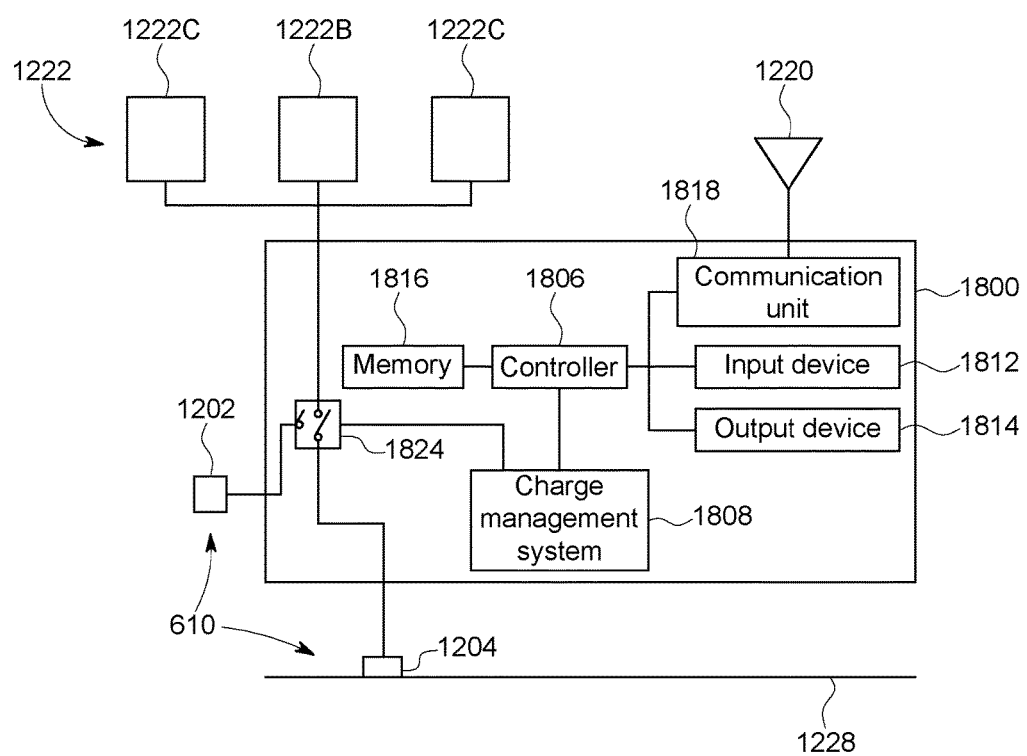
FIG. 18 is a schematic diagram of another embodiment of a wayside station.

FIG. 18 is a schematic diagram of another embodiment of a wayside station 1800. The wayside station 1800 may represent one of the wayside stations 606, 608, 702, 708 (shown in FIGS. 6 and 7). As described above, several wayside stations 1800 may be conductively coupled with an electrical power distribution system, such as the wayside electrical power distribution system 604 (shown in FIG. 6). The wayside stations 1800 are configured to provide electric energy (e.g., electric current) to the vehicle 800 (shown in FIG. 8), such as to charge the onboard energy storage device 802 (shown in FIG. 8) of the vehicle 800. The wayside station 1800 includes the vehicle interface equipment 610 for interfacing with and providing power (e.g., electric energy) to the vehicle 800.

The wayside station 1800 includes a power transfer system (e.g., similar to the power transfer systems 614 shown in FIG. 6) that includes a controller 1806 and a charge management system 1808. The controller 1806 can include one or more processors, microcontrollers, or other logic-based devices, and/or associated software or instructions, for carrying out one or more operations described herein. The controller 1806 controls operations of the wayside station 1800, such as by controlling the flow of electric energy (e.g., current) from two or more off-board sources 1222 of energy (e.g., sources 1222A-C in the illustrated embodiment, although another number of sources 1222 may be used).

The controller 1806 may be manually operated by receiving instruction signals from an input device 1812 (e.g., a device that receives input from an operator, such as a touchscreen, joystick, keyboard, switch, wheel, microphone, and the like) based on manual input from an operator at the input device 1812. An output device 1814 (e.g., a display, monitor, touchscreen, speaker, light, and the like) can provide information to the operator, such as an amount of electric energy being supplied by one or more of the off-board sources 1222, a requested amount of electric energy from an approaching vehicle 800, and the like.

Alternatively or additionally, the controller 1806 may be automatically operated to autonomously control how much electric energy is provided from one or more of the off-board sources 1222. For example, an energy allocation plan may be provided by the charge management system 1808 and/or stored on a tangible and non-transitory computer readable storage medium, or memory 1816, that is accessible by the controller 1806. The energy allocation plan may designate how much electric energy (e.g., in terms of joules, amps, and the like) is to be provided by the different sources 1222 for charging the onboard energy storage device 802 of the vehicle 800 and/or powering the vehicle 800 at different time periods.

The charge management system 1808 can include one or more processors, microcontrollers, or other logic-based devices, and/or associated software or instructions, for carrying out one or more operations described herein. The charge management system 1808 may designate different amounts of electric energy to be supplied by different individual off-board sources 1222 or different combinations of the off-board sources 1222 at different times to establish the energy allocation plan. The allocation plan may be a designated or predetermined listing, table, or other memory structure, that directs how much electric energy is to be supplied by one or more of the different off-board sources 1222 at different times. Such an allocation plan may be created to ensure that sufficient energy is available and/or provided for conveying to the vehicle 800 during known or identified time periods of larger traffic flow (e.g., during "rush hours" for the vehicles 800) or that less energy is provided during time periods of smaller traffic flow. Additionally or alternatively, the charge management system 1808 may designate different amounts of electric energy to be provided by the different off-board sources 1222 at different times for the energy storage plan based on a history of demand for electric energy. Such a history may represent how much electric energy is requested by vehicles 800 at different dates, times, and the like. Based on this history, the charge management system 1808 may designate that greater amounts of electric energy be available during future dates and/or times that correspond to previous dates and/or times associated with increased demand. The charge management system 1808 can designate that smaller amounts be available during future dates and/or time that correspond to previous dates and/or times associated with decreased demand.

The charge management system 1808 can create the energy allocation plan based on differences in financial costs of energy supplied by the different off-board sources 1222. For example, the off-board source 1222A may provide more expensive energy than the off-board source 1222B during a first time period but less expensive energy than the off-board source 1222B and/or 1222C during a different, second time period. The charge management system 1808 can create the energy allocation plan such that less energy is provided by the off-board source 1222A during the first time period (and/or more energy is provided by the off-board source 1222B and/or 1222C) and that more energy is provided by the off-board source 1222A during the second time period (and/or less energy is provided by the off-board source 1222B and/or 1222C).

Additionally or alternatively, the charge management system 1808 may designate different amounts of electric energy to be provided by different ones of the off-board sources 1222 at different times for the energy allocation plan based on requests received from the vehicles 800. The wayside station 1800 can include a communication unit 1818 (e.g., transceiver circuitry and hardware, such as a wireless antenna 1220) that communicates with the vehicle 800 and/or other wayside stations 1800. The communication units 1818, 832 of the wayside station 1800 and the vehicle 800 may be part of the communication system 724 (shown in FIG. 7) to provide the communication functionality 626, 722 (shown in FIGS. 6 and 7) so that the wayside station 1800 and vehicle 800 can communicate with each other.

Similar to as described above in connection with the wayside station 1200 shown in FIG. 12, the vehicle 800 can communicate a demand signal to the wayside station 1800 as the vehicle 800 moves along the route in order to notify the wayside station 1800 of an amount of electric energy requested by the vehicle 800. The demand signal that is sent from the vehicle 800 to the wayside station 1800 may include this information, as well as an estimated time of arrival of the vehicle 800 at the wayside station 1200.

The charge management system 1808 may determine a total amount of electric energy that is demanded at various times, similar to as described above in connection with the charge storage system 1208 shown in FIG. 12. The energy allocation plan that is created and/or modified by the charge management system 1808 may be used to control the flow of energy from one or more of the off-board sources 1222 over time. For example, the charge management system 1808 may determine the demanded electric energy that is demanded over time similar to the demanded electric energy 1300 shown in FIG. 13.

The charge management system 1808 creates the energy allocation plan based on the demanded electric energy. In one embodiment, the energy allocation plan includes designated amounts of electric energy that are to be supplied by the different off-board sources 1222 at designated time periods to meet some or all of the demanded electric energy at different times. The charge management system 1808 can be coupled with one or more switches or other components 1824. The switches or other components 1824 can individually control the flow of electric energy from each of the off-board sources 1222. For example, the switches or other components 1824 can control when electric current flows from each of the off-board sources 1222. The charge management system 1808 can operate the switches or other components 1824 to turn the flow of electric current from each of the off-board sources 1222 based on the energy allocation plan. For example, the charge management system 1808 can direct the switches or other components 1824 to allow the off-board source 1222A to supply electric current to the vehicle 800 while blocking the flow of electric current from the off-board source 1222B and/or 1222C during a first time period, to allow the off-board source 1222B to supply electric current to the vehicle 800 while blocking the flow of electric current from the off-board source 1222A and/or 1222C during a subsequent, second time period, to allow the off-board source 1222C (and/or 1222A or 1222B) to supply electric current to the vehicle 800 while blocking the flow of electric current from the off-board source 1222A and/or 1222B during a subsequent, third time period according to the energy allocation plan.

Figure 14:
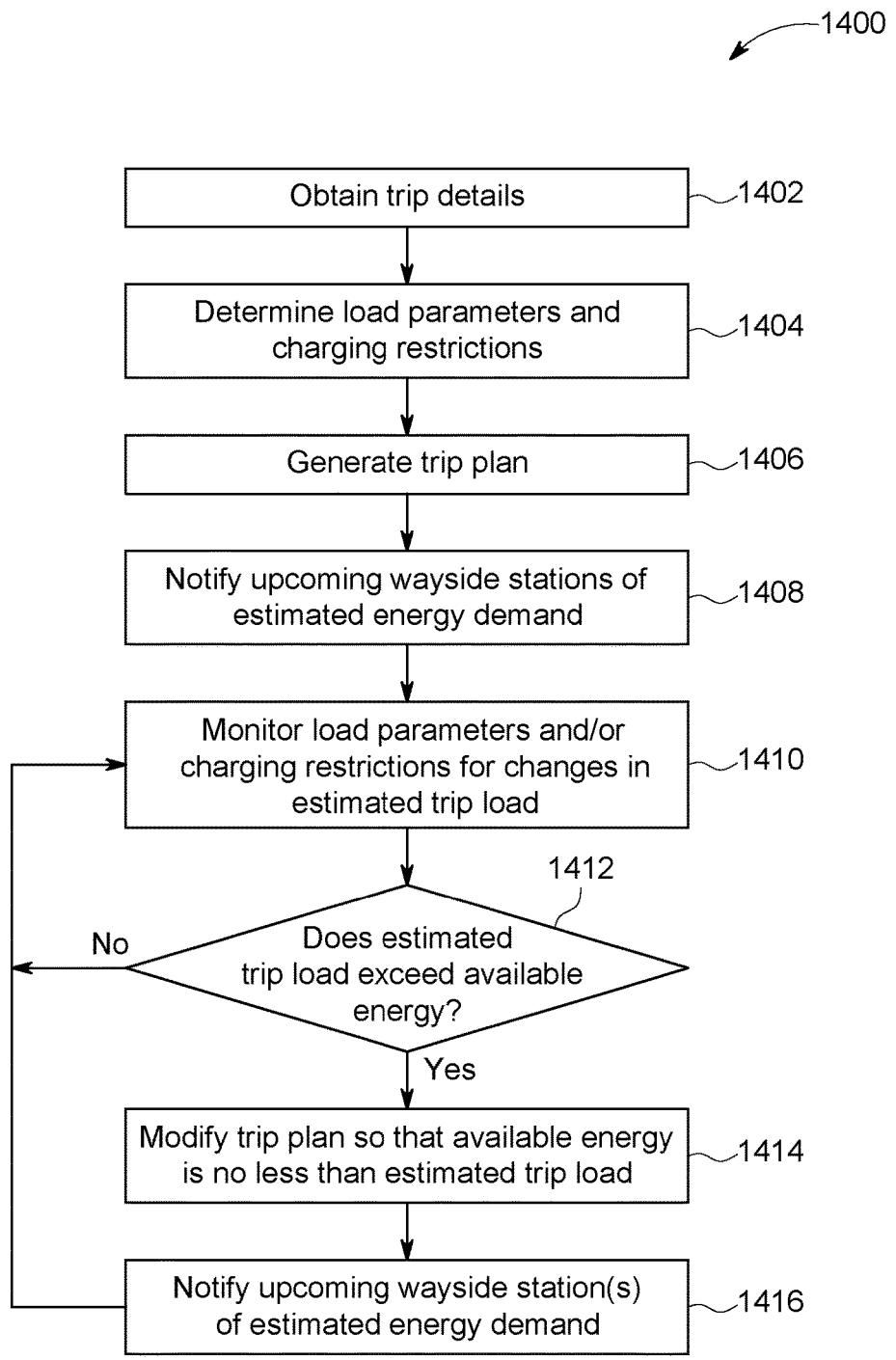
FIG. 14 illustrates a flowchart of one embodiment of a method for controlling and/or powering a vehicle.

FIG. 14 illustrates a flowchart of one embodiment of a method 1400 for controlling and/or powering a vehicle. The method 1400 may be used in conjunction with one or more embodiments of the systems described above. At 1402, details of a trip for a vehicle are obtained. For example, a destination location, a scheduled or desired time of arrival, restrictions on which routes can be traveled along, and the like, can be received by the energy management system 826 (shown in FIG. 8) of the vehicle 800 (shown in FIG. 8).

At 1404, load parameters and charging restrictions for the trip are determined. For example, the weight of the vehicle 800, the grade of one or more segments of the route 812 (shown in FIG. 8) over which the vehicle 800 will travel for the trip, efficiencies of the traction motors 814 (shown in FIG. 8) of the vehicle 800, the amount of electric energy consumed by other electric loads of the vehicle 800, transportation network congestion that impacts (e.g., slows down) travel along the route 812 of the trip, limitations on the amount of energy that can be stored by the onboard energy storage device 802 (shown in FIG. 8) of the vehicle 800, an amount of energy that is currently stored in the onboard energy storage device 802, the number of onboard energy storage devices 802 onboard the vehicle 800, resistance losses of the vehicle 800, locations of off-board energy sources (e.g., the distances to and/or between the wayside stations 1200 shown in FIG. 12 and/or the powered sections of the route 812), the amount of energy that is available for charging the onboard energy storage device 802 at one or more of the off-board energy sources, a charging capacity at one or more of the off-board energy sources, locations or segments of the route 812 where no off-board energy sources are available, the financial cost of obtaining electric energy from the off-board energy sources, and the like, may be received. This information may be communicated to the energy management system 826, such as by being input by an operator of the vehicle 800 or transmitted from an off-board location.

At 1406, a trip plan for the vehicle to travel along the route for the trip is generated. As described above, the trip plan includes designated operational settings of the vehicle 800 at various locations of the trip. The energy management system 826 can calculate the estimated trip loads of the trip based on the operational settings, the load parameters, and/or the charging restrictions.

At 1408, upcoming wayside stations are notified of the estimated energy demand of the vehicle. For example, the energy management system 826 can calculate how much electric energy may be needed to recharge the onboard energy storage device 802 from one or more wayside stations 1200 disposed along the route 812 of the trip. The energy management system 826 can notify these stations 1200 of the amount of electric energy that will be needed and/or when the vehicle 800 is expected or scheduled to arrive at the wayside station 1200.

At 1410, the load parameters and/or charging restrictions are monitored as the vehicle travels along the trip for changes. The load parameters and/or charging restrictions can be monitored in order to identify changes that cause the estimated trip loads of the previously generated trip plan to change. Changes in the load parameters and/or charging restrictions can be monitored by an operator of the vehicle 800, by the energy management system 826 or controller 822 (e.g., using one or more sensors), by communications from an off-board location, and the like.

At 1412, a determination is made as to whether any changes in the estimated trip loads of the previously generated trip plan cause the estimated trip loads to exceed the electric energy that is available to power the vehicle. For example, the energy management system 826 can determine if an increase in an estimated trip load for an upcoming portion of the trip (e.g., that is caused by a change in a load parameter and/or charging restriction) results in the vehicle 800 having insufficient electric energy (e.g., stored in the onboard energy storage device 802) to power the vehicle 800 to a designated location of the trip plan. If there is insufficient electric energy, then the trip plan may need to be modified. As a result, flow of the method 1400 may proceed to 1414. On the other hand, if there still is sufficient electric energy, then the trip plan may not need to be modified. As a result, flow of the method 1400 can return to 1410, where the load parameters and/or charging restrictions continue to be monitored as the vehicle 800 travels along the route 812. Alternatively, even if there is still sufficient electric energy to meet the changed estimated trip load, flow of the method 1400 may continue to 1414 in order to determine if the trip plan can be modified to preserve additional electric energy stored onboard the vehicle 800 for one or more additional portions of the trip, to avoid having to obtain additional electric energy from a wayside station 1200, and the like.

At 1414, the trip plan is modified so that the electric energy that is available to the vehicle is no less than the estimated trip load. For example, the energy management system 826 can change the designated operational settings of the vehicle 800, change when and/or where the vehicle 800 obtains additional electric energy, and/or change which onboard power source is used by the vehicle 800 (e.g., the energy storage device 802 or the prime mover) to propel the vehicle 800 at one or more locations of the trip. These changes may be made to reduce the estimated trip load for one or more segments of the trip and/or to reduce the consumption of electric energy stored onboard the vehicle 800.

At 1416, upcoming wayside stations are notified of the estimated energy demand of the vehicle based on the modified trip plan. For example, the changes to the trip plan may result in the vehicle 800 stopping at a different upcoming wayside station 1200 for charging the onboard energy storage device 802, obtaining a different amount of electric energy from the wayside station 1200 (relative to what was previously reported to or requested from the wayside station 1200 at 1408), and/or arriving at the wayside station 1200 at a different time (relative to what was previously reported to or requested from the wayside station 1200 at 1408). The estimated energy demand from the modified trip plan may be communicated to the different wayside station 1200, the different amount of energy that is demanded may be communicated to the wayside station 1200, and/or the different time of arrival may be communicated to the wayside station 1200. This information may be communicated so that the wayside station 1200 has sufficient electric energy to charge the onboard storage device 802 of the vehicle 800 when the vehicle 800 arrives. Flow of the method 1400 may then return to 1410. The method 1400 may continue in a loop-wise manner until the trip is terminated.

Figure 15:
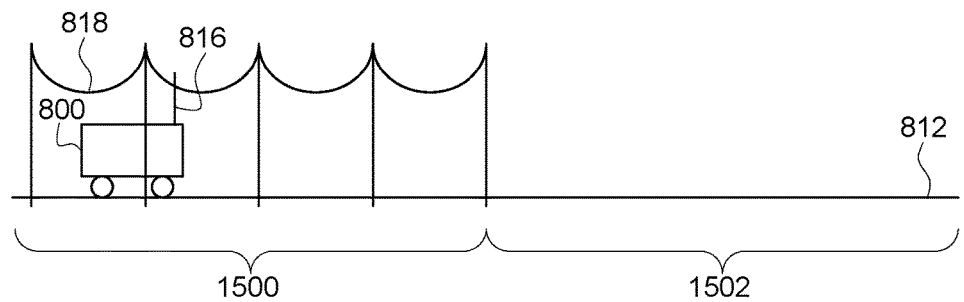
FIG. 15 illustrates operation of the vehicle shown in FIG. 8 in accordance with one or more embodiments of the subject matter described herein.

FIG. 15 illustrates operation of the vehicle 800 in accordance with one or more embodiments of the subject matter described herein. In the illustrated embodiment, the vehicle 800 travels along the route 812 that includes a powered portion 1500 and an unpowered portion 1502. The powered portion 1500 includes external power sources, such as the catenaries 818 and/or an electrified rail. The unpowered portion 1502 does not include any external power sources. For example, the unpowered portion 1502 does not include any off-board sources of electric current that can power the vehicle 800.

The vehicle 800 may use the energy management system 826 and the onboard energy storage device 802 to travel along the powered and unpowered portions 1500, 1502 of the route 812. The energy management system 826 can generate a trip plan for the vehicle 800 that designates operational settings of the vehicle 800 so that the vehicle 800 has sufficient energy stored in the onboard energy storage device 802 to propel the vehicle 800 through the powered and unpowered portions 1500, 1502. The energy management system 826 can monitor the state of charge of the energy storage device 802 (e.g., an amount of stored energy that is currently available) and/or one or more performance characteristics of the energy storage device 802. The performance characteristics can represent the health of the energy storage device 802, and can include specific gravity of the energy storage device 802, voltage stored in the energy storage device 802, results of a load test of the energy storage device 802, and the like. Based on the load parameters, charging restrictions, state of charge, and the performance characteristics described above, the energy management system 826 generates the trip plan, also as described above.

In one embodiment, the trip plan may direct the controller 822 to charge the energy storage device 802 using the energy from the catenary 818 (and/or electrified rail or other off-board energy source) while the vehicle 800 travels through the powered portion 1500 of the route 812. Alternatively or additionally, the trip plan may direct the controller 822 to charge the energy storage device 802 using electric energy generated by the alternator 804 while the traction motors 814 are powered by the catenary 818 (and/or electrified rail or other off-board energy source).

The energy management system 826 may create and/or modify the trip plan as the vehicle 800 travels based on a variety of factors, such as previously acquired characteristics of the route 812 (e.g., the grade, curvature, friction, and the like, of the route 812 that was measured during a previous trip of the vehicle 800 or another vehicle along the route 812), currently acquired characteristics of the route 812 (e.g., characteristics that are measured by onboard sensors of the vehicle 800 during the current trip), the current state of charge of the energy storage device 802, and/or the performance characteristics of the energy storage device 802. As described above, the trip plan may be generated to ensure that the vehicle 800 can be powered to travel to a destination, taking into account that the vehicle 800 will have an external source of energy during the powered portion 1500 but not during the unpowered portion 1502. For example, the trip plan may direct the vehicle 800 to consume more electric energy (e.g., by traveling at faster speeds, greater torque settings for the traction motors 814, charging the energy storage device 802 from the catenary 818, and the like) while in the powered portion 1500 but consume less electric energy from the onboard energy storage device 802 (e.g., by traveling at slower speeds, using smaller torque settings, slower accelerations, using regenerative braking to charge the energy storage device 802, and the like) while in the unpowered portion 1502 so that the vehicle 800 has sufficient energy to reach the destination.

The energy management system 826 may modify the trip plan while the vehicle 800 is traveling based on unplanned events or occurrences. For example, the trip plan may be previously created based on an assumption that the vehicle 800 will be able to obtain at least a designated amount of electric energy from the catenary 818, regenerative braking using the traction motors 814, and the like. But, during actual travel of the vehicle 800, the amount of electric energy that is obtained from the catenary 818, regenerative braking, and the like, may be less than designated amount. For example, the amount of current supplied by the catenary 818 may be less than expected due to an increased amount of traffic (e.g., other vehicles) concurrently drawing electric current from the catenary 818 at the same time. When the amount of energy that is actually obtained to power the vehicle 800 and/or charge the energy storage device 802 is different (e.g., less) than the expected or planned amount of energy of the trip plan, then the energy management system 826 may modify the designated operational settings of the trip plan. For example, the energy management system 826 may reduce the speed, torque, acceleration, and the like, settings of the vehicle 800 that are designated by the trip plan. The energy management system 826 can monitor the amount of energy that is actually received from the catenary 818, regenerative braking, and the like, by monitoring the current that flows through the control system 840 of the vehicle 800.

Figure 16:
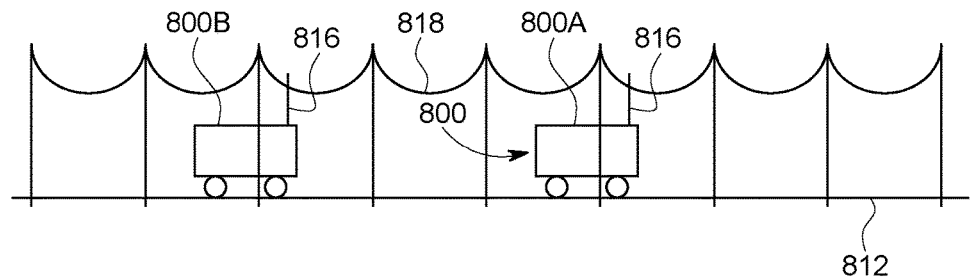
FIG. 16 illustrates operation of plural vehicles shown in FIG. 8 in accordance with one or more embodiments of the subject matter described herein.
Figure 17:
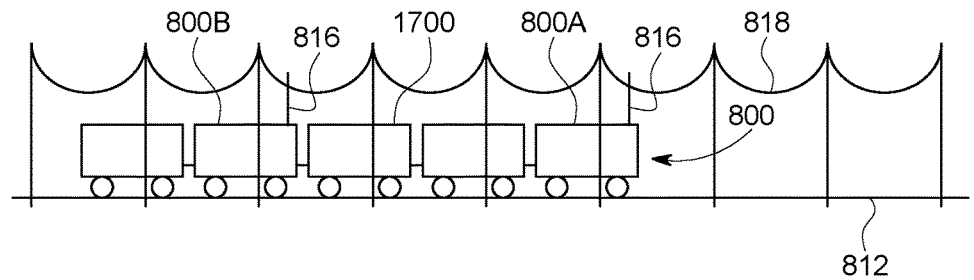
FIG. 17 illustrates other operation of plural vehicles shown in FIG. 8 in accordance with one or more embodiments of the subject matter described herein.

FIGS. 16 and 17 illustrate operation of plural vehicles 800 (e.g., vehicles 800A and 800B) in accordance with one or more embodiments of the subject matter described herein. In the illustrated embodiment, the vehicles 800 travel along the route 812 that includes an external power source, such as the catenaries 818 and/or an electrified rail. The vehicles 800 may concurrently travel along the route 812 such that both vehicles 800 concurrently draw electric current from the catenary 818 (or other external power source). While only two vehicles 800 are shown, alternatively, more vehicles 800 may concurrently draw power from the catenary 818. Additionally, the vehicles 800 are separate and not connected with each other. Alternatively, the vehicles 800 may be connected with each other, such as by one or more non-powered units 1502 (e.g., rail cars or other vehicles that are not capable of self-propulsion), as shown in the embodiment of FIG. 17.

In the one embodiment, the vehicles 800 may communicate with each other in order to coordinate the consumption and/or transfer of electric current by the vehicles 800. For example, the vehicles 800 may coordinate how much electric current each vehicle 800 draws from the catenary 818 at various locations and/or points in time. The energy management systems 826 of the vehicles 800 may communicate with each other so that the total energy that is concurrently drawn by the vehicles 800 from the catenary 818 does not exceed a designated threshold, such as an upper limit on the amount of electric current that the catenary 818 is capable of conveying and/or a current amount of electric current that is being conveyed by the catenary 818.

The energy management systems 826 can coordinate with each other as to how much current each vehicle 800 draws from the catenary 818 so that the vehicles 800 have sufficient electric current to meet the needs of the trip plan(s) being used by the vehicles 800. For example, the vehicle 800A may communicate how much electric current that the vehicle 800A needs from the catenary 818 in order to power the vehicle 800A and/or to charge the energy storage device 802 of the vehicle 800A according to the trip plan of the vehicle 800A to the other vehicle 800B. The vehicle 800B may use this information to limit how much current that the vehicle 800B draws from the catenary 818 and/or to modify the trip plan of the vehicle 800B so that the total current drawn by the vehicles 800 from the catenary 818 does not exceed a designated threshold, such as an upper limit on the amount of electric current that the catenary 818 is capable of conveying and/or a current amount of electric current that is being conveyed by the catenary 818. Similarly, the vehicle 800B may communicate how much electric current that the vehicle 800B needs from the catenary 818 in order to power the vehicle 800B and/or to charge the energy storage device 802 of the vehicle 800B according to the trip plan of the vehicle 800B to the other vehicle 800A. The vehicle 800A may use this information to limit how much current that the vehicle 800A draws from the catenary 818 and/or to modify the trip plan of the vehicle 800A, as described above.

In one embodiment, the vehicles 800 can communicate with each other in order to determine whether to transfer electric energy between each other. The vehicles 800 may each assess a mission need for energy from the catenary 818 (or other off-board power source). This mission need for each vehicle 800 may represent the amount of electric current that is needed to charge the energy storage device 802 of the vehicle 800 and/or to power the vehicle 800 to reach a designated location, such as the destination of the vehicle 800. The mission needs of the vehicles 800 are communicated with each other (e.g., wirelessly using the communication units 832 and/or through wired connections of the connected vehicles 800 shown in FIG. 17).

The energy management system 826 of one or more of the vehicles 800 compares the mission needs of the vehicles 800 to determine if one vehicle 800 has a greater need for electric current than the other vehicle 800. Additionally, the amount of electric energy stored onboard the vehicles 800 may be communicated. The energy management system 826 may examine the mission needs and/or the amount of stored energies to establish a charge transfer option. A charge transfer option represents a modification to the trip plan of one or more of the vehicles 800 that includes directions to transfer stored electric energy from one vehicle 800A or 800B to the other vehicle 800B or 800A, such as through the catenary 818.

The energy management system 826 of the vehicle 800A that is to transmit energy to the other vehicle 800B can examine how much energy is to be transferred and compare this amount of energy to the energy stored onboard the same vehicle 800A. If the amount of energy to be transferred is smaller than the amount of stored energy, then the energy management system 826 can examine the trip plan for the vehicle 800A to determine if the trip plan needs to be modified due to the transfer of energy. For example, the transfer of energy may cause the vehicle 800A to have insufficient energy to follow the trip plan. The trip plan may then need to be modified in order to reduce the amount of energy consumed by the vehicle 800A, as described above. The vehicle 800A may then transfer energy to the vehicle 800B, such as by discharging electric current from the energy storage device 802 of the vehicle 800A through the catenary 818 to the energy storage device 802 of the vehicle 800B.

Optionally, the controller of one vehicle can send a signal that requests that a mobile re-powering unit be dispatched to rendezvous with the vehicle and recharge the one or more energy storage devices. For example, the vehicle 800A shown in FIG. 16 may wirelessly communicate a signal to the vehicle 800B that requests the vehicle 800B travel to or toward the vehicle 800A (or to a rendezvous location that the vehicle 800A is headed toward). The vehicle 800B can then transfer electric energy stored onboard the vehicle 800B (e.g., in one or more energy storage devices of the vehicle 800B) to the vehicle 800A (e.g., to the energy storage device(s) of the vehicle 800A), as described herein.

The controller is configured to change operation of the vehicle to ensure that the vehicle can travel completely through the unpowered segment. The controller can change operation of the vehicle in one or more of a variety of ways to ensure that the vehicle is able to traverse or otherwise travel through the portion of the route between the powered segments. For example, the controller can switch which of two or more onboard energy storage devices or power sources of the vehicle provide electric energy to the vehicle to power the vehicle. The controller can change a speed and/or torque of the vehicle, change which route the vehicle travels on between the powered segments (e.g., change a direction in which the vehicle is moving to travel on another powered segment and/or to travel on a shorter and/or downhill unpowered segment).

The controller optionally can select a subset of motors that is less than the full number of available motors to power the vehicle. For example, the controller can deactivate one or more of the motors of the vehicle while keeping one or more other motors of the vehicle active (or by activating those motors). This can reduce the rate at which electric energy stored onboard the vehicle (and available during travel through the unpowered segment of the route) is consumed, and may extend the distance that the vehicle can travel without additional charging energy being provided from the catenary, powered rail, or the like.

Optionally, the controller can send a signal that requests that a mobile re-powering unit be dispatched to rendezvous with the vehicle and recharge the one or more energy storage devices. For example, the vehicle 800A shown in FIG. 16 may wirelessly communicate a signal to the vehicle 800B that requests the vehicle 800B travel to or toward the vehicle 800A (or to a rendezvous location that the vehicle 800A is headed toward). The vehicle 800B can then transfer electric energy stored onboard the vehicle 800B (e.g., in one or more energy storage devices of the vehicle 800B) to the vehicle 800A (e.g., to the energy storage device(s) of the vehicle 800A), as described herein.

The controller can operate or direct the energy storage device(s) to operate in a mode that causes degradation of the energy storage device(s) to drop below a determined or designated empty charge level of the energy storage device(s), but that provides sufficient power from the energy storage device(s) to power the vehicle to a recharging location (wayside recharger or the second powered segment of the route). For example, a battery may have a lower storage limit that dictates when the battery is depleted of stored energy. But, this lower storage limit may not be the absolute lowest amount of energy that the battery can store, and the battery may store additional energy below this lower limit. The controller may otherwise be prevented from directing the motor(s) of the vehicle to draw energy from the battery once the battery is at the lower limit. But, in at least one embodiment, the controller can change the operating mode of the battery to allow for the battery to supply energy to power the vehicle even though the battery is at or below the lower storage limit. This can provide the vehicle with an emergency supply of energy to get to a recharging location.

Optionally, the controller can initiate a fuel consuming motor or engine to generate power to either aid in the propulsion of the vehicle and/or to recharge the energy storage device. For example, the controller can activate a motor or engine to operate and propel the vehicle or to generate electric current that is stored in the energy storage device(s).

The controller can change operation of the vehicle to draft or mechanically couple to another vehicle to lower the power needed to propel the vehicle having the controller so that the unpowered segment can be traversed with the amount of remaining power stored in the energy storage device(s) of the vehicle having the controller. For example, the controller onboard a first vehicle can increase the throttle setting of the first vehicle to speed up or slow down, change the route being traveled by the first vehicle, or the like, to cause the first vehicle to travel closely behind a second vehicle such that the first vehicle benefits from reduced wind resistance from travel of the second vehicle. Alternatively, the controller can direct the first vehicle to mechanically couple with the second vehicle. Either of these operations can reduce the amount of energy needed to propel the first vehicle and/or allow the first vehicle to travel a longer distance than would otherwise be possible.

In another example, the controller can increase the speed at which the vehicle is moving in the first powered segment of the route so that the vehicle is able to gain momentum and travel through the unpowered segment of the route to the second powered segment of the route. This can allow for the vehicle to traverse the entire unpowered segment of the route, even if the energy storage device(s) onboard the vehicle are depleted of stored energy. For example, the momentum of the vehicle can carry the vehicle through at least part of the unpowered segment of the route to the second powered segment of the route.

Optionally, the controller can overcharge one or more of the energy storage device(s) onboard the vehicle while the vehicle is traveling in the first powered segment of the route. Overcharging the storage device(s) can include directing electric current into the storage device(s) (e.g., by keeping the switch 1224 closed) after the level of charge stored in the storage device(s) is at or above an upper storage limit. This can allow for the energy storage device(s) to potentially store extra energy to be used in powering the vehicle to traverse the entire unpowered segment of the route.

As described above, the wayside stations 1200 can provide additional electric energy to the vehicles 800 in order to assist the vehicles 800 in reaching destinations along the route 812. The wayside stations 1200 may be single, stand alone stations (e.g., although coupled with a source of energy, as described above) or multiple stations that are interconnected so that the stations can transfer electric current between the stations. The availability of electric current from the wayside stations 1200 may be incorporated into the trip plans generated by the energy management systems 826. For example, the energy management systems 826 can create trip plans that direct the vehicles 800 to acquire additional electric energy from one or more wayside stations 1200. The additional electric energy may be used as a "power boost," such as the addition of electric energy that allows the vehicle 800 to travel at faster speeds, greater accelerations, and the like, that the vehicle 800 would otherwise be unable to do using just energy from the onboard energy storage device 802 while still reaching a designated destination of a trip plan. Alternatively or additionally, the additional electric energy may be used to ensure that the vehicle 800 has sufficient electric energy to reach a designated destination of a trip plan.

In another embodiment, a control system (e.g., for controlling operations of a vehicle) includes a controller and an energy management system. The controller is configured to be disposed onboard a vehicle that includes one or more motors that propel the vehicle along a route during a trip and an onboard energy storage device for storing at least some of the electric energy used to power the one or more motors. The controller also is configured to control operations of the one or more motors according to a trip plan that designates operational settings of the one or more motors during the trip. The energy management system may be configured to be communicatively coupled with the controller. The energy management system is configured to calculate estimated electric loads of powering the one or more motors over one or more segments of the trip according to the designated operational settings of the trip plan and determine a demanded amount of electric energy for powering the vehicle based on one or more of the estimated electric loads. The demanded amount of electric energy is based on a stored amount of electric energy in the onboard energy storage device. The energy management system is further configured to communicate the demanded amount of electric energy to one or more of plural wayside stations disposed along the route so that the wayside stations have sufficient electric energy to charge the onboard energy storage device with the electric energy to meet the one or more of the estimated electric loads.

In another aspect, the energy management system is configured to compare the one or more of the estimated electric loads with the stored amount of electric energy in the onboard energy storage device and to change one or more of the operational settings of the trip plan based on a difference between the one or more estimated electric loads and the stored amount of electric energy.

In another aspect, the energy management system is configured to change the one or more of the operational settings of the trip plan for an upcoming portion of the trip to reduce the estimated electric load for the upcoming portion of the trip when the estimated electric load exceeds the stored amount of electric energy for the upcoming portion of the trip.

In another aspect, at least one of the estimated electric loads calculated by the energy management system represents an amount of electric energy that is calculated to be consumed to propel the vehicle through an unpowered segment of the route from a first powered segment to a second powered segment. The first and second powered segments represent portions of the route that have external sources of electric energy extending alongside the route for at least one of charging the onboard energy source or powering the one or more motors.

In another aspect, the estimated electric loads are associated with electric loads used to power the vehicle to different designated locations along the route. The energy management system is configured to compare the estimated electric loads and to at least one of generate or modify the trip plan based on the estimated electric loads so that the vehicle has sufficient electric energy stored in the onboard energy source to travel to the designated location associated with at least one of the estimated electric loads.

In another aspect, the energy management system is configured to at least one of generate or modify the trip plan so that there is sufficient electric energy available to the vehicle to travel to the wayside stations having a lower cost of charging the onboard energy storage device relative to one or more other wayside stations.

In another aspect, the energy management system is configured to determine at least one of total energy storage capacities or available energy storage capacities of the wayside stations, determine additional estimated electric loads that are representative of amounts of the electric energy used to propel the vehicle to the wayside stations, compare the at least one of the total energy storage capacities or the available energy storage capacities of the wayside stations, and to at least one of generate or modify the trip plan based on the additional estimated electric loads and the at least one of the total energy storage capacities or the available energy storage capacities of the wayside stations that are compared.

In another aspect, the energy management system is configured to calculate the estimated electric loads based on one or more of transportation network congestion that is representative of an amount of vehicular traffic in a transportation network that includes the route, a scheduled time of arrival of the vehicle at one or more designated locations, a grade of one or more segments of the route, a speed limit associated with one or more segments of the route, a size of the vehicle, a weight of the vehicle, a power output of the vehicle, or a rate of electric energy consumption of the vehicle.

In another aspect, the energy management system is configured to calculate the estimated electric loads based on charging restrictions that limit at least one of when the vehicle can obtain additional electric energy to charge the onboard energy storage device, where the vehicle can obtain additional electric energy to charge the onboard energy storage device, or how much additional electric energy the vehicle can obtain to charge the onboard energy storage device.

In another aspect, the charging restrictions include one or more of a distance along the route to the wayside charging stations, amounts of reserve electric energy at the wayside stations that will be available for the vehicle to charge the onboard energy storage device when the vehicle arrives at the wayside stations, or financial costs of charging the onboard energy storage device at the wayside stations.

In another aspect, the trip plan directs the vehicle to automatically switch between powering the one or more motors using the electric energy stored in the onboard energy storage device and powering the one or more motors using electric energy generated onboard the vehicle from a generator.

In another aspect, the operational settings of the trip plan include at least one of throttle settings, power outputs, or speeds of the vehicle that are expressed as a function of at least one of time or distance along the route.

In another aspect, the energy management system is configured to communicate an estimated time of arrival with the demanded amount of electric energy to the one or more of plural wayside stations disposed along the route so that the wayside stations have sufficient electric energy to charge the onboard energy storage device of the vehicle when the vehicle arrives.

In another embodiment, a control system (e.g., for controlling charging of a vehicle) includes a controller and a charge storage system. The controller is configured to be disposed at a wayside station having an off-board energy storage device that charges an onboard energy storage device of a vehicle traveling along a route during a trip. The controller also is configured to communicate with the vehicle as the vehicle travels along the route in order to determine a demanded amount of electric energy from the vehicle. The charge storage system is configured to be communicatively coupled with the controller and the off-board energy storage device at the wayside station. The charge storage system also is configured to at least one of generate or modify an energy storage plan that designates how much of the electric energy is to be stored in the off-board energy storage device during different time periods based on the demanded amount of electric energy that is received from the vehicle.

In another aspect, the controller is configured to receive an estimated time of arrival from the vehicle and the charge storage system is configured to direct the off-board energy storage device to acquire additional electric energy to meet the demanded amount of electric energy of the vehicle prior to arrival of the vehicle.

In another aspect, the charge storage system is configured to at least one of generate or modify the energy storage plan so that at least a total amount of demanded electric energy is stored in the off-board energy storage device. The total amount of demanded electric energy includes the demanded amount of electric energy from the vehicle and an amount of electric energy obtained from at least one of a predetermined energy schedule of the wayside station or a history of prior electric energy demands communicated to the wayside station.

In another aspect, the charge storage system is configured to compare the charge storage plan with a storage capacity of the off-board energy storage device and to direct an off-board electric energy source other than the off-board energy storage device to supply electric current to the vehicle when the demanded amount of electric energy from the vehicle exceeds the storage capacity of the off-board energy storage device.

In another embodiment, a method (e.g., for controlling operations of a vehicle) includes calculating estimated electric loads of powering one or more motors of a vehicle with electric energy stored in an onboard energy storage device over one or more segments of a trip according to designated operational settings of a trip plan. The method also includes determining a demanded amount of the electric energy for powering the vehicle based on one or more of the estimated electric loads. The demanded amount of electric energy is based on a stored amount of electric energy in the onboard energy storage device. The method further includes communicating the demanded amount of electric energy to one or more of plural wayside stations disposed along a route of the trip so that at least a selected station of the wayside stations has sufficient electric energy to charge the onboard energy storage device with the electric energy to meet the one or more of the estimated electric loads when the vehicle arrives at the selected station.

In another aspect, the method also includes comparing the one or more of the estimated electric loads with the stored amount of electric energy in the onboard energy storage device and changing one or more of the operational settings of the trip plan based on a difference between the one or more estimated electric loads and the stored amount of electric energy.

In another aspect, the one or more of the operational settings of the trip plan are changed for an upcoming portion of the trip to reduce the estimated electric load for the upcoming portion of the trip when the estimated electric load exceeds the stored amount of electric energy for the upcoming portion of the trip.

In another aspect, at least one of the estimated electric loads represents an amount of electric energy that is stored in the onboard energy storage device and that is calculated to be consumed to propel the vehicle through an unpowered segment of the route from a first powered segment to a second powered segment. The first and second powered segments represent portions of the route that have external sources of electric energy extending alongside the route for at least one of charging the onboard energy source or powering the one or more motors.

In another aspect, the method also includes at least one of generating or modifying the trip plan so that there is sufficient electric energy available to the vehicle to travel to the wayside stations having a lower cost of charging the onboard energy storage device relative to one or more other wayside stations.

In another aspect, the estimated electric loads are calculated based on one or more of transportation network congestion that is representative of an amount of vehicular traffic in a transportation network that includes the route, a scheduled time of arrival of the vehicle at one or more designated locations, a grade of one or more segments of the route, a speed limit associated with one or more segments of the route, a size of the vehicle, a weight of the vehicle, a power output of the vehicle, or a rate of electric energy consumption of the vehicle.

In another aspect, the estimated electric loads are calculated based on charging restrictions that limit at least one of when the vehicle can obtain additional electric energy to charge the onboard energy storage device. The vehicle can obtain additional electric energy to charge the onboard energy storage device, or how much additional electric energy the vehicle can obtain to charge the onboard energy storage device.

In another aspect, the charging restrictions include one or more of a distance along the route to the wayside charging stations, amounts of reserve electric energy at the wayside stations that will be available for the vehicle to charge the onboard energy storage device when the vehicle arrives at the wayside stations, or financial costs of charging the onboard energy storage device at the wayside stations.

In another aspect, the operational settings of the trip plan include at least one of throttle settings, power outputs, or speeds of the vehicle that are expressed as a function of at least one of time or distance along the route.

In another aspect, the method also includes communicating an estimated time of arrival with the demanded amount of electric energy to the selected station of the wayside stations so that the selected station has sufficient electric energy to charge the onboard energy storage device of the vehicle when the vehicle arrives at the selected station.

In another embodiment, a system for powering vehicles includes a first wayside station and a second wayside station. The first wayside station is configured to provide electrical power to an electric vehicle. The second wayside station is configured to provide electrical power to the electric vehicle and is spaced apart from the first wayside station. One or both of the first and second wayside stations respectively comprise one or more of the following: an energy storage device for storing electrical energy, a first power transfer system, or a second power transfer system. The storage device has a maximum capacity of no more than a mean power demand of the wayside station, or no more than the mean power demand plus ten percent. The first power transfer system is configured to control transfer of electrical power between the first and second wayside stations. The second power transfer system is configured to control transfer of electrical power from one or more external sources to one or more of the first and second wayside stations. The first power transfer system and/or the second power transfer system are configured to control the transfer of electrical power based on one or more of: one of the wayside stations having a present demand or expected demand that exceeds a present capacity or an expected capacity of the wayside station; or a cost determination of one or more costs associated with electrical power provided from the energy storage device, electrical power provided between the wayside stations, or electrical power provided from the one or more external sources.

In another aspect, the system also includes a communication system that is configured to at least one of: communicate between the wayside stations for exchange of information relating to the present demand, the expected demand, the present capacity, the expected capacity, or the cost determination; communicate between one or more of the wayside stations and one or more electric vehicles, for exchange of information relating to the cost determination, to expected or present power demands of the vehicles, and/or to movement of the vehicles; communicate between one or more of the wayside stations and the one or more external sources, for exchange of information relating to the present demand, the expected demand, the present capacity, the expected capacity, the cost determination, or electrical power available from the one or more sources; or communicate between one or more of the wayside stations and a central location, for exchange of information relating to any of the foregoing.

In another embodiment, a system for controlling an electric vehicle includes a control module configured to be operably coupled with the electric vehicle and to generate signals for controlling at least one of tractive effort of the electric vehicle or a source of electrical power for the vehicle based on one or more of: (a) one or more onboard parameters comprising: a schedule of the vehicle; a location of the vehicle with respect to wayside stations along a route of the vehicle, the wayside stations configured to provide electrical power to the vehicle; a maximum capacity and/or a present capacity of an energy storage device on board the vehicle; one or more costs associated with powering the vehicle using energy from a first onboard source comprising an energy storage device; or one or more parameters relating to powering the vehicle using energy from one or more second onboard sources different from the energy storage device; or (b) one or more off-board parameters comprising: cost information associated with powering the vehicle using energy from the wayside stations; locations of the wayside stations; or a present and/or an expected capacity of the wayside stations for providing electrical power to the vehicle.

In another embodiment, another system (e.g., for controlling a vehicle) includes a controller and an energy management system. The controller is configured to be disposed onboard a first vehicle that includes one or more motors that propel the vehicle along a route during a trip, an onboard energy storage device for storing at least some of the electric energy used to power the one or more motors, and a power interface device that receives electric current from at least one of a catenary or an electrified rail. The energy management system is configured to be communicatively coupled with the controller. The energy management system also is configured to determine a stored amount of electric energy that is stored in the onboard energy storage device and to receive a requested amount of electric energy from a second vehicle. The energy management system is further configured to compare the stored amount of electric energy with the requested amount of electric energy and, based on this comparison, transmit at least some of the stored amount of electric energy to the second vehicle through the power interface device and the at least one of the catenary or electrified rail.

In another aspect, the energy management system is configured to determine a needed amount of electric energy to power the one or more motors and propel the first vehicle to a designated location. The energy management system is further configured to compare the stored amount of electric energy, the needed amount of electric energy, and the requested amount of electric energy to determine whether to transmit the at least some of the stored amount of electric energy to the second vehicle.

In another aspect, the energy management system is configured to direct the energy storage device to transmit the at least some of the stored amount of electric energy when the energy storage device will have sufficient remaining electric energy stored in the energy storage device to reach a designated location after transmitting the at least some of the stored electric energy to the second vehicle.

In another embodiment, another control system includes a controller and a charge management system. The controller is configured to be disposed at a wayside station having an off-board energy source that charges an onboard energy storage device of a vehicle traveling along a route during a trip. The controller also is configured to communicate with the vehicle as the vehicle travels along the route in order to determine a demanded amount of electric energy from the vehicle. The charge management system is configured to be communicatively coupled with the controller and the off-board energy source of the wayside station. The charge management system also is configured to at least one of generate or modify an energy allocation plan that designates how much of the electric energy is to be allocated in association with the off-board energy source, for use in charging the onboard energy storage device of the vehicle, at one or more different time periods.

In one embodiment, a control system includes a controller for a vehicle that includes one or more motors that propel the vehicle along a main route during a trip. The vehicle also includes an onboard energy storage system having one or more energy storage devices for storing at least some of the electric energy used to power the one or more motors, and configured to receive electric current from at least one of an electrified rail or a catenary line. The controller is configured to control operation of the one or more motors according to a trip plan during the trip, and to determine that there is insufficient electric energy stored onboard the vehicle to power the vehicle based at least in part on an amount of electric energy that is calculated to be needed to be consumed to propel the vehicle through an unpowered segment of the main route from a first powered segment to a second powered segment. The first and second powered segments represent portions of the main route that have the at least one of the electrified rail or the catenary line for at least one of charging the onboard power source or powering the one or more motors. The unpowered segment of the route does not have the at least one of the electrified rail or the catenary line. The controller also is configured to change operation of the vehicle to ensure that the vehicle can travel completely through the unpowered segment by at least one of: switching which of the one or more energy storage devices provides the electric energy to the vehicle, changing speed of the vehicle, changing a torque of the one or more motors, changing a direction of movement of the vehicle to travel from the main route onto a second route of the vehicle that extends from a current location of the vehicle to a wayside station, selecting a subset of the one or more motors that is less than a full number of available motors to power the vehicle, requesting that a mobile re-powering unit be dispatched to rendezvous with the vehicle and recharge the one or more energy storage devices, running the one or more energy storage devices in a mode that causes degradation of the one or more energy storage devices or that causes the one or more energy storage devices to decrease below a determined empty charge level of the one or more energy storage devices, initiating a fuel consuming motor to generate power to either aid in propulsion of the vehicle or to recharge the one or more energy storage devices, selecting a route to travel through the unpowered segment that, while different from the main route, is traversable with the amount of energy in the one or more energy storage devices, controlling the vehicle to draft or mechanically couple to another vehicle to lower a power consumption requirement so that the unpowered segment can be traversed with an amount of remaining power stored in the one or more energy storage devices, and/or controlling the vehicle to gain momentum or to generate an overcharge on the one or more energy storage devices during movement in the first powered segment that is sufficient to traverse the non-powered segment.

The main route can be a designated or planned route of a trip. For example, the main route can be the route or set of connected routes that extend from one location to another location, where the main route is the fastest path between the locations (e.g., having fewer stops, faster speed limits, or the like), the shortest path between the locations, or the like. Alternatively, the main route can be a route having more traffic lanes than other routes. Alternatively, the main route can be a route being built to withstand greater traffic and/or vehicular weight, such as a main rail line. In another embodiment, the main route is a selected or previously scheduled route for a trip. The main route alternatively can be referred to as a designated route.

Optionally, the controller can enact a single one of the switching, changing, selecting, running, initiating, selecting, or controlling actions to perform or implement. Alternatively, the controller can enact two or more of these actions or operations. For example, the controller can implement at least two of these actions to achieve a goal (e.g., of traveling through the unpowered section of the route.). The controller can calculate a total energy amount that is estimated for traversing the unpowered section of the route. This total energy amount can be based on the distance through the unpowered section of the route, the size of the vehicle system, the weight of the vehicle system, wind direction and/or speed, grades of the route, and/or other factors.

For example, the controller can estimate that more energy is needed to power and propel the vehicle system through the unpowered section of the route for longer distances through the unpowered section of the route to the next powered section of the route, for longer vehicle systems, for heavier vehicle systems, for faster wind speeds that are opposite to the direction of travel of the vehicle system, for uphill grades of the route, and the like. The controller can estimate that less energy is needed to power and propel the vehicle system through the unpowered section of the route for shorter distances through the unpowered section of the route to the next powered section of the route, for shorter vehicle systems, for lighter vehicle systems, for slower wind speeds that are opposite to the direction of travel of the vehicle system, for wind speeds that are in the same direction as the direction of travel of the vehicle system, for downhill grades of the route, and the like. The controller can base the estimated amount of energy on previous trips of the same or another vehicle system through the unpowered section of the route, such as by comparing the size and weight of the vehicle system with the size and weight of another vehicle system that previously traveled through the unpowered section of the route, and increasing or decreasing the estimated energy based on whether the vehicle system is larger, smaller, heavier, or lighter than the vehicle system that previously completed travel through the unpowered section of the route.

The controller can select the action(s) to implement based on how much energy would be created and/or saved by each different action. For example, switching which energy storage device provides electric energy to the vehicle may provide 10% of the energy needed to travel through the unpowered section of the route. Changing the speed of the vehicle may provide 40% of the energy needed to travel through the unpowered section of the route. Changing the torque of the one or more motors may provide 15% of the energy needed to travel through the unpowered section of the route. Changing a direction of movement of the vehicle may provide 5% of the energy needed to travel through the unpowered section of the route. Selecting fewer motors to power the vehicle may provide 20% of the energy needed to travel through the unpowered section of the route. Requesting that the mobile re-powering unit be dispatched to recharge the energy storage devices may provide 50% of the energy needed to travel through the unpowered section of the route. Running the energy storage devices in a mode that causes degradation of the energy storage devices or that causes the energy storage devices to decrease below the determined empty charge level of the one or more energy storage devices may provide 5% of the energy needed to travel through the unpowered section of the route. Initiating the fuel consuming motor to generate power may provide 30% of the energy needed to travel through the unpowered section of the route. Selecting the route to travel that is different from the main route may provide 3% of the energy needed to travel through the unpowered section of the route. Controlling the vehicle to draft or mechanically couple to another vehicle may provide 50% of the energy needed to travel through the unpowered section of the route. Controlling the vehicle to gain momentum or generate the overcharge may provide 20% of the energy needed to travel through the unpowered section of the route.

While no single one of these actions is estimated to provide 100% of the energy needed to travel through the unpowered section of the route, the controller can select a combination of these actions to implement to provide 100% of the needed energy. For example, the controller can switch which energy storage device provides electric energy to the vehicle (10% of the needed energy), change the speed of the vehicle (40% of the needed energy), select fewer motors to power the vehicle (20% of the needed energy), and initiate the fuel consuming motor to generate power (30% of the needed energy).

Optionally, the controller is configured to change operation of the vehicle to ensure that the vehicle can travel completely through the unpowered segment by changing the direction of movement of the vehicle to travel from the main route onto the second route of the vehicle that extends from the current location of the vehicle to the wayside station. The wayside station can be configured to charge the one or more energy storage devices with enough electric current that the vehicle can travel to the second powered segment of the main route.

Optionally, the controller is configured to determine the amount of electric energy that is calculated to be needed to be consumed to propel the vehicle through the unpowered segment of the main route independent of a current location of the vehicle.

Optionally, the controller is configured determine the amount of electric energy that is calculated to be needed to be consumed to propel the vehicle through the unpowered segment of the main route while the controller is disposed onboard the vehicle.

Optionally, the controller is configured to change the operation of the vehicle so that there is sufficient electric energy available to the vehicle to travel to the wayside station having a lower cost of charging the one or more onboard energy storage devices relative to one or more other wayside stations.

Optionally, the controller is configured to calculate the amount of electric energy that is needed to be consumed to propel the vehicle through the unpowered segment of the main route based on one or more of transportation network congestion, a scheduled time of arrival of the vehicle at one or more designated locations, a grade of one or more segments of the main route, a speed limit associated with one or more segments of the main route, a size of the vehicle, a weight of the vehicle, a power output of the vehicle, or a rate of electric energy consumption of the vehicle.

Optionally, the controller is configured to calculate the amount of electric energy that is needed to be consumed to propel the vehicle through the unpowered segment of the main route based on charging restrictions that limit at least one of when the vehicle can obtain additional electric energy to charge the one or more energy storage devices, where the vehicle can obtain additional electric energy to charge the one or more energy storage devices, or how much additional electric energy the vehicle can obtain to charge the one or more energy storage devices.

Optionally, the charging restrictions include one or more of a distance along the route to the wayside recharging stations, amounts of reserve electric energy at the wayside recharging stations that will be available for the vehicle to charge the one or more energy storage devices, or financial costs of charging the one or more energy storage devices at the wayside recharging stations.

In one embodiment, a control system includes a controller for a motorized vehicle having one or more energy storage devices that power one or more motors of the vehicle and that receive electric current from one or more of a catenary or an electrified portion of a route while the vehicle travels over powered segments of the route. The controller is configured to control operation of the vehicle during movement of the vehicle and to determine that the one or more energy storage devices have insufficient stored electric energy to power the one or more motors to propel the vehicle through an unpowered segment of the route that does not have the catenary or electrified portion of the route for supplying the electric current to the one or more energy storage devices. The controller is configured to change the operation of the vehicle to ensure that the vehicle can travel completely through the unpowered segment of the route by at least one of: switching which of the one or more energy storage devices powers the one or more motors, changing a speed of the vehicle, changing a torque of the one or more motors, changing the route traveled by the vehicle, reducing how many of the one or more motors is propelling the vehicle, requesting a recharging vehicle provide additional electric current to the one or more energy storage devices, drawing the electric current from the one or more energy storage devices to a level below a lower limit of the one or more energy storage devices, activating a fuel-consuming motor of the vehicle to propel the vehicle, activating the fuel-consuming motor of the vehicle to charge the one or more energy storage devices, moving the vehicle to draft or mechanically couple to another vehicle, and/or controlling the vehicle to gain momentum or to generate an overcharge on the one or more energy storage devices during movement prior to entering the unpowered segment of the route.

Optionally, the controller also is configured to control the operation of the vehicle to cause the vehicle to change the route traveled by the vehicle to a wayside station that is configured to charge the one or more energy storage devices with enough electric current that the vehicle can travel through the unpowered segment of the route.

Optionally, the controller is configured to calculate an amount of electric energy that is needed to be consumed to propel the vehicle through the unpowered segment of the route based on one or more of transportation network congestion, a scheduled time of arrival of the vehicle at one or more designated locations, a grade of the route, a speed limit of the route, a size of the vehicle, a weight of the vehicle, a power output of the vehicle, or a rate of electric energy consumption of the vehicle.

Optionally, the controller is configured to calculate the amount of electric energy that is needed to propel the vehicle through the unpowered segment of the route based on charging restrictions that limit at least one of when the vehicle can obtain additional electric energy to charge the one or more energy storage devices, where the vehicle can obtain additional electric energy to charge the one or more energy storage devices, or how much additional electric energy the vehicle can obtain to charge the one or more energy storage devices.

Optionally, the charging restrictions include one or more of a distance along the route to one or more wayside recharging stations, amounts of reserve electric energy at the one or more wayside recharging stations that will be available for the vehicle to charge the one or more energy storage devices, or financial costs of charging the one or more energy storage devices at the one or more wayside recharging stations.

Optionally, the one or more motors of the vehicle include two or more motors each separately rotating a different axle of the vehicle, and wherein the controller is configured to change operation of the vehicle by deactivating one or more of the motors while one or more other motors remain active to propel the vehicle.

Optionally, the controller is configured to determine which of the motors to deactivate based on one or more of a tractive load of the vehicle or a temperature of the motors.

In one embodiment, a method includes determining whether one or more energy storage devices of a motorized vehicle have enough stored energy to power one or more motors of the vehicle and propel the vehicle through an unpowered segment of a route that does not have a catenary or an electrified rail to power the one or more motors or charge the one or more energy storage devices, and, responsive to determining that the one or more energy storage devices do not have enough stored energy to propel the vehicle through the unpowered segment of the route, one or more of: switching which of the one or more energy storage devices powers the one or more motors, changing a speed of the vehicle, changing a torque of the one or more motors, changing the route traveled by the vehicle, reducing how many of the one or more motors is propelling the vehicle, requesting a recharging vehicle provide additional electric current to the one or more energy storage devices, drawing the electric current from the one or more energy storage devices to a level below a lower limit of the one or more energy storage devices, activating a fuel-consuming motor of the vehicle to propel the vehicle, activating the fuel-consuming motor of the vehicle to charge the one or more energy storage devices, moving the vehicle to draft or mechanically couple to another vehicle, and/or controlling the vehicle to gain momentum or to generate an overcharge on the one or more energy storage devices during movement prior to entering the unpowered segment of the route.

Optionally, the method also includes controlling the operation of the vehicle to cause the vehicle to deviate from the route to a wayside station that is configured to charge the one or more energy storage devices with enough electric current that the vehicle can travel through the unpowered segment of the route.

Optionally, the method also includes calculating an amount of electric energy that is needed to be consumed to propel the vehicle through the unpowered segment of the route based on one or more of transportation network congestion, a scheduled time of arrival of the vehicle at one or more designated locations, a grade of the route, a speed limit of the route, a size of the vehicle, a weight of the vehicle, a power output of the vehicle, or a rate of electric energy consumption of the vehicle.

Optionally, the one or more motors of the vehicle include two or more motors each separately rotating a different axle of the vehicle, and the method also includes deactivating one or more of the motors while one or more other motors remain active to propel the vehicle.

Optionally, the method also includes determining which of the motors to deactivate based on one or more of a tractive load of the vehicle or a temperature of the motors.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U. S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A control system comprising:
a controller for a vehicle that includes one or more motors that propel the vehicle along a main route during a trip, and an onboard energy storage system having one or more energy storage devices for storing at least some electric energy used to power the one or more motors, and configured to receive electric current from at least one of an electrified rail or a catenary line,
wherein the controller is configured to:
control operation of the one or more motors according to a trip plan during the trip,
determine that there is insufficient electric energy stored onboard the vehicle to power the vehicle based at least in part on an amount of electric energy that is calculated to be needed to be consumed to propel the vehicle through an unpowered segment of the main route from a first powered segment to a second powered segment, the first and second powered segments representing portions of the main route that have the at least one of the electrified rail or the catenary line for at least one of charging the one or more energy storage devices or powering the one or more motors, the unpowered segment of the route not having the at least one of the electrified rail or the catenary line,
change operation of the vehicle to ensure that the vehicle can travel completely through the unpowered segment by at least one of:
switching which of the one or more energy storage devices provides the electric energy to the vehicle,
changing speed of the vehicle,
changing a torque of the one or more motors,
changing a direction of movement of the vehicle to travel from the main route onto a second route of the vehicle that extends from a current location of the vehicle to a wayside station,
selecting a subset of the one or more motors that is less than a full number of available motors to power the vehicle,
requesting that a mobile re-powering unit be dispatched to rendezvous with the vehicle and recharge the one or more energy storage devices,
running the one or more energy storage devices in a mode that causes degradation of the one or more energy storage devices or that causes the one or more energy storage devices to decrease below a determined empty charge level of the one or more energy storage devices,
initiating a fuel consuming motor to generate power to either aid in propulsion of the vehicle or to recharge the one or more energy storage devices,
selecting a route to travel through the unpowered segment that, while different from the main route, is traversable with the amount of energy in the one or more energy storage devices, controlling the vehicle to draft or mechanically couple to another vehicle to lower a power consumption requirement so that the unpowered segment can be traversed with an amount of remaining power stored in the one or more energy storage devices, or controlling the vehicle to gain momentum or to generate an overcharge on the one or more energy storage devices during movement in the first powered segment that is sufficient to traverse the non-powered segment.

2. The control system of claim 1, wherein the controller is configured to change operation of the vehicle to ensure that the vehicle can travel completely through the unpowered segment by changing the direction of movement of the vehicle to travel from the main route onto the second route of the vehicle that extends from the current location of the vehicle to the wayside station, wherein the wayside station is configured to charge the one or more energy storage devices with enough electric current that the vehicle can travel to the second powered segment of the main route.

3. The control system of claim 1, wherein the controller is configured to determine the amount of electric energy that is calculated to be needed to be consumed to propel the vehicle through the unpowered segment of the main route independent of a current location of the vehicle.

4. The control system of claim 1, wherein the controller is configured determine the amount of electric energy that is calculated to be needed to be consumed to propel the vehicle through the unpowered segment of the main route while the controller is disposed onboard the vehicle.

5. The control system of claim 1, wherein the controller is configured to change the operation of the vehicle so that there is sufficient electric energy available to the vehicle to travel to the wayside station having a lower cost of charging the one or more onboard energy storage devices relative to one or more other wayside stations.

6. The control system of claim 1, wherein the controller is configured to calculate the amount of electric energy that is needed to be consumed to propel the vehicle through the unpowered segment of the main route based on one or more of transportation network congestion, a scheduled time of arrival of the vehicle at one or more designated locations, a grade of one or more segments of the main route, a speed limit associated with one or more segments of the main route, a size of the vehicle, a weight of the vehicle, a power output of the vehicle, or a rate of electric energy consumption of the vehicle.

7. The control system of claim 1, wherein the controller is configured to calculate the amount of electric energy that is needed to be consumed to propel the vehicle through the unpowered segment of the main route based on charging restrictions that limit at least one of when the vehicle can obtain additional electric energy to charge the one or more energy storage devices, where the vehicle can obtain additional electric energy to charge the one or more energy storage devices, or how much additional electric energy the vehicle can obtain to charge the one or more energy storage devices.

8. The control system of claim 7, wherein the charging restrictions include one or more of a distance along the route to the wayside recharging stations, amounts of reserve electric energy at the wayside recharging stations that will be available for the vehicle to charge the one or more energy storage devices, or financial costs of charging the one or more energy storage devices at the wayside recharging stations.

9. A control system comprising:

a controller for a motorized vehicle having one or more energy storage devices that power one or more motors of the vehicle and that receive electric current from one or more of a catenary or an electrified portion of a route while the vehicle travels over powered segments of the route, wherein the controller is configured to control operation of the vehicle during movement of the vehicle and to determine that the one or more energy storage devices have insufficient stored electric energy to power the one or more motors to propel the vehicle through an unpowered segment of the route that does not have the catenary or electrified portion of the route for supplying the electric current to the one or more energy storage devices, wherein the controller is configured to change the operation of the vehicle to ensure that the vehicle can travel completely through the unpowered segment of the route by at least one of:

switching which of the one or more energy storage devices powers the one or more motors, changing a speed of the vehicle, changing a torque of the one or more motors, changing the route traveled by the vehicle, reducing how many of the one or more motors is propelling the vehicle, requesting a recharging vehicle provide additional electric current to the one or more energy storage devices, drawing the electric current from the one or more energy storage devices to a level below a lower limit of the one or more energy storage devices, activating a fuel-consuming motor of the vehicle to propel the vehicle, activating the fuel-consuming motor of the vehicle to charge the one or more energy storage devices, moving the vehicle to draft or mechanically couple to another vehicle, or controlling the vehicle to gain momentum or to generate an overcharge on the one or more energy storage devices during movement prior to entering the unpowered segment of the route.

10. The control system of claim 9, wherein the controller also is configured to control the operation of the vehicle to cause the vehicle to change the route traveled by the vehicle to a wayside station that is configured to charge the one or more energy storage devices with enough electric current that the vehicle can travel through the unpowered segment of the route.

11. The control system of claim 9, wherein the controller is configured to calculate an amount of electric energy that is needed to be consumed to propel the vehicle through the unpowered segment of the route based on one or more of transportation network congestion, a scheduled time of arrival of the vehicle at one or more designated locations, a grade of the route, a speed limit of the route, a size of the vehicle, a weight of the vehicle, a power output of the vehicle, or a rate of electric energy consumption of the vehicle.

12. The control system of claim 9, wherein the controller is configured to calculate the amount of electric energy that is needed to propel the vehicle through the unpowered segment of the route based on charging restrictions that limit at least one of when the vehicle can obtain additional electric energy to charge the one or more energy storage devices, where the vehicle can obtain additional electric energy to charge the one or more energy storage devices, or how much additional electric energy the vehicle can obtain to charge the one or more energy storage devices.

13. The control system of claim 12, wherein the charging restrictions include one or more of a distance along the route to one or more wayside recharging stations, amounts of reserve electric energy at the one or more wayside recharging stations that will be available for the vehicle to charge the one or more energy storage devices, or financial costs of charging the one or more energy storage devices at the one or more wayside recharging stations.

14. The control system of claim 9, wherein the one or more motors of the vehicle include two or more motors each separately rotating a different axle of the vehicle, and wherein the controller is configured to change operation of the vehicle by deactivating one or more of the motors while one or more other motors remain active to propel the vehicle.

15. The control system of claim 14, wherein the controller is configured to determine which of the motors to deactivate based on one or more of a tractive load of the vehicle or a temperature of the motors.

16. A method comprising:
   determining whether one or more energy storage devices of a motorized vehicle have enough stored energy to power one or more motors of the vehicle and propel the vehicle through an unpowered segment of a route that does not have a catenary or an electrified rail to power the one or more motors or charge the one or more energy storage devices; and
   responsive to determining that the one or more energy storage devices do not have enough stored energy to propel the vehicle through the unpowered segment of the route, one or more of:
      switching which of the one or more energy storage devices powers the one or more motors,
      changing a speed of the vehicle,
      changing a torque of the one or more motors,
      changing the route traveled by the vehicle,
      reducing how many of the one or more motors is propelling the vehicle,
      requesting a recharging vehicle provide additional electric current to the one or more energy storage devices,
      drawing the electric current from the one or more energy storage devices to a level below a lower limit of the one or more energy storage devices,
      activating a fuel-consuming motor of the vehicle to propel the vehicle,
      activating the fuel-consuming motor of the vehicle to charge the one or more energy storage devices,
      moving the vehicle to draft or mechanically couple to another vehicle, or
      controlling the vehicle to gain momentum or to generate an overcharge on the one or more energy storage devices during movement prior to entering the unpowered segment of the route.

17. The method of claim 16, further comprising:
   controlling the operation of the vehicle to cause the vehicle to deviate from the route to a wayside station that is configured to charge the one or more energy storage devices with enough electric current that the vehicle can travel through the unpowered segment of the route.

18. The method of claim 16, further comprising calculating an amount of electric energy that is needed to be consumed to propel the vehicle through the unpowered segment of the route based on one or more of transportation network congestion, a scheduled time of arrival of the vehicle at one or more designated locations, a grade of the route, a speed limit of the route, a size of the vehicle, a weight of the vehicle, a power output of the vehicle, or a rate of electric energy consumption of the vehicle.

19. The method of claim 16, wherein the one or more motors of the vehicle include two or more motors each separately rotating a different axle of the vehicle, and further comprising deactivating one or more of the motors while one or more other motors remain active to propel the vehicle.

20. The method of claim 19, further comprising determining which of the motors to deactivate based on one or more of a tractive load of the vehicle or a temperature of the motors.

* * * * *